US012163239B2

(12) United States Patent
Li et al.

(10) Patent No.: US 12,163,239 B2
(45) Date of Patent: Dec. 10, 2024

(54) ELECTROCHEMICAL CONVERSION OF ORGANIC WASTE

(71) Applicant: Nanyang Technological University, Singapore (SG)

(72) Inventors: Hong Li, Singapore (SG); Hu Zhao, Singapore (SG); Li Quan Lee, Singapore (SG)

(73) Assignee: Nanyang Technological University, Singapore (SG)

( * ) Notice: Subject to any disclaimer, the term of this patent is extended or adjusted under 35 U.S.C. 154(b) by 0 days.

(21) Appl. No.: 18/279,611

(22) PCT Filed: Mar. 4, 2022

(86) PCT No.: PCT/SG2022/050112
§ 371 (c)(1),
(2) Date: Aug. 31, 2023

(87) PCT Pub. No.: WO2022/186781
PCT Pub. Date: Sep. 9, 2022

(65) Prior Publication Data
US 2024/0309519 A1    Sep. 19, 2024

(30) Foreign Application Priority Data

Mar. 5, 2021  (SG) .............................. 1020212252T
Jun. 29, 2021 (SG) ............................ 10202107119W

(51) Int. Cl.
C25B 3/23     (2021.01)
B09B 3/35     (2022.01)
(Continued)

(52) U.S. Cl.
CPC ................. C25B 3/23 (2021.01); B09B 3/35
(2022.01); B09B 3/70 (2022.01); C02F 11/006
(2013.01);
(Continued)

(58) Field of Classification Search
None
See application file for complete search history.

(56) References Cited

U.S. PATENT DOCUMENTS 4,608,137 A     8/1986  Vaughan et al.
4,752,364 A *   6/1988  Dhooge .................... C25C 1/00
                                                205/703
(Continued)

OTHER PUBLICATIONS

Wett et al. "Systematic comparison of mechanical and thermal sludge disintegration technologies" Waste Management 30 '2010' 1057-1062 (Year: 2010).*

(Continued)

Primary Examiner — Wojciech Haske
(74) Attorney, Agent, or Firm — Tyler Sisk; Casimir Jones SC

(57) ABSTRACT

The present disclosure refers to a method of electrochemical conversion of organic waste to organic acid and hydrogen, comprising the steps of: (i) subjecting organic waste to ball milling under alkaline or acidic conditions to obtain pre-treated organic waste; (ii) introducing the pre-treated organic waste to a first compartment of an electrochemical cell, wherein the electrochemical cell comprises: the first compartment containing a nickel-based anode, a second compartment containing a cathode, and an electrolyte; and (iii) applying an electrical potential between the anode and the cathode, thereby producing organic acid at the anode, and hydrogen at the cathode. The present disclosure also refers to an organic acid or hydrogen produced from the method disclosed herein.

18 Claims, 53 Drawing Sheets

(51) Int. Cl.
*B09B 3/70* (2022.01)
*C02F 11/00* (2006.01)
*C25B 1/02* (2006.01)
*C25B 3/07* (2021.01)
*C25B 9/19* (2021.01)
*C25B 11/075* (2021.01)
*B09B 101/70* (2022.01)
*B09B 101/85* (2022.01)

(52) U.S. Cl.
CPC ............... *C25B 1/02* (2013.01); *C25B 3/07* (2021.01); *C25B 9/19* (2021.01); *C25B 11/075* (2021.01); *B09B 2101/70* (2022.01); *B09B 2101/85* (2022.01)

(56) References Cited

U.S. PATENT DOCUMENTS

| | | |
|---|---|---|
| 2010/0213075 A1 | 8/2010 | Guinea Diaz et al. |
| 2015/0233002 A1 | 8/2015 | Bhavaraju et al. |

OTHER PUBLICATIONS

Zhao, H. et al., Raw biomass electroreforming coupled to green hydrogen generation. Nature Communications, Mar. 31, 2021, vol. 12, pp. 1-10.

* cited by examiner

ELECTROCHEMICAL CONVERSION OF ORGANIC WASTE

CROSS REFERENCE TO RELATED APPLICATIONS

The present application is a national stage application of PCT/SG2022/050112 filed on 4 Mar. 2022, which claims priority to Singapore Application Number 10202107119 W filed on 29 Jun. 2021, and Singapore Application Number 10202102252T filed on 5 Mar. 2021, the contents of which are hereby incorporated by reference in their entirety.

TECHNICAL FIELD

The present disclosure generally refers to a method of electrochemically converting organic waste to useful products, such as organic acid and hydrogen. The present disclosure also refers to an organic acid or hydrogen produced from the method disclosed herein.

BACKGROUND ART

Huge amounts of organic waste are generated during various human processes, for example, sewage sludge during waste treatment, woody waste during deforestation and agricultural processes, food waste, and horticulture waste amongst others.

Ever-increasing organic waste poses a heavy burden on waste treatment systems. The complex compositions of such organic wastes pose a big problem as to how these wastes may be efficiently treated and disposed of. Improper disposal of such waste can cause severe environmental pollution and present a major health risk (for example, disgusting odors, eutrophication, heavy-metal poisoning and leaching, and hygienic concerns) to the public. Treatment of such waste is also energy-intensive and costly due to their complex makeup, for example sludge treatment consuming at least 50%-60% of the total cost of wastewater treatment plants.

Conventionally, the main methods of treating such organic waste include thermochemical and biochemical methods. The former consists of combustion, gasification, pyrolysis, and liquefaction, while the latter consists of fermentation and anaerobic digestion. Combustion and gasification typically produce steam and gas respectively, as a source of heat or electricity generation. Pyrolysis and liquefaction instead typically produce gas, oil and charcoal which can be indirectly used for heat, electricity, or upgrading to fuel.

However, incineration and pyrolysis disadvantageously generate substantial amounts of ash that ends up in landfills. For example, in Singapore, over 149,000 out of 438,000 tonnes of wood waste was incinerated or disposed in landfills in 2019. The incineration of such huge amounts of organic waste leaves a significant carbon footprint on the environment.

On the other hand, biochemical means cannot be applied to all forms of organic waste. For example, fermentation can only be applied to certain biomass waste, with the result being gaseous products that can be used for fuel. Anaerobic digestion may be applied to raw sewage waste, but only up to 35% of the solids are able to be digested. Additionally, such biochemical means have other disadvantages, e.g., long start-up times, maintaining of the microbial environment, slow conversion, and contamination of the gaseous products may be observed depending on the initial substrate.

Further, all mentioned methods of waste treatment cannot realise the complete conversion and/or digestion of organic waste. As such, additional processes are still needed to dispose the by-products. This takes up both money and valuable land space. Ultimately, such solutions to treating organic waste are neither long-term nor environmentally-friendly.

There is therefore a need to provide new methods of treating organic waste that overcomes, or at least ameliorates, one or more of the disadvantages described above.

On the other hand, alkaline water electrolysis (AWE) is a method that produces hydrogen and oxygen. In AWE, oxygen evolution reaction (OER) at the anode involves several multi-electron transfer steps requiring a higher overpotential to drive the electrolysis. Among three main water electrolysis technologies, i.e., alkaline water electrolysis (AWE), proton-exchange-membrane water electrolysis (PEMWE), and solid-oxide water electrolysis (SOWE), AWE is the most mature and scalable technology for hydrogen generation. However, the main concern of such systems includes possible explosions that may occur from the formation of dangerous oxygen-hydrogen mixtures and degradation of the diaphragm in between the electrochemical cell by reactive oxygen species (ROS). Therefore, a disadvantage of the water electrolysis system is that it has to be shut down to remove leaked $H_2$ when its concentration reaches 2% in the oxygen compartment to avoid explosions. Further, AWE suffers from low efficiency, which is related to the sluggish oxygen evolution reaction (OER) half-reaction that produces oxygen.

Further, a major obstacle for wider implementation of current water electrolysis technology to produce hydrogen is its much higher price (>$10 $kg^{-1}$) than the dominant methane reforming technology (about $2 $kg^{-1}$). This could be mitigated by decreasing the electricity price that represents about 50% of the cost of AWE hydrogen production. Up to 90% of the electricity is consumed by the oxygen evolution reaction (OER) that couples to the hydrogen evolution reaction (HER). This thermodynamic constraint suggests significant reduction of electricity consumption is not possible in HER-OER couple.

It would also not be feasible to use renewable energies (such as solar or wind) to power AWE. This is because intermittent and uncontrollable solar or wind energy is not compatible with AWE due to partial load issue, where serious gas crossover occurs when only partial electrolysis capacity (10-40% typically for AWE) is utilized.

Therefore, it would be very beneficial to integrate organic waste treatment into water electrolysis for cogeneration of green hydrogen and chemicals.

SUMMARY

In an aspect of the present disclosure, there is provided a method of electrochemical conversion of organic waste to organic acid and hydrogen, comprising the steps of:
(i) subjecting organic waste to ball milling under alkaline or acidic conditions to obtain pre-treated organic waste;
(ii) introducing the pre-treated organic waste to a first compartment of an electrochemical cell, wherein the electrochemical cell comprises:
the first compartment containing a nickel-based anode,
a second compartment containing a cathode, and
an electrolyte; and
(iii) applying an electrical potential between the anode and the cathode, thereby producing organic acid at the anode, and hydrogen at the cathode.

In another aspect of the present disclosure, there is provided an organic acid or hydrogen produced from the method disclosed herein.

In a further aspect of the present disclosure, there is provided an ammonium salt produced from the method disclosed herein.

Advantageously, the method of the present disclosure allows for the transformation of organic waste (which would have been typically discarded) into new products with valuable uses, such as organic acids and hydrogen.

Further advantageously, the effluent produced from the method of the present disclosure may be rich in bionutrients which are naturally present in organic waste while being free of heavy metals and thus, are well-suited for use as valuable and reusable products, such as fertilizers, or in supporting biological synthesis of single-cell proteins or polyhydroxylalkanoates (PHAs). The effluent produced from the presently disclosed method may be further re-introduced into the same electrochemical process to produce a new effluent further enriched in desirable nutrients. The presently disclosed method may thus be capable of both converting organic waste into valuable organic acids, while at the same time reducing various salts to produce an effluent that is enriched in certain salts.

Further advantageously, the method disclosed in the present disclosure may be capable of being powered by renewable energy sources, for example solar energy, wind energy, and hydropower.

The method of the present disclosure is advantageously capable of dealing with organic waste with little or no need to burn fossil fuels. Hence, the present disclosed method is also environmentally friendly.

The method of the present invention is advantageously an environmentally friendly method of recycling/transforming organic waste which would otherwise have been disposed of using non-environmentally-friendly methods (such as incineration). Therefore, the method of the present disclosure is advantageously able to (1) transform organic waste into valuable products; (2) dispose organic waste in an environmentally friendly way; (3) avoid carbon emission from organic waste; (4) produce green hydrogen at low cost; and (5) store renewable energy.

Definitions

Unless otherwise defined herein, scientific and technical terms used in this application shall have the meanings that are commonly understood by those of ordinary skill in the art. Generally, nomenclature used in connection with, and techniques of, chemistry described herein, are those well-known and commonly used in the art.

Unless the context requires otherwise or specifically stated to the contrary, integers, steps, or elements of the invention recited herein as singular integers, steps or elements clearly encompass both singular and plural forms of the recited integers, steps, or elements.

As used herein, the term "sludge" refers to all types of waste substances and includes (but is not limited to) sludge biomass, food waste, plant waste, sewage waste, and dead animal or plant matter. Also as used herein, WAS refers to raw waste-activated sludge, M-WAS-W refers to waste-activated sludge ball-milled under wet conditions, M-WAS-D refers to waste-activated sludge ball-milled under dry conditions, D-WAS refers to dried waste-activated sludge, M-WAS-R refers to solid residue after centrifugation of ball-milled waste-activated sludge, and M-WAS-S refers to soluble products after centrifugation of ball-milled waste-activated sludge.

As used herein, the term "volatile fatty acid standard" or "VFA standard" refers to a mixture of organic acids between 2 carbons to 9 carbons in length, and may comprise one or more of acetic acid, propionic acid, isobutyric acid, butyric acid, isovaleric acid, valeric acid, isocaproic acid, caproic acid or heptanoic acid.

The word "substantially" does not exclude "completely" e.g. a composition which is "substantially free" from Y may be completely free from Y. Where necessary, the word "substantially" may be omitted from the definition of the invention.

As used herein in the specification and in the claims, the phrase "at least," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and sub-generic groupings falling within the generic disclosure also form part of the disclosure. This includes the generic description of the embodiments with a proviso or negative limitation removing any subject matter from the genus, regardless of whether or not the excised material is specifically recited herein.

BRIEF DESCRIPTION OF DRAWINGS

The accompanying drawings illustrate disclosed embodiments and serve to explain the principles of the disclosed embodiments. It is to be understood, however, that the drawings are designed for purposes of illustration only, and not as a definition of the limits of the invention.

FIG. 6b is an image of the zoomed-in view of the indicated boxed area in FIG. 6a.

DETAILED DISCLOSURE OF DRAWINGS

Figure 1A:
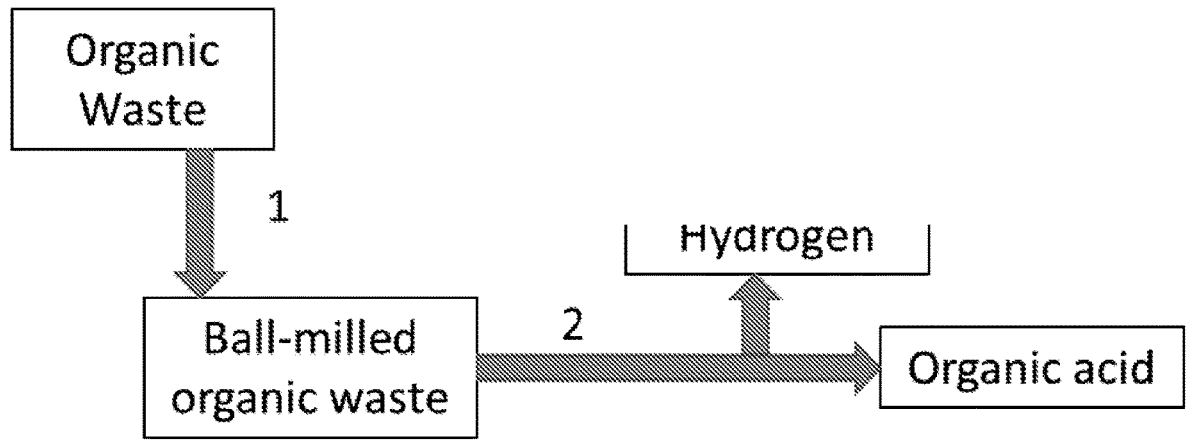
FIG. 1a is a flowchart showing the general process for electrochemical conversion of organic waste.
Figure 1B:
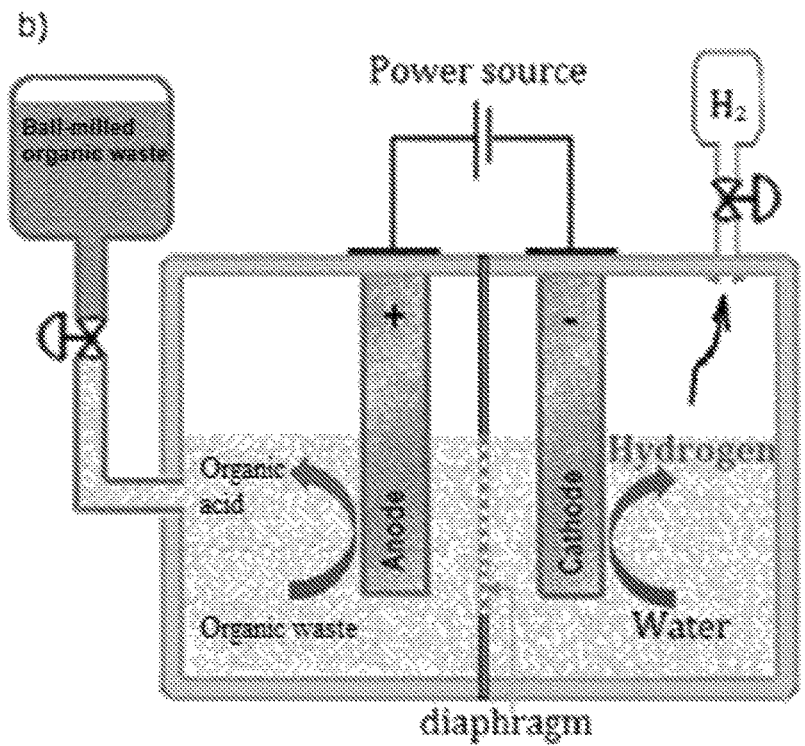
FIG. 1b is a diagram showing an example of an electrochemical cell for the electrochemical conversion of organic waste.
Figure 1C:
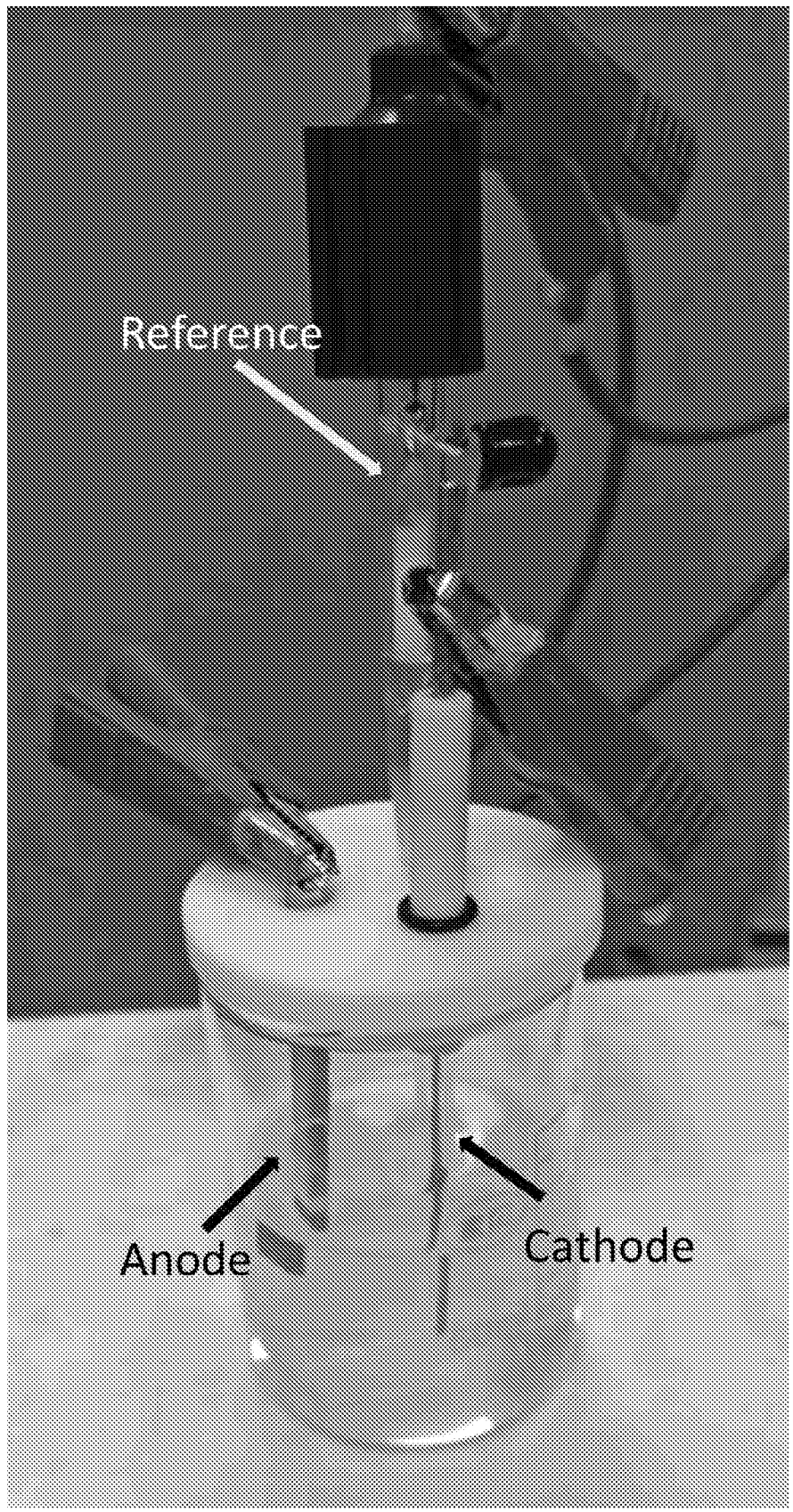
FIG. 1c is a photo of an example of an electrochemical cell setup of the present invention.

Referring to FIG. 1a, organic waste is first ball-milled (1) under either alkaline or acidic conditions to afford ball-milled organic waste. The ball-milled organic waste is then introduced to the anode of an electrochemical cell (2), after which an electric potential is applied, to form organic acid at the anode, and hydrogen at the cathode.

Figure 37:
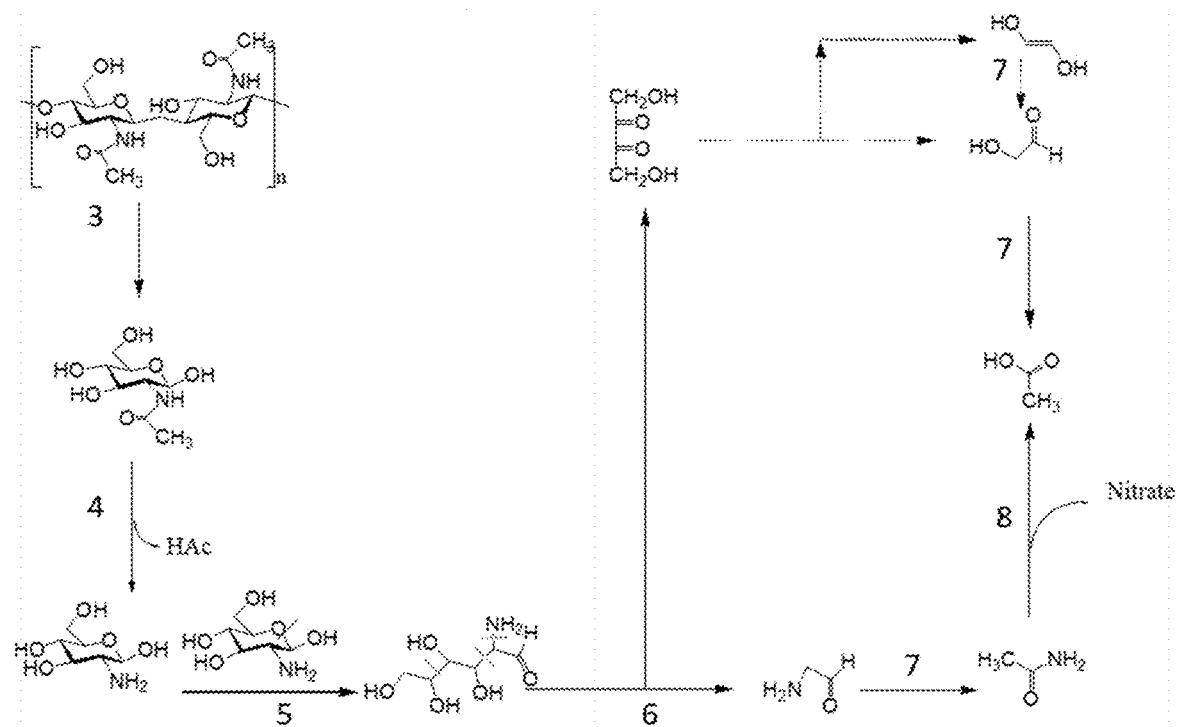
FIG. 37 is a scheme showing the hypothetical reaction pathways from chitin polymer to main acetic acid product based on detected intermediates and products.

Referring to FIG. 37, a series of hypothetical reaction pathways starting from N-acetylglucosamine to detected intermediates and products are shown. After the rate-determining glycosidic-bond breaking process (3), N-acetylglucosamine (NAG) may be deacetylated (4) and dynamically hydrolysed to open the pyranose ring (5) after which anodically radical cleavage of C—C bond would be possible. Preferably, the consecutive breaking of C—C bonds at the C-3 and C-5 position would dominate (6) with the progressive release of aminoacetaldehyde, glycolaldehyde and ethenediol because of the thermodynamic favorability and catalytic effect of the in-situ generated primary amines. Then, the newly formed aminoacetaldehyde and ethenediol would be tautomerized to acetamide (7) and glycolaldehyde (9) or subsequently acetic acid (10). The acetamide may be further transformed into acetic acid with the production of nitrates, after which the acetaldehyde formed would be unstable under such highly oxidative conditions and would be oxidised into acetic acid (8).

Figure 38:
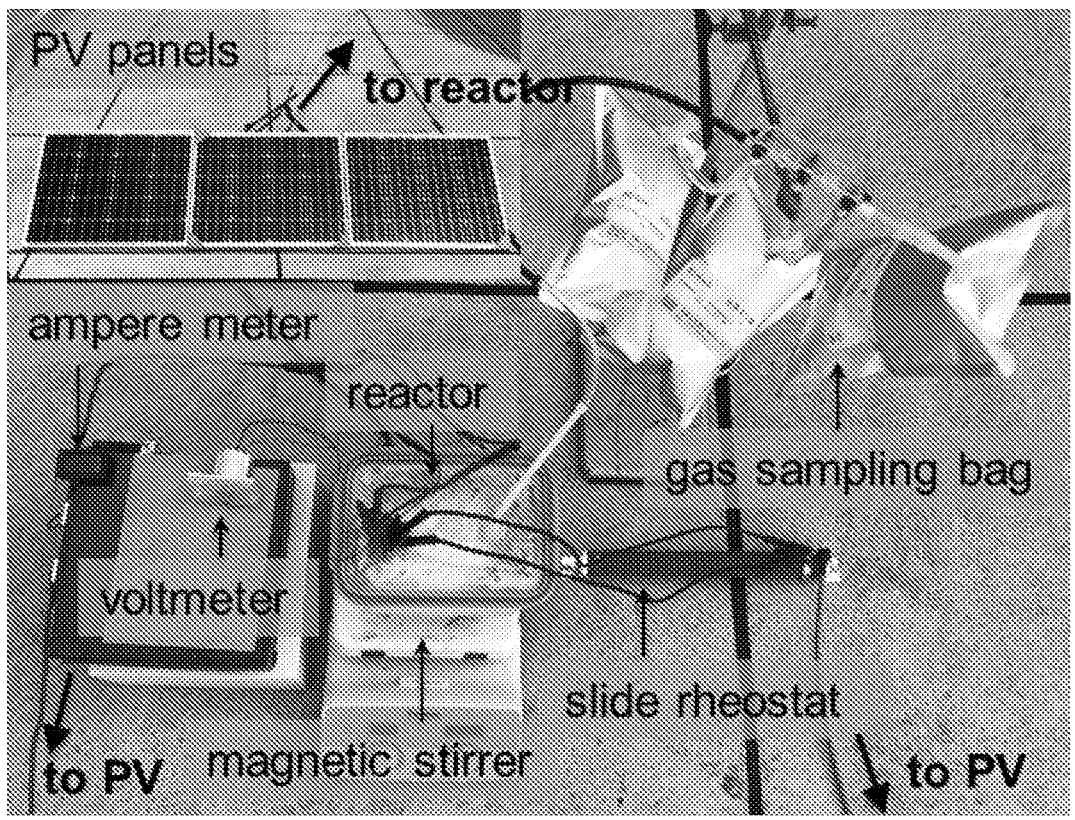
FIG. 38 is a photo showing a setup of an electrochemical cell driven by solar energy.

Referring to FIG. 38, commercial photo-voltaic (PV) panels were used to drive the electrochemical cell. A customised sealed reaction cell was connected to 3 PV panels in parallel (maximum power of 50 W each) through a slide rheostat (0-1 Ohm). A voltmeter and ampere meter were connected to the circuit to read the real-time fluctuating electrical signal in the circuit. 4 gas sampling bags were used to collect the gaseous product over a reaction duration of 1 hour. The initial reactant (ball-milled chitin) concentration was 5 g $L^{-1}$. Inset shows 3 PV panels connected in parallel.

Figure 46:
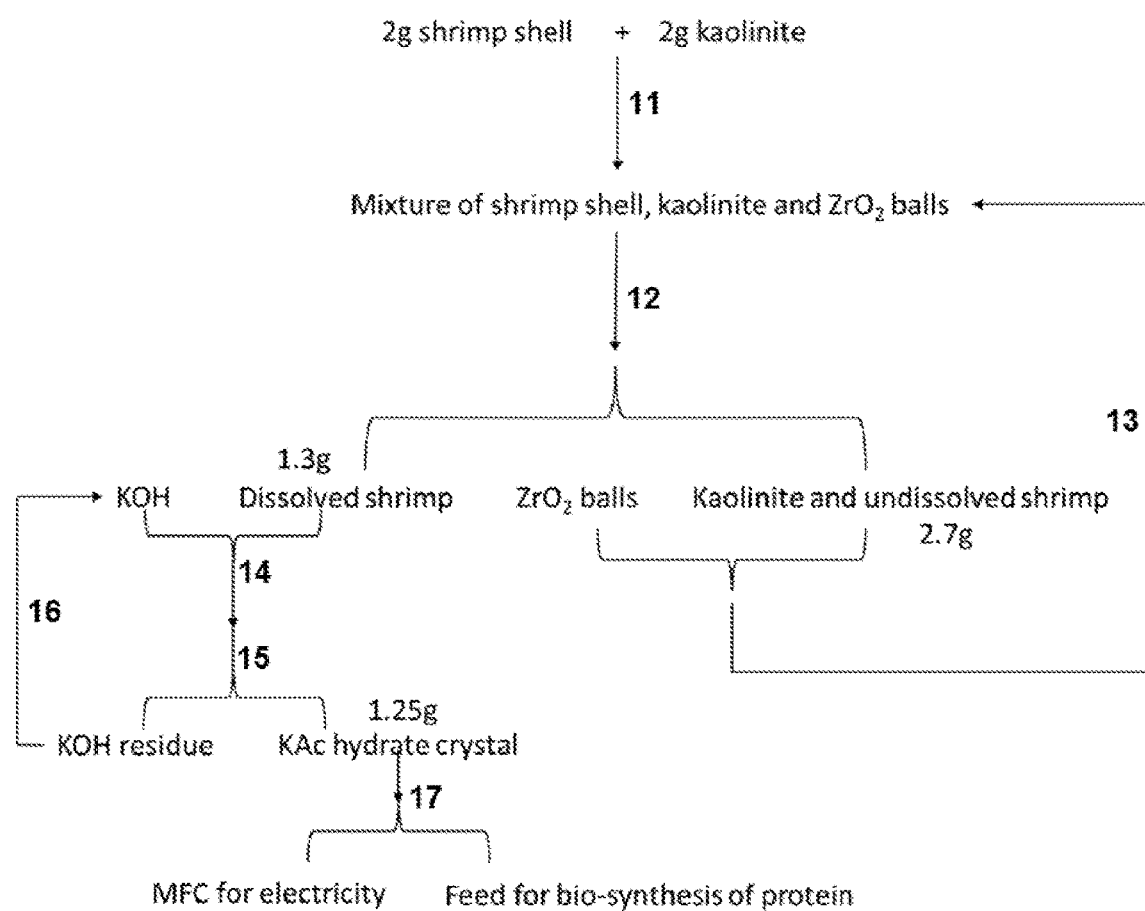
FIG. 46 is a flowchart showing the general process for the electrochemical conversion of organic biomass, with the recycling of the alkali used in the electrochemical conversion.

Referring to FIG. 46, shrimp shells (representative of organic waste) and kaolinite were ball milled (11) to form a mixture of ball-milled shrimp shell biomass, kaolinite and zirconia grinding balls. Solution of the mixture and centrifugation (12) afforded dissolved ball-milled shrimp shell biomass, and a solid mixture of zirconia balls, kaolinite and undissolved shrimp shell biomass. The solid mixture can then be recycled (13) into a subsequent batch of untreated shrimp shell biomass.

The ball-milled shrimp shell biomass was then dissolved in KOH and subjected to electrochemical conversion (14), after which it was concentrated and subjected to recrystallisation (15) to form KAc crystals and a KOH residue that is recycled (16) into the next batch of ball-milled shrimp shell biomass. KAc crystals may then be used (17) in microbial fuel cells (MFC) for electricity generation or as feed for bio-synthesis of proteins.

DETAILED DISCLOSURE OF EMBODIMENTS

The present invention generally relates to a method of electrochemical conversion of organic waste comprising a mechanochemical disintegration step of organic waste, and an electrochemical reforming step to upcycle organic solute to usable products, such as organic acid and hydrogen. The method may advantageously be powered using renewable energy sources and is therefore environmentally friendly.

In an aspect of the present disclosure, there is provided a method of electrochemical conversion of organic waste to organic acid and hydrogen, comprising the steps of:
(i) subjecting organic waste to ball milling under alkaline or acidic conditions to obtain pre-treated organic waste;
(ii) introducing the pre-treated organic waste to a first compartment of an electrochemical cell, wherein the electrochemical cell comprises:
the first compartment containing a nickel-based anode,
a second compartment containing a cathode, and
an electrolyte; and
(iii) applying an electrical potential between the anode and the cathode, thereby producing organic acid at the anode, and hydrogen at the cathode.

In some embodiments, steps (i) to (iii) may be integrated in one system. In other embodiments, the steps may be configured separately. The method disclosed herein may be capable of being carried out on a batch scale in some embodiments. In other embodiments, the method disclosed herein may be carried out continuously in a flow process or flow cell.

The method disclosed herein is capable of converting all forms of organic waste into organic acid and hydrogen. As such, the method of the present invention is a sustainable and environmentally-friendly approach of upcycling abundant waste biomasses. In some embodiments, the organic waste may be selected from the group consisting of sludge biomass, sludge, waste-activated sludge (WAS), woody biomass, food waste, shrimp shell biomass, horticulture waste, shellfish waste, lignin, lignin-containing biomass, cellulose, cellulose-containing biomass, polysaccharides, chitin, chitin-containing biomass and other waste biomass. In some preferred embodiments, the organic waste may be selected from the group consisting of sludge, sludge biomass, WAS, woody biomass, shellfish waste and shrimp shell biomass. In some other preferred embodiments, the organic waste may comprise lignin, cellulose, polysaccharides and/or chitin.

The organic waste may be selected from the group consisting of sludge, woody biomass, WAS, food waste, horticulture waste, and shellfish.

The sludge may be selected from the group consisting of sludge biomass, waste activated sludge (WAS), food waste, sewage sludge, and sludge treated with thermal hydrolysis process (THP).

The woody biomass may be selected from the group consisting of woody plants, cardboard, paper, and packaging material.

The shellfish may be selected from the group consisting of shells containing chitin, prawn shells, lobster shells, crab shells, crayfish shells, clam shells, mussel shells, and yabbie shells.

The organic waste may comprise lignin, cellulose, polysaccharide, and/or chitin.

The method disclosed herein may be used on both dry or wet organic waste. This advantageously allows the disclosed method to be applied to all sorts of organic waste.

The effluent produced at the anode after electrochemical conversion may be enriched in ammonium salts and nitrate salts as compared to the ball-milled biomass prior to electrochemical conversion. It is a surprising discovery of the present invention that the effluent at the anode may be reintroduced into the same electrochemical conversion process and subsequently go through further electrochemical modifications of the constituents. For example, the effluent at the anode after an initial electrochemical conversion may be added to a cathode, after which the substrates in the effluent may undergo reduction to form other valuable products. In some embodiments, the effluent at the anode may be introduced to the cathode to reduce the nitrate salts present into ammonium salts. This results in a new effluent that is further enriched in ammonium salts, but low in nitrates. The new effluent as formed may find further commercial uses, for example in supporting biological synthesis of proteins or PHA. In some embodiments, the cathode may comprise a Cu-based cathode.

The method may further comprise introducing a solution comprising a nitrate salt to the second compartment containing the cathode of step (ii), and wherein step (iii) further comprises producing an ammonium salt.

The solution comprising the nitrate salt may comprise a solution obtained from the first compartment containing the anode after step (ii).

The present invention may comprise an ammonium salt produced from the method disclosed herein.

The method disclosed herein is capable of converting all types of organic waste into organic acid and hydrogen. For example, the method disclosed herein is capable of converting sludge into organic acid and hydrogen. In some embodiments, the sludge is selected from the group consisting of sludge biomass, waste-activated sludge (WAS), food waste, sewage sludge and sludge treated with thermal hydrolysis (THP). It is not unexpected that sludge may also comprise other biomasses, for example, sludge may contain woody biomass as a result of wooden chopsticks, wastepaper products and cardboard packaging previously disposed. Further, sludge may also contain chitin-containing biomass like shrimp shell biomass from disposed food waste. It is inherent in the invention that sludge may as such refer to all forms of organic waste, as long as they are organic in nature. In some preferred embodiments, the sludge is selected from waste-activated sludge.

The method disclosed herein is also capable of converting woody biomass into organic acid and hydrogen. In some embodiments, the woody biomass is selected from the group consisting of woody plants, cardboard, paper, and packaging material. In some preferred embodiments, the woody biomass is woody plants.

The method disclosed herein is equally capable of converting chitinous biomass into organic acid and hydrogen. In some embodiments, the chitinous biomass is selected from the group consisting of shellfish, fungi, crustaceans, mollusks and cephalopods. In some further embodiments, the shellfish is selected from the group consisting of prawn shells, shrimp shells, lobster shells, crab shells, crayfish shells, clam shells, mussel shells, vabbie shells, and chitin-containing biomasses. In some preferred embodiments, the shellfish is selected from the group consisting of prawn shells or shrimp shells.

The method disclosed herein is capable of forming organic acid as a valuable product. As such, the disclosed method valorizes waste material as sources of useful organic acid. In some embodiments, the organic acid formed is selected from the group consisting of acetic acid, formic acid, lactic acid, benzoic acid and propanoic acid. In some preferred embodiments, the organic acid is selected from the group consisting of acetic acid and formic acid. In some further preferred embodiments, the organic acid is acetic acid.

The method of the present invention utilizes ball-milling as a pre-treatment to break down the organic waste to amplify the effect of the subsequent electrochemical conversion process. As such, stubborn organic waste can be surprisingly digested and converted into valuable organic acids with the concomitant release of hydrogen. The combination of ball-milling as a pre-treatment and electrolysis as a means of electrochemical conversion is not known in prior art. Neither is electrolysis known in the art to be capable of breaking down stubborn organic waste into useful organic acids. The presently disclosed method may also advantageously only comprise a ball-milling process with no additional requirement that the other components of the biomass be separated beforehand. For example, no separation or fractionation of cellulose, hemicellulose, or lignin is required before and after the ball-milling step. This results in lower costs, and the method as such may also be scaled up easily in industrial scale.

The ball milling step in the disclosed method may be accomplished using different parameters. In some embodiments, the ball milling is performed at a speed of at least about 200 rpm, at least about 300 rpm, at least about 400 rpm, at least about 500 rpm, at least about 600 rpm, at least about 800 rpm, at least about 1000 rpm, at least about 1200 rpm, at least about 1400 rpm, at least about 1600 rpm, at least about 1800 rpm, at least about 2000 rpm, at least about 2200 rpm, at least about 2400 rpm, at least about 2500 rpm, at least about 2600 rpm, at least about 2800 rpm, at least about 3000 rpm, or any values or ranges therebetween. In other embodiments, the ball milling is performed at a speed of at most about 200 rpm, at most about 300 rpm, at most about 400 rpm, at most about 500 rpm, at most about 600 rpm, at most about 800 rpm, at most about 1000 rpm, at most about 1200 rpm, at most about 1400 rpm, at most about 1600 rpm, at most about 1800 rpm, at most about 2000 rpm, at most about 2200 rpm, at most about 2400 rpm, at most about 2500 rpm, at most about 2600 rpm, at most about 2800 rpm, at most about 3000 rpm, or any ranges of values therebetween. In some embodiments, the ball milling is performed at a speed in the range of about 200 rpm to about 3000 rpm, about 300 rpm to about 3000 rpm, about 400 rpm to about 3000 rpm, about 500 rpm to about 3000 rpm, about 600 rpm to about 3000 rpm, about 800 rpm to about 3000 rpm, about 1000 rpm to about 3000 rpm, about 1200 rpm to about 3000 rpm, about 1400 rpm to about 3000 rpm, about 1600 rpm to about 3000 rpm, about 1800 rpm to about 3000 rpm, about 2000 rpm to about 3000 rpm, about 2200 rpm to about 3000 rpm, about 2400 rpm to about 3000 rpm, about 2500 rpm to about 3000 rpm, about 2600 rpm to about 3000 rpm, about 2800 rpm to about 3000 rpm, about 200 rpm to about 2800 rpm, about 300 rpm to about 2800 rpm, about 400 rpm to about 2800 rpm, about 500 rpm to about 2800 rpm, about 600 rpm to about 2800 rpm, about 800 rpm to about 2800 rpm, about 1000 rpm to about 2800 rpm, about 1200 rpm to about 2800 rpm, about 1400 rpm to about 2800 rpm, about 1600 rpm to about 2800 rpm, about 1800 rpm to about 2800 rpm, about 2000 rpm to about 2800 rpm, about 2200 rpm to about 2800 rpm, about 2400 rpm to about 2800 rpm, about 2500 rpm to about 2800 rpm, about 2600 rpm to about 2800 rpm, about 200 rpm to about 2600 rpm, about 300 rpm to about 2600 rpm, about 400 rpm to about 2600 rpm, about 500 rpm to about 2600 rpm, about 600 rpm to about 2600 rpm, about 800 rpm to about 2600 rpm, about 1000 rpm to about 2600 rpm, about 1200 rpm to about 2600 rpm, about 1400 rpm to about 2600 rpm, about 1600 rpm to about 2600 rpm, about 1800 rpm to about 2600 rpm, about 2000 rpm to about 2600 rpm, about 2200 rpm to about 2600 rpm, about 2400 rpm to about 2600 rpm, about 2500 rpm to about 2600 rpm, about 200 rpm to about 2500 rpm, about 300 rpm to about 2500 rpm, about 400 rpm to about 2500 rpm, about 500 rpm to about 2500 rpm, about 600 rpm to about 2500 rpm, about 800 rpm to about 2500 rpm, about 1000 rpm to about 2500 rpm, about 1200 rpm to about 2500 rpm, about 1400 rpm to about 2500 rpm, about 1600 rpm to about 2500 rpm, about 1800 rpm to about 2500 rpm, about 2000 rpm to about 2500 rpm, about 2200 rpm to about 2500 rpm, about 2400 rpm to about 2500 rpm, about 200 rpm to about 2400 rpm, about 300 rpm to about 2400 rpm, about 400 rpm to about 2400 rpm, about 500 rpm to about 2400 rpm, about 600 rpm to about 2400 rpm, about 800 rpm to about 2400 rpm, about 1000 rpm to about 2400 rpm, about 1200 rpm to about 2400 rpm, about 1400 rpm to about 2400 rpm, about 1600 rpm to about 2400 rpm, about 1800 rpm to about 2400 rpm, about 2000 rpm to about 2400 rpm, about 2200 rpm to about 2400 rpm, about 200 rpm to about 2200 rpm, about 300 rpm to about 2200 rpm, about 400 rpm to about 2200 rpm, about 500 rpm to about 2200 rpm, about 600 rpm to about 2200 rpm, about 800 rpm to about 2200 rpm, about 1000 rpm to about 2200 rpm, about 1200 rpm to about 2200 rpm, about 1400 rpm to about 2200 rpm, about 1600 rpm to about 2200 rpm, about 1800 rpm to about 2200 rpm, about 2000 rpm to about 2200 rpm, about 200 rpm to about 2000 rpm, about 300 rpm to about 2000 rpm, about 400 rpm to about 2000 rpm, about 500 rpm to about 2000 rpm, about 600 rpm to about 2000 rpm, about 800 rpm to about 2000 rpm, about 1000 rpm to about 2000 rpm, about 1200 rpm to about 2000 rpm, about 1400 rpm to about 2000 rpm, about 1600 rpm to about 2000 rpm, about 1800 rpm to about 2000 rpm, about 200 rpm to about 1800 rpm, about 300 rpm to about 1800 rpm, about 400 rpm to about 1800 rpm, about 500 rpm to about 1800 rpm, about 600 rpm to about 1800 rpm, about 1000 rpm to about 1800 rpm, about 1200 rpm to about 1800 rpm, about 1400 rpm to about 1800 rpm, about 1600 rpm to about 1800 rpm, about 200 rpm to about 1600 rpm, about 300 rpm to about 1600 rpm, about 400 rpm to about 1600 rpm, about 500 rpm to about 1600 rpm, about 600 rpm to about 1600 rpm, about 800 rpm to about 1600 rpm, about 1000 rpm to about 1600 rpm, about 1200 rpm to about 1600 rpm, about 1400 rpm to about 1600 rpm, about 200 rpm to about 1400 rpm, about 300 rpm to about 1400 rpm, about 400 rpm to about 1400 rpm, about 500 rpm to about 1400 rpm, about 600 rpm to about 1400 rpm, about 800 rpm to about 1400 rpm, about 1000 rpm to about 1400 rpm, about 1200 rpm to about 1400 rpm, about 200 rpm to about 1200 rpm, about 300 rpm to about 1200 rpm, about 400 rpm to about 1200 rpm, about 500 rpm to about 1200 rpm, about 600 rpm to about 1200 rpm, about 800 rpm to about 1200 rpm, about 1000 rpm to about 1200 rpm, about 200 rpm to about 1000 rpm, about 300 rpm to about 1000 rpm, about 400 rpm to about 1000 rpm, about 500 rpm to about 1000 rpm, about 600 rpm to about 1000 rpm, about 800 rpm to about 1000 rpm, about 200 rpm to about 800 rpm, about 300 rpm to about 800 rpm, about 400 rpm to about 800 rpm, about 500 rpm to about 800 rpm, about 600 rpm to about 800 rpm, about 200 rpm to about 600 rpm, about 300 rpm to about 600 rpm, about 400 rpm to about 600 rpm, about 500 rpm to about 600 rpm, about 200 rpm to about 500 rpm, about 300 rpm to about 500 rpm, about 400 rpm to about 500 rpm, about 200 rpm to about 400 rpm, about 300 rpm to about 400 rpm, about 200 rpm to about 300 rpm, or any ranges or values therebetween. In some other embodiments, the ball milling is performed at a speed of about 200 rpm, about 300 rpm, about 400 rpm, about 500 rpm, about 600 rpm, about 800 rpm, about 1000 rpm, about 1200 rpm, about 1400 rpm, about 1600 rpm, about 1800 rpm, about 2000 rpm, about 2200 rpm, about 2400 rpm, about 2500 rpm, about 2600 rpm, about 2800 rpm, about 3000 rpm, or any ranges or values therebetween. In some preferred embodiments, the ball milling is performed at a speed of about 500 rpm to about 2000 rpm.

The ball milling step in the disclosed method may be accomplished in the presence of various catalysts or promoters to aid the breaking down of organic waste. In some embodiments, the organic waste is subjected to ball milling under alkaline conditions to obtain pre-treated organic waste. In some further embodiments, the organic waste is subjected to ball milling in the presence of an alkali to obtain pre-treated organic waste, wherein the alkali is selected from the group consisting of Group I metal hydroxides, Group II metal hydroxides, Group III metal hydroxides, ammonium hydroxides, and combinations thereof. In some preferred embodiments, the alkali is selected from the group consisting of NaOH or KOH.

The method of the present disclosure may accommodate various ratios of alkali relative to the organic waste in the ball-milling step. As such, the ball-milling step in the present disclosed method may utilize minimal amounts of alkali with no or little added solvent. This both reduces cost as well as the negative impact on the environment. In some embodiments, the ratio of organic waste to alkali in the ball milling step is in the range of at least about 10:1, at least about 8:1, at least about 6:1, at least about 4:1, at least about 3:1, at least about 2:1, at least about 1.5:1, at least about 1:1, at least about 1:1.5, at least about 1:2, at least about 1:3, at least about 1:4, at least about 1:6, or any ranges or values therebetween. In other embodiments, the ratio of organic waste to alkali in the ball milling step is in the range of about 10:1 to about 1:6, about 8:1 to about 1:6, about 6:1 to about 1:6, about 4:1 to about 1:6, about 3:1 to about 1:6, about 2:1 to about 1:6, about 1.5:1 to about 1:6, about 1:1 to about 1:6, about 1:1.5 to about 1:6, about 1:2 to about 1:6, about 1:3 to about 1:6, about 1:4 to about 1:6, about 1:5 to about 1:6, about 10:1 to about 1:5, about 8:1 to about 1:5, about 6:1 to about 1:5, about 4:1 to about 1:5, about 3:1 to about 1:5, about 2:1 to about 1:5, about 1.5:1 to about 1:5, about 1:1 to about 1:5, about 1:1.5 to about 1:5, about 1:2 to about 1:5, about 1:3 to about 1:5, about 1:4 to about 1:5, about 10:1 to about 1:3, about 8:1 to about 1:3, about 6:1 to about 1:3, about 4:1 to about 1:3, about 3:1 to about 1:3, about 2:1 to about 1:3, about 1.5:1 to about 1:3, about 1:1 to about 1:3, about 1:1.5 to about 1:3, about 1:2 to about 1:3, about 10:1 to about 1:2, about 8:1 to about 1:2, about 6:1 to about 1:2, about 4:1 to about 1:2, about 3:1 to about 1:2, about 2:1 to about 1:2, about 1.5:1 to about 1:2, about 1:1 to about 1:2, about 1:1.5 to about 1:2, about 10:1 to about 1:1.5, about 8:1 to about 1:1.5, about 6:1 to about 1:1.5, about 4:1 to about 1:1.5, about 3:1 to about 1:1.5, about 2:1 to about 1:1.5, about 1.5:1 to about 1:1.5, about 1:1 to about 1:1.5, about 10:1 to about 1:1, about 8:1 to about 1:1, about 6:1 to about 1:1, about 4:1 to about 1:1, about 3:1 to about 1:1, about 2:1 to about 1:1, about 1.5:1 to about 1:1, about 10:1 to about 1.5:1, about 8:1 to about 1.5:1, about 6:1 to about 1.5:1, about 4:1 to about 1.5:1, about 3:1 to about 1.5:1, about 2:1 to about 1.5:1, about 10:1 to about 2:1, about 8:1 to about 2:1, about 6:1 to about 2:1, about 4:1 to about 2:1, about 3:1 to about 2:1, about 10:1 to about 3:1, about 8:1 to about 3:1, about 6:1 to about 3:1, about 4:1 to about 3:1, about 10:1 to about 4:1, about 8:1 to about 4:1, about 6:1 to about 4:1, about 10:1 to about 8:1, about 10:1 to about 6:1, about 10:1 to about 8:1, or any ranges or values therebetween. In some other embodiments, the ratio of organic waste to alkali in the ball milling step is about 10:1, about 8:1, about 6:1, about 4:1, about 3:1, about 2:1, about 1.5:1, about 1:1, about 1:1.5, about 1:2, about 1:3, about 1:4, about 1:6 or any values or ranges therebetween. In some preferred embodiments, the ratio of organic waste to alkali is in the range of about 4:1 to about 1:2.

In other embodiments, the organic waste is subjected to ball milling under acidic conditions to obtain pre-treated organic waste. In some further embodiments, the organic waste is subjected to ball milling in the presence of an acidic material to obtain pre-treated organic waste, wherein the acidic material is selected from the group consisting of sulfuric acid, hydrochloric acid, kaolinite, montmorillonite, illite and combinations thereof. In some preferred embodiments, the acidic material is kaolinite.

The method of the present disclosure may accommodate various ratios of acid relative to the organic waste in the ball-milling step. As such, the ball-milling step in the present disclosed method may utilize minimal amounts of acids with no or little added solvent. This both reduces cost as well as the negative impact on the environment. In some embodiments, the ratio of organic waste to acid in the ball milling step is in the range of at least about 10:1, at least about 8:1, at least about 6:1, at least about 4:1, at least about 3:1, at least about 2:1, at least about 1.5:1, at least about 1:1, at least about 1:1.5, at least about 1:2, at least about 1:3, at least about 1:4, at least about 1:6, or any ranges or values therebetween. In other embodiments, the ratio of organic waste to acid in the ball milling step is in the range of about 10:1 to about 1:6, about 8:1 to about 1:6, about 6:1 to about 1:6, about 4:1 to about 1:6, about 3:1 to about 1:6, about 2:1 to about 1:6, about 1.5:1 to about 1:6, about 1:1 to about 1:6, about 1:1.5 to about 1:6, about 1:2 to about 1:6, about 1:3 to about 1:6, about 1:4 to about 1:6, about 1:5 to about 1:6, about 10:1 to about 1:5, about 8:1 to about 1:5, about 6:1 to about 1:5, about 4:1 to about 1:5, about 3:1 to about 1:5, about 2:1 to about 1:5, about 1.5:1 to about 1:5, about 1:1 to about 1:5, about 1:1.5 to about 1:5, about 1:2 to about 1:5, about 1:3 to about 1:5, about 1:4 to about 1:5, about 10:1 to about 1:3, about 8:1 to about 1:3, about 6:1 to about 1:3, about 4:1 to about 1:3, about 3:1 to about 1:3, about 2:1 to about 1:3, about 1.5:1 to about 1:3, about 1:1 to about 1:3, about 1:1.5 to about 1:3, about 1:2 to about 1:3, about 10:1 to about 1:2, about 8:1 to about 1:2, about 6:1 to about 1:2, about 4:1 to about 1:2, about 3:1 to about 1:2, about 2:1 to about 1:2, about 1:2, about 1.5:1 to about 1:2, about 1:1 to about 1:2, about 1:1.5 to about 1:2, about 10:1 to about 1:1.5, about 8:1 to about 1:1.5, about 6:1 to about 1:1.5, about 4:1 to about 1:1.5, about 3:1 to about 1:1.5, about 2:1 to about 1:1.5, about 1.5:1 to about 1:1.5, about 1:1 to about 1:1.5, about 10:1 to about 1:1, about 8:1 to about 1:1, about 6:1 to about 1:1, about 4:1 to about 1:1, about 3:1 to about 1:1, about 2:1 to about 1:1, about 1.5:1 to about 1:1, about 10:1 to about 1:1, about 1.5:1, about 8:1 to about 1.5:1, about 6:1 to about 1.5:1, about 4:1 to about 1.5:1, about 3:1 to about 1.5:1, about 2:1 to about 1.5:1, about 10:1 to about 2:1, about 8:1 to about 2:1, about 6:1 to about 2:1, about 4:1 to about 2:1, about 3:1 to about 2:1, about 10:1 to about 3:1, about 8:1 to about 3:1, about 6:1 to about 3:1, about 4:1 to about 3:1, about 10:1 to about 4:1, about 8:1 to about 4:1, about 6:1 to about 4:1, about 10:1 to about 8:1, about 10:1 to about 6:1, about 10:1 to about 8:1, or any ranges or values therebetween. In some other embodiments, the ratio of organic waste to acid in the ball milling step is about 10:1, about 8:1, about 6:1, about 4:1, about 3:1, about 2:1, about 1.5:1, about 1:1, about 1:1.5, about 1:2, about 1:3, about 1:4, about 1:6 or any values or ranges therebetween. In some preferred embodiments, the ratio of organic waste to acid is in the range of about 4:1 to about 1:2.

Ball-milling of organic waste under alkaline or acidic conditions breaks down the polymeric structures in organic waste. As such, most of the organic components become soluble post-mechanochemical treatment, and the pre-treated organic waste becomes advantageously liable to electrochemical conversion. In some embodiments, the step (i) in the method disclosed herein may further comprise solubilising the ball-milled organic waste in water to obtain a solubilised mixture, and centrifuging the solubilised mixture to obtain the pre-treated organic waste as supernatant. As heavy metals often precipitate out in alkaline conditions, they may be removed after ball-milling using simple filtration.

This is a surprising advantage of the method of the present disclosure as well.

In some embodiments, step (i) of the method disclosed herein may comprise ball milling with milling balls selected from the group consisting of stainless steel milling balls, and zirconia milling balls. In some preferred embodiments, step (i) of the method disclosed herein may comprise ball milling with zirconia milling balls.

Ball milling of organic waste may be performed for different durations depending on the organic waste substrate. In some embodiments, the organic waste may be ball milled for at least about 1 hour, at least about 2 hours, at least about 3 hours, at least about 4 hours, at least about 5 hours, at least about 6 hours, at least about 7 hours, at least about 8 hours, at least about 9 hours, at least about 10 hours, or any ranges or values therebetween. In other embodiments, the organic waste may be ball milled in the range of about 1 hour to 10 hours, about 2 hours to 10 hours, about 3 hours to 10 hours, about 4 hours to 10 hours, about 5 hours to 10 hours, about 6 hours to 10 hours, about 7 hours to 10 hours, about 8 hours to 10 hours, about 9 hours to 10 hours, about 1 hour to 9 hours, about 2 hours to 9 hours, about 3 hours to 9 hours, about 4 hours to 9 hours, about 5 hours to 9 hours, about 6 hours to 9 hours, about 7 hours to 9 hours, about 8 hours to 9 hours, about 1 hour to 8 hours, about 2 hours to 8 hours, about 3 hours to 8 hours, about 4 hours to 8 hours, about 5 hours to 8 hours, about 6 hours to 8 hours, about 7 hours to 8 hours, about 1 hour to 7 hours, about 2 hours to 7 hours, about 3 hours to 7 hours, about 4 hours to 7 hours, about 5 hours to 7 hours, about 6 hours to 7 hours, about 1 hour to 6 hours, about 2 hours to 6 hours, about 3 hours to 6 hours, about 4 hours to 6 hours, about 5 hours to 6 hours, about 1 hour to 5 hours, about 2 hours to 5 hours, about 3 hours to 5 hours, about 4 hours to 5 hours, about 1 hour to 4 hours, about 2 hours to 4 hours, about 3 hours to 4 hours, about 1 hour to 3 hours, about 2 hours to 3 hours, about 1 hour to 2 hours, or any ranges or values therebetween. In some other embodiments, the organic waste may be ball milled in the range of about 1 hour, about 2 hours, about 3 hours, about 4 hours, about 5 hours, about 6 hours, about 7 hours, about 8 hours, about 9 hours, about 10 hours, or any values or ranges therebetween. In some further preferred embodiments, the organic waste is ball milled for at least 4 hours.

The present disclosed method also takes much less time in total compared to conventional approaches, like fermentation (biochemical) that takes 70 hours.

Ball milling of organic waste may also be performed at different conditions depending on the organic waste substrate. Ball milling is known to be an exothermic process. Hence, while the presently disclosed method may commence at room temperature or near room temperature, the temperature of the setup may increase over time. Advantageously, the presently disclosed method occurs at much lower temperature compared to existing commercial process, like methanol carbonylation (Monsanto or Ativa processes) for producing acetic acid, and is thus much less energy intensive. In these processes, they have to be performed at elevated temperatures and pressure. In some embodiments the organic waste may be ball milled for at least about 10° C., at least about 15° C., at least about 20° C., at least about 25° C., at least about 30° C., at least about 35° C., at least about 40° C., at least about 50° C., at least about 60° C., at least about 65° C., at least about 70° C., at least about 80° C., or any ranges or values therebetween. In other embodiments, the organic waste may be ball milled for at most about 10° C., at most about 15° C., at most about 20° C., at most about 25° C., at most about 30° C., at most about 35° C., at most about 40° C., at most about 50° C., at most about 60° C., at most about 65° C., at most about 70° C., at most about 80° C., or any ranges or values therebetween. In some other embodiments, the organic waste may be ball milled in the range of about 10° C. to about 80° C., about 15° C. to about 80° C., about 20° C. to about 80° C., about 25° C. to about 80° C., about 30° C. to about 80° C., about 35° C. to about 80° C., about 40° C. to about 80° C., about 50° C. to about 80° C., about 60° C. to about 80° C., about 65° C. to about 80° C., about 70° C. to about 80° C., about 10° C. to about 70° C., about 15° C. to about 70° C., about 20° C. to about 70° C., about 25° C. to about 70° C., about 30° C. to about 70° C., about 35° C. to about 70° C., about 40° C. to about 70° C., about 50° C. to about 70° C., about 60° C. to about 70° C., about 65° C. to about 70° C., about 10° C. to about 65° C., about 15° C. to about 65° C., about 20° C. to about 65° C., about 25° C. to about 65° C., about 30° C. to about 65° C., about 35° C. to about 65° C., about 40° C. to about 65° C., about 50° C. to about 65° C., about 60° C. to about 65° C., about 10° C. to about 60° C., about 15° C. to about 60° C., about 20° C. to about 60° C., about 25° C. to about 60° C., about 30° C. to about 60° C., about 35° C. to about 60° C., about 40° C. to about 60° C., about 50° C. to about 60° C., about 10° C. to about 50° C., about 15° C. to about 50° C., about 20° C. to about 50° C., about 25° C. to about 50° C., about 30° C. to about 50° C., about 35° C. to about 50° C., about 40° C. to about 50° C., about 10° C. to about 40° C., about 15° C. to about 40° C., about 20° C. to about 40° C., about 25° C. to about 40° C., about 30° C. to about 40° C., about 35° C. to about 40° C., about 10° C. to about 35° C., about 15° C. to about 35° C., about 20° C. to about 35° C., about 25° C. to about 35° C., about 30° C. to about 35° C., about 10° C. to about 30° C., about 15° C. to about 30° C., about 20° C. to about 30° C., about 25° C. to about 30° C., about 10° C. to about 25° C., about 15° C. to about 25° C., about 20° C. to about 25° C., about 10° C. to about 20° C., about 15° C. to about 20° C., about 10° C. to about 15° C., or any ranges or values therebetween. In yet some other embodiments, the organic waste may be ball milled at about 10° C., about 15° C., about 20° C., about 25° C., about 30° C., about 35° C., about 40° C., about 50° C., about 60° C., about 65° C., about 70° C., about 80° C., or any values or ranges therebetween. In some further preferred embodiments, the ball milling is performed at a temperature in the range of about 20° C. to about 70° C.

After the mechanochemical disintegration step of organic waste, an electrochemical reforming step to upcycle organic solute (e.g., the pre-treated organic waste) to usable products is performed. The method of the present invention comprises electrochemically converting organic waste to organic acid and hydrogen comprising introducing the pre-treated organic waste to a first compartment of an electrochemical cell, wherein the electrochemical cell comprises the first compartment containing a nickel-based anode, a second compartment containing a cathode, and an electrolyte.

In the method of the present invention, the pre-treated organic waste is introduced to the anode where it is oxidised to organic acid, with the concomitant release of hydrogen at the cathode. As oxygen is not formed at the anode in the presently disclosed method, there is little or no risk of the formation of explosive $H_2$—$O_2$ mixtures. As such, the presently disclosed method is advantageously safe compared to conventional water electrolysis methods that produce hydrogen.

Step (ii) of the presently disclosed method may further comprise dissolving the pre-treated organic waste in an alkaline solution. The presence of an alkaline environment both assists in the electrochemical conversion of pre-treated organic waste to organic acid, while at the same time favoring the deposition of heavy metals at the cathode upon absorbing negative charges. In some embodiments, step (ii) may further comprise dissolving the pre-treated organic waste in an alkaline solution, wherein the solution comprises Group I metal hydroxides, Group II metal hydroxides, Group III metal hydroxides, ammonium hydroxides, and combinations thereof. In some further preferred embodiments, step (ii) may further comprise dissolving the pre-treated organic waste in NaOH or KOH solution.

In some embodiments, the nickel-based anode is selected from the group consisting of porous nickel (hp-Ni/NF), nickel sulfide, nickel phosphide, nickel nitride and other multi-metal oxides, hydroxides, chalcogenides, pnictides, etc. or combinations thereof.

In some embodiments, the cathode is selected from the group consisting of platinum, nickel compounds such as nickel sulfide, nickel phosphide, $Ni_2P/NF$, nickel nitride, cobalt sulfide, cobalt phosphide, cobalt nitride, etc, or combinations thereof in various configurations. In some further preferred embodiments, the cathode is selected from $Ni_2P/NF$.

The presently disclosed method, as mentioned, comprises a step (ii) of introducing the pre-treated organic waste to a first compartment of an electrochemical cell, wherein the electrochemical cell comprises the first compartment containing a nickel-based anode, a second compartment containing a cathode, and an electrolyte. In some embodiments, the first and second compartment may be instead not separated. In other embodiments, the first compartment and second compartment are separated by an anion-exchange membrane. In some embodiments, the electrochemical cell in the disclosed method may contain only two electrodes, in other embodiments, the electrochemical cell in the disclosed method may further comprise a reference electrode.

In some embodiments, the electrolyte in the method disclosed herein may be selected from the group consisting of Group I metal hydroxides, Group II metal hydroxides, Group III metal hydroxides, ammonium hydroxides, and combinations thereof. In some further preferred embodiments, the electrolyte in the method disclosed herein is selected from the group consisting of NaOH or KOH.

The presently disclosed method of electrochemical conversion of organic waste to organic acid and hydrogen may be performed using an electrical potential derived from a stored energy source, or a renewable energy source. This is highly advantageous as conventional electrolysis methods are unable to work with renewable energy sources due to their instability in energy production. For example, solar energy sources may be hampered by cloud cover, or time of day. Wind energy sources may be hampered by lack of wind at the point in time. The presently disclosed method can work with all of the mentioned problems and is thus highly advantageous.

In some embodiments, the presently disclosed method may work with different renewable energy sources, wherein the renewable energy source is solar energy, wind energy, or hydro-power.

The presently disclosed method can also be implemented in a decentralised manner. Hence, the method may be applied in a system or plant near biomass collection points, waste treatment plants relating to sludge or shellfish biomass, lumber-processing factories relating to woody biomass, or seafood processing plants relating to shellfish biomass, for example. This thus further reduces the costs in transporting biomass to be treated.

In another aspect of the present disclosure, there is also provided an organic acid or hydrogen produced from the method disclosed herein.

EXAMPLES

Non-limiting examples of the invention and comparative examples will be further described in greater detail by reference to specific examples, which should not be construed as in any way limiting the scope of the invention.
Materials Ammonium chloride, nickel sulfate hexahydrate, copper sulfate, potassium hydroxide, potassium ferricyanide, formic acid, sodium sulfate, dichloromethane, kaolinite, chitin and ethyl acetate were purchased from Sigma-Aldrich. Sulfuric acid, hydrochloric acid, methanol and ethanol were purchased from VWR International. The VFA standard was purchased from IT Technologies Pte Ltd. Sodium hypophosphite monohydrate was purchased from Alfa Aesar, Ag/AgCl reference electrode (sat KCl) was purchased from CHI Instruments, Inc., and the reference electrode (Hg/HgO/1M KOH) was purchased from Shanghai Yueci Electronic Technology Co., Ltd. All chemicals were used as received without further purification. Deionised water (18 MΩ·cm) was used in all experiments.

Example 1: General Procedure

The proposed valorization of organic waste to small organic acids consists of two steps: mechanochemical solubilization and electrochemical reforming. Prior to mechanochemical solubilization, organic waste was centrifuged to remove the extra free water, or washed with tap water and dried.

Mechanochemical solubilization: Either wet or dried organic waste was ball milled with alkaline (e.g., sodium hydroxide) or acidic (e.g., kaolinite) catalysts with a ratio of 4 to 0.5 in a typical planetary ball mill at a speed ranging from 1000 rpm to 1800 rpm and time ranging from 2 to 6 hours, varying from different biomass sources. After ball milling process, the solubilized organics were well separated via simple centrifugation or filtration and could be further used as the anodic reactants in the later electrochemical reforming process.

Electrochemical reforming: The organics were further electrochemical oxidized to small organic acids with earth abundant metal-based catalysts (e.g., nickel, cobalt, iron, or their alloys) at the anode in the subsequent hybrid electrolysis; at the same time, hydrogen evolution reaction efficient catalyst (e.g., nickel phosphide, nickel nitride and nickel sulphide) was used as the cathode to generate green hydrogen.

A potential range of 1.3-2.1 V was adopted to tune the selectivity.

Example 1a: Sludge/Shrimp Shell Waste

The proposed valorization of sludge/shrimp shell waste to small organic acids consists of two steps: mechanochemical solubilization and electrochemical reforming. Prior to mechanochemical solubilization, sludge was centrifuged to remove the extra free water, while shrimp shell waste was washed with tap water and dried.

Mechanochemical solubilization: Either wet or dried sludge solid/shrimp shell waste was ball milled with alkaline (e.g., sodium hydroxide) or acidic (e.g., kaolinite) catalysts with a ratio of 4 to 0.5 in a typical planetary ball mill at a speed ranging from 1000 rpm to 1800 rpm and time ranging from 2-6 h, varying from different biomass sources. After ball milling process, the solubilized organics were well separated via simple centrifugation or filtration and could be further used as the anodic reactants in the later electrochemical reforming process.

Electrochemical reforming: The organics were further electrochemical oxidized to small organic acids with earth abundant metal-based catalysts (e.g., nickel, cobalt, iron, or their alloys) at the anode in the subsequent hybrid electrolysis; at the same time, hydrogen evolution reaction efficient catalyst (e.g., nickel phosphide, nickel nitride and nickel sulphide) was used as the cathode to generate green hydrogen. A potential range of 1.3-2.1 V was adopted to tune the selectivity.

Example 1b: Woody Biomass

First, woody biomass was processed to smaller pieces (sawdust) before the mechanochemical process. Then, sodium hydroxide was used as catalyst with wood sawdust at a 1:1 weight ratio in the ball mill machine. The ball mill speed was 1800 rpm with maximum temperature limited to 60° C. and milling duration was 6 hours. The mechanochemical process was performed at ambient temperature and pressure. After milling, centrifugation was done to obtain the woody biomass extract which was used in the subsequent electroreforming process. In the electrochemical step, a synthesized hierarchical porous nickel catalyst was used as the anode.

Example 2: Mechanochemical Disintegration of Organic Waste

The mechanochemical disintegration of organic waste was done in a planetary Emax (Retsch) ball miller with zirconium oxide balls. Organic waste and potassium hydroxide were loaded into a grinding jar with grinding balls and milled for 4 hours. After separation from the balls, the suspension was centrifuged to separate any undissolved fractions. Meanwhile, the solute was collected for later hybrid electrolysis.

Examples of mechanochemical disintegration of different types of organic waste follow below.

Example 2a: Mechanochemical Disintegration of WAS

The mechanochemical disintegration of WAS was done in a planetary Emax (Retsch) ball miller with zirconium oxide balls. Specifically, 6.0 g dry waste-activated sludge (WAS) (2% moisture) and 6.0 g potassium hydroxide were loaded into each grinding jar with 70% packing degree of grinding balls and milled under 1600 rpm for 4 hours. The temperature of the outer surface of the jars was controlled to not exceed 65° C. during the whole milling process by the machine built-in temperature controller. Finally, wet grinding at 500 rpm for 5 min by adding 30 mL DI water in each grinding jar were adopted to remove all the solids sticking on the balls and wall. After separation from the balls, the suspension was centrifuged to separate any undissolved fractions. Meanwhile, the solute was collected for later hybrid electrolysis. For the milling of WAS under wet condition, 12.0 g of wet WAS (4.3% TS) (centrifuged at 9500 rpm for 10 minutes) was added instead, while keeping all the other parameters the same. Mass content was normalised by the mass of dry WAS mass unless specified otherwise:

$$\text{Mass content (\%)} = \text{the mass of } (X)/\text{mass of dry WAS} \times 100\%$$

Carbon/phosphorus retention was calculated by the ratio of the mass of carbon/phosphorus in the effluent to that in the influent.

Characterisation of WAS after Ball Milling

Figure 2A:
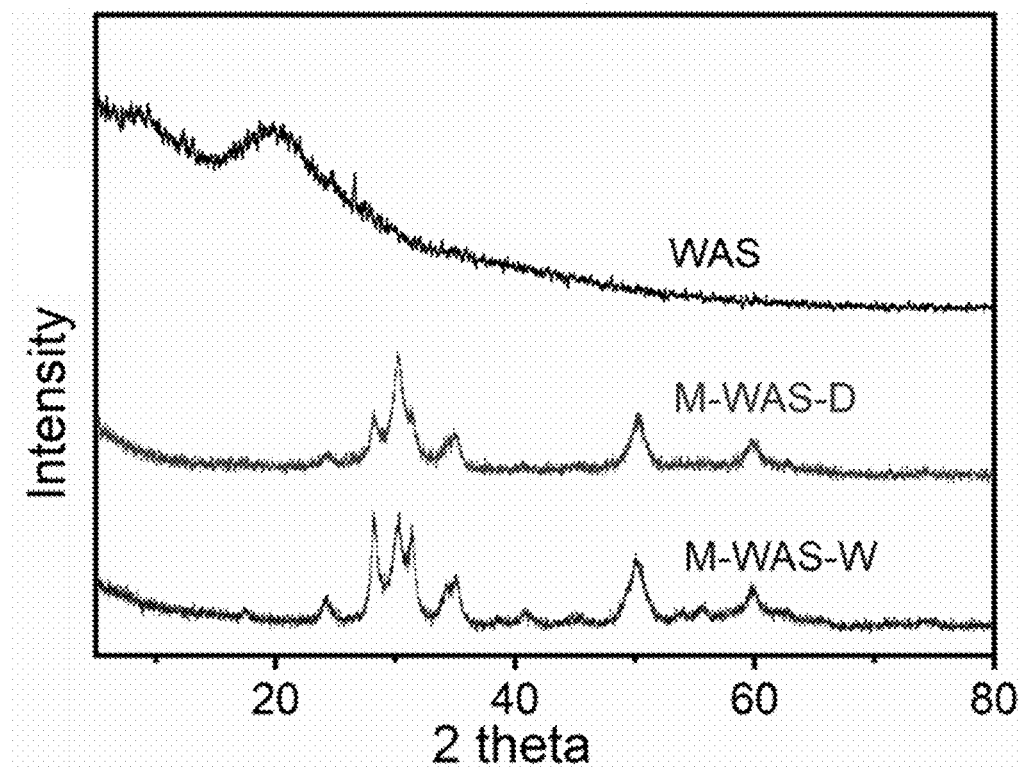
FIG. 2a is a graph showing the X-Ray Diffraction (XRD) spectra of WAS before and after ball milling under dry (M-WAS-D) and wet (M-WAS-W) conditions.

X-ray diffraction (XRD) patterns were first conducted to study the variation of crystalline structure of the WAS after ball milling. As shown in FIG. 2a, WAS shows no specific crystalline phase, with only one broad peak at around 17-27 degree, which is ascribed to amorphous carbon. After ball milling with potassium hydroxide at both wet (M-WAS-W) or dry conditions (M-WAS-D), the peak of amorphous carbon disappeared. The new peaks in M-WAS-W and M-WAS-D were ascribed to the removed zirconium oxide ($ZrO_2$) from balls during milling.

Figure 2B:
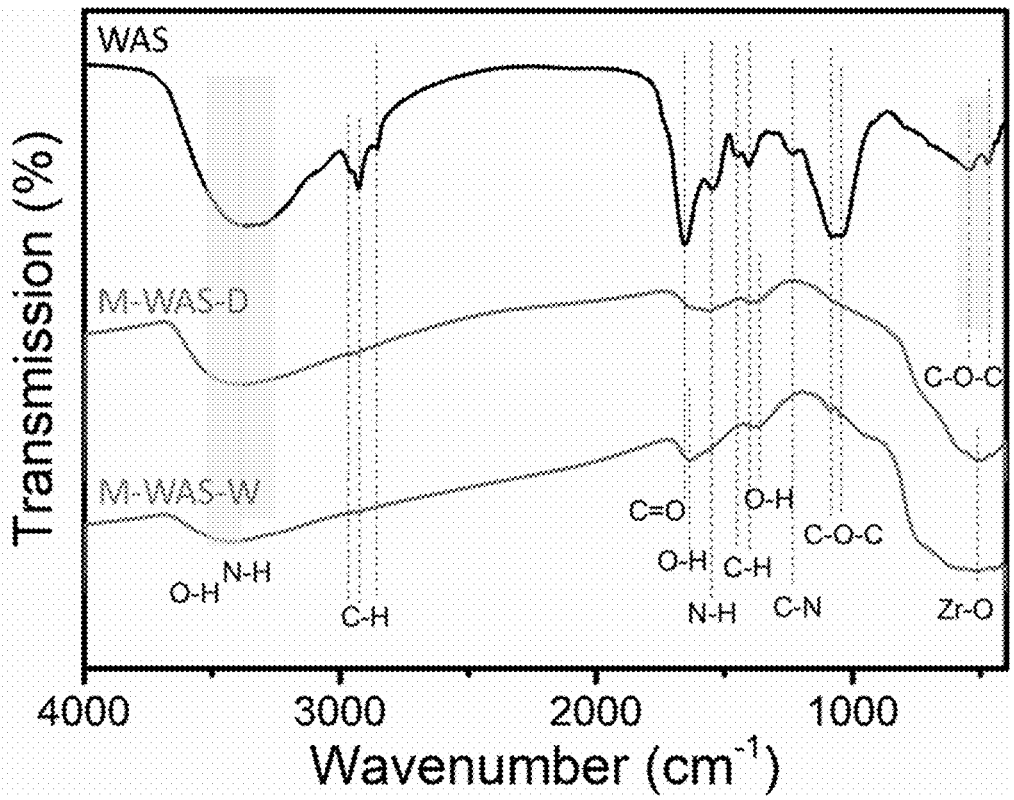
FIG. 2b depicts Fourier Transform-Infrared (FT-IR) spectra of WAS before and after ball milling under dry (M-WAS-D) and wet (M-WAS-W) conditions.

FTIR was employed to study the evolution of the functional groups during ball milling process. As depicted in FIG. 2b, WAS showed typical peaks of polysaccharides and proteinaceous materials, viz. O—H and N—H stretching ($3450 \text{ cm}^{-1}$-$3200 \text{ cm}^{-1}$), C—H asymmetric stretching ($2962 \text{ cm}^{-1}$ $2927 \text{ cm}^{-1}$) and symmetric stretching ($2858 \text{ cm}^{-1}$), amide I band [C=O stretching ($1658 \text{ cm}^{-1}$)], amide H band [N—H bending ($1550 \text{ cm}^{-1}$)], C—H bending (1450 and $1403 \text{ cm}^{-1}$), C—N stretching ($1225 \text{ cm}^{-1}$), asymmetric C—O—C stretching (1080 and $1035 \text{ cm}^{-1}$) and out-of-plane bending ($550\text{-}470 \text{ cm}^{-1}$) of pyranose rings. In contrast, only the peaks of O—H asymmetric stretching ($3436 \text{ cm}^{-1}$), O—H bending ($1635 \text{ cm}^{-1}$ and $1375 \text{ cm}^{-1}$) and Zr—O—Zr stretching ($505 \text{ cm}^{-1}$) appear in both wet ball milling (M-WAS-W) and dry ball milling (M-WAS-D) samples, while showing the disappearance of carbon related peaks. This observation suggested that full dissolution of organic matters was realised in the mechanochemical process.

CHNS element analysis was further performed to study the residue of carbon and nitrogen after milling process. Negligible amount of carbon and nitrogen were found in both M-WAS-W and M-WAS-D samples (FIG. 2c), which again suggests complete dissolution of WAS with negligible releasing of organic residue.

In order to quantify the conversion of WAS under ball-milling, WAS was dried to form dried WAS (D-WAS) and used as feed. The solubility of carbon was calculated by the ratio of dissolved carbon to that in the D-WAS. Under mechanochemical disintegration, the cells and flocs can be severely disrupted by the mechanical force along with the release of intracellular matters. Further, breaking down of particulate matter into soluble short-chain organics may be magnified significantly under alkaline conditions via mechanical forces. As such, more than 92% of organic carbon may be dissolved under KOH catalysis, comparable to the milling catalysed by sodium hydroxide (FIG. 2d). In this instance, potassium hydroxide (KOH) was chosen because of its high ion conductivity for efficient hybrid electrolysis and its unique role in biological metabolisms. Considering the high water content of WAS, it is appealing to ball mill WAS under wet conditions. Despite excess water reducing the effectiveness of ball milling, the susceptibility of WAS to mechanochemical disintegration and depolymerization over other stubborn biomass makes milling under wet conditions possible.

Figure 2E:
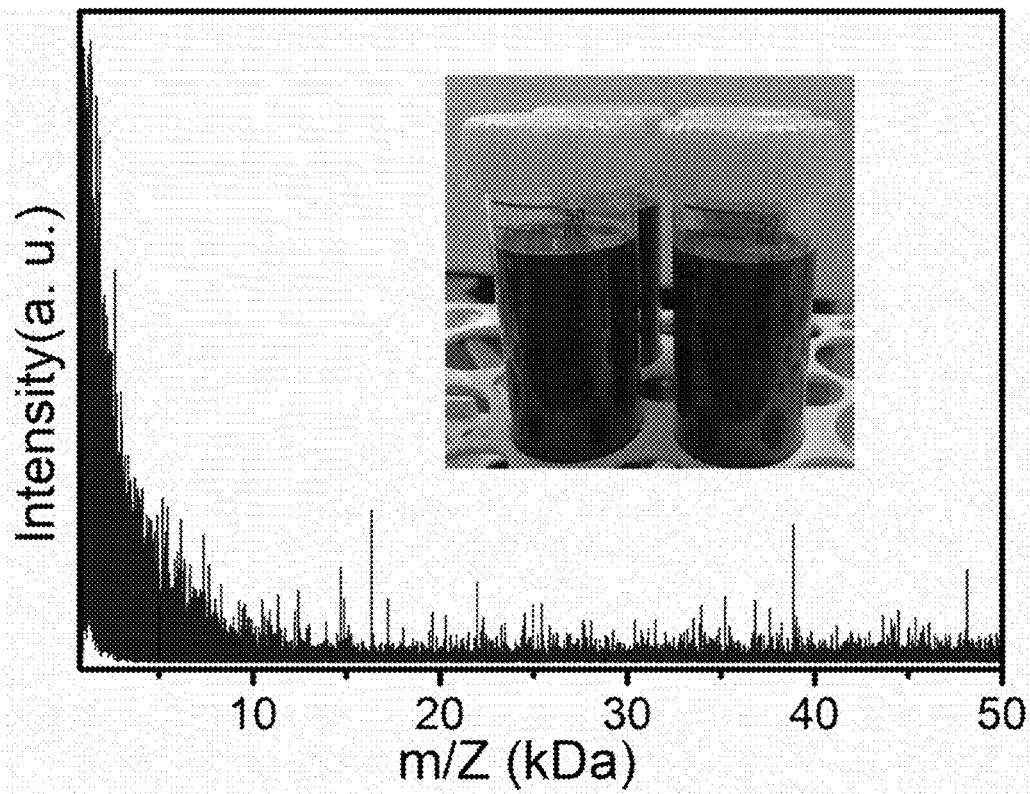
FIG. 2e is a Matrix Assisted Laser Desorption/Ionisation-Time of Flight-Mass Spectrometry (MALDI-TOF-MS) spectrum of M-WAS-S. Inset is a photo of a M-WAS-S sample.
Figure 2F:
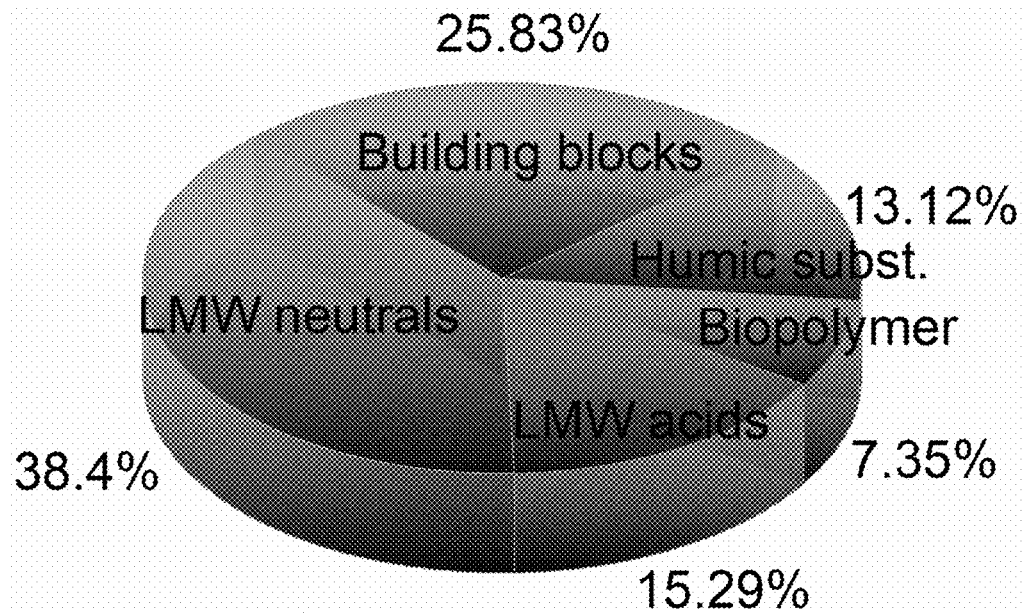
FIG. 2f is a chart showing the Size Exclusion Chromatography-Organic Carbon Detection-Organic Nitrogen Detection (SEC-OCD-OND) fractionation of a M-WAS-S sample.
Figure 3A:
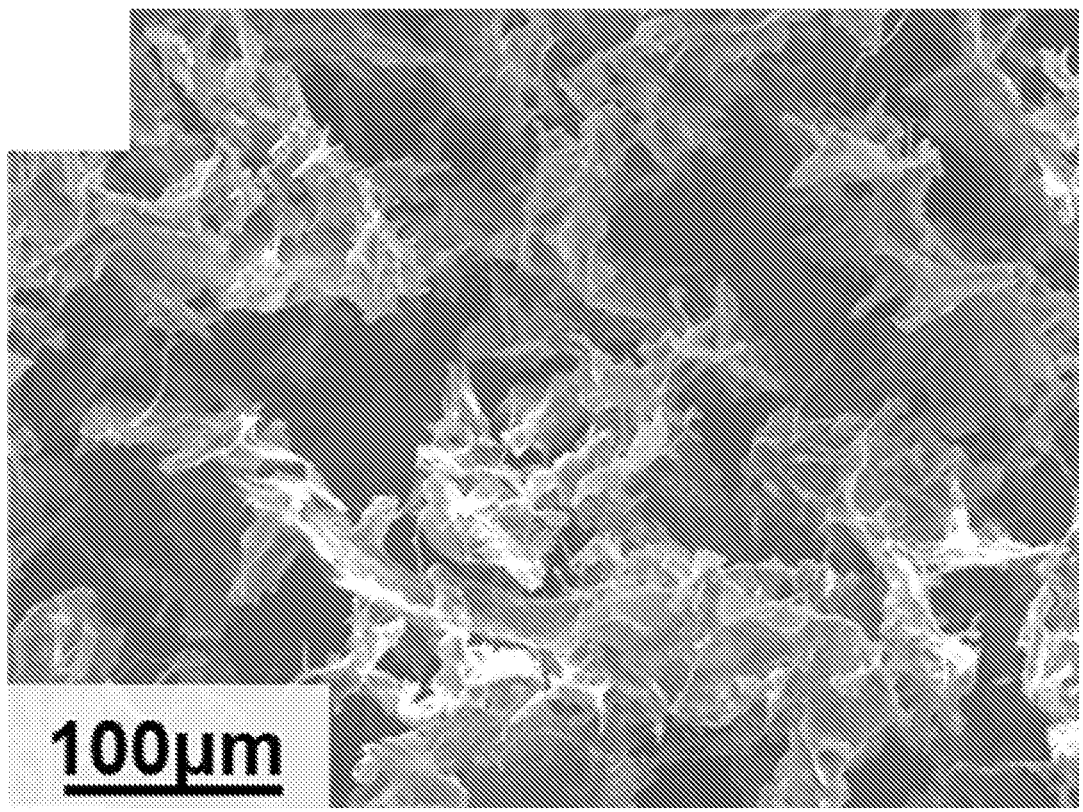
FIG. 3a is a Scanning Electron Microscopy (SEM) image of WAS taken at 100 µm.
Figure 3B:
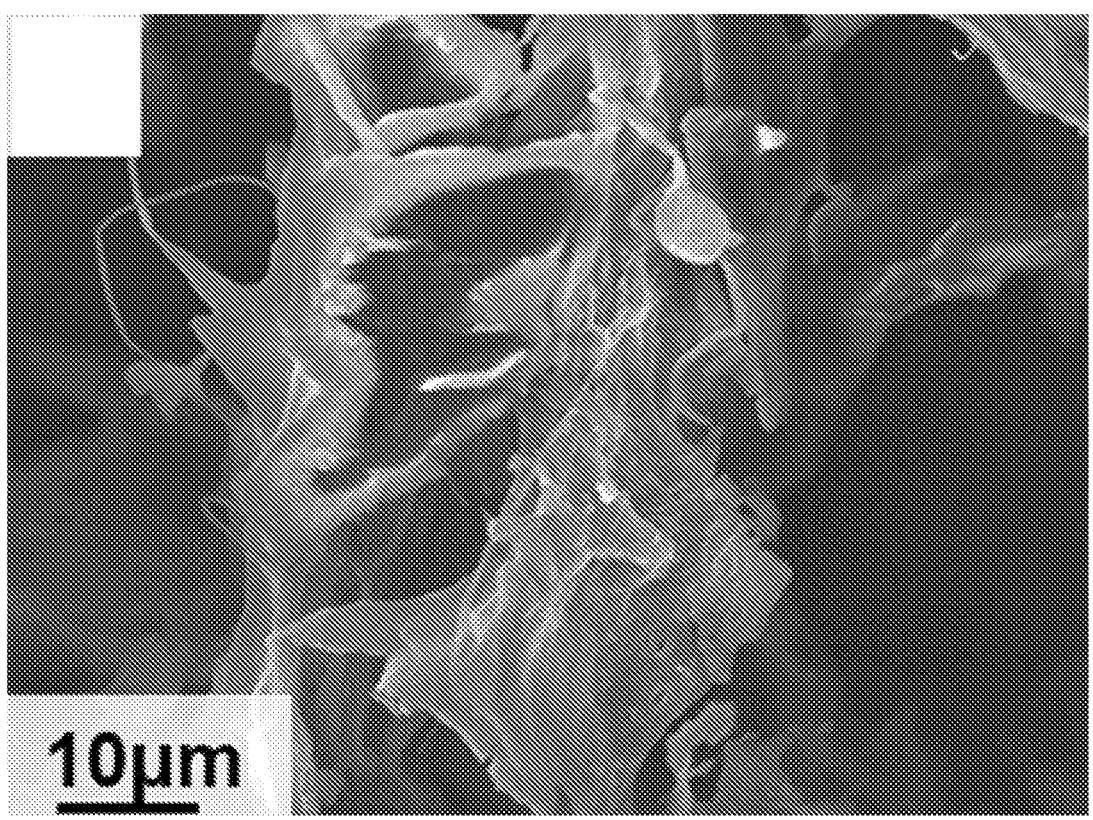
FIG. 3b is a SEM image of WAS taken at 10 µm.
Figure 3C:
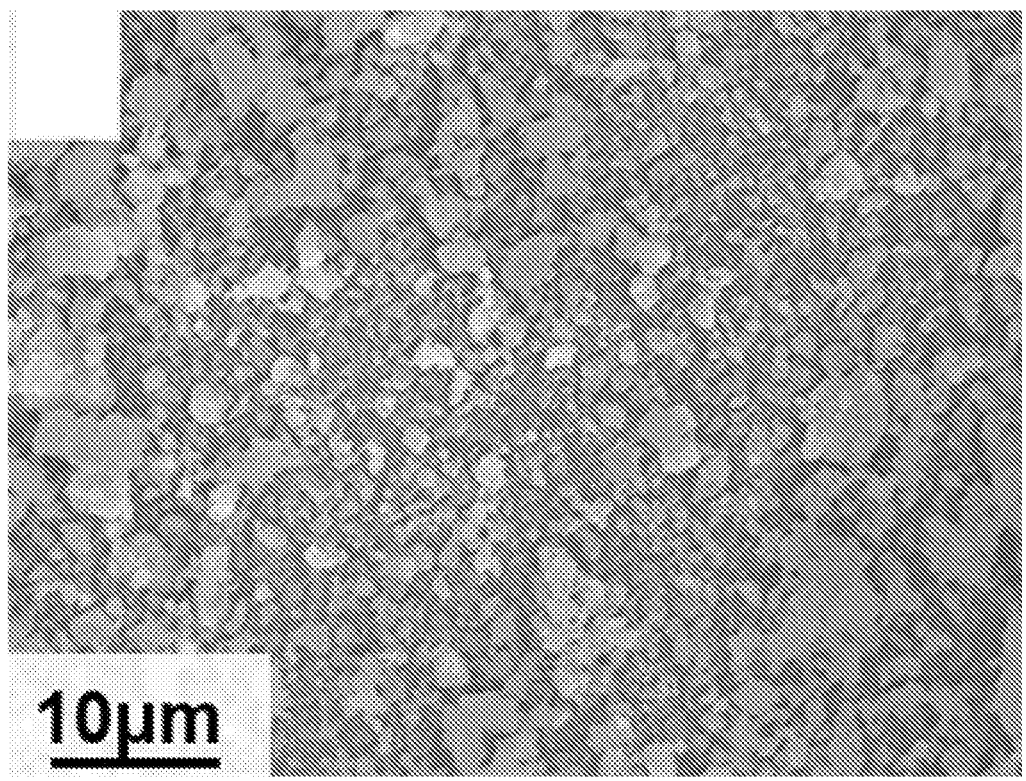
FIG. 3c is a SEM image of M-WAS-S taken at 10 µm.
Figure 3D:
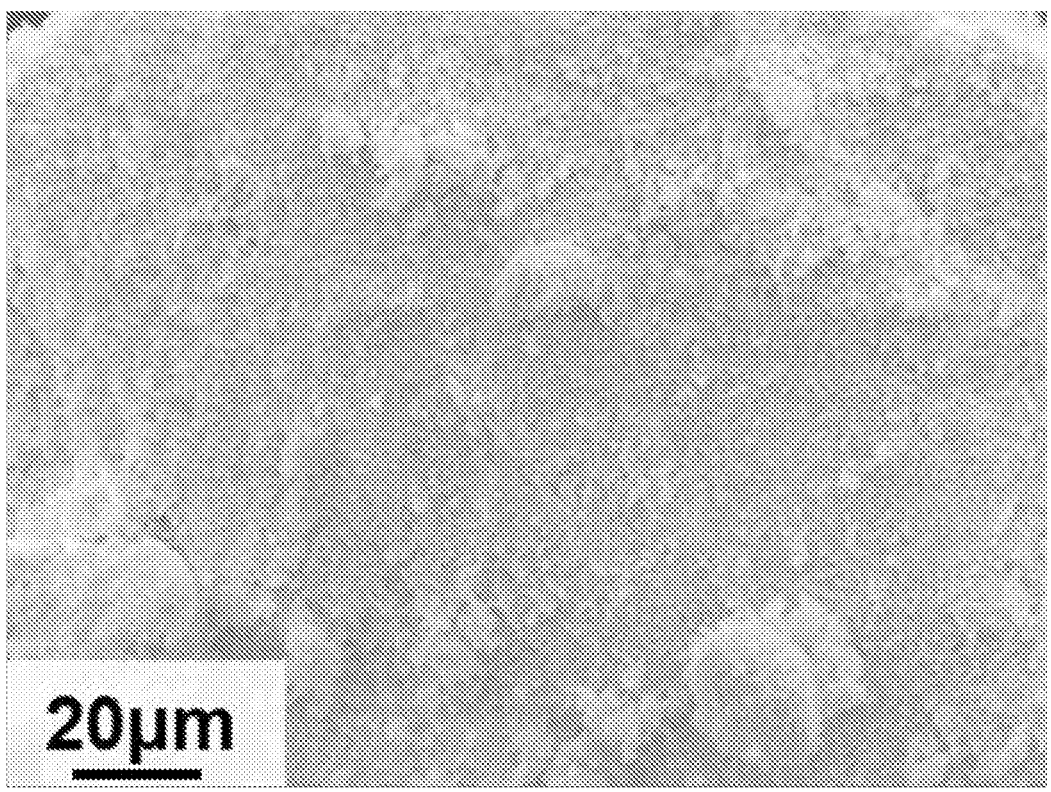
FIG. 3d is a SEM image of M-WAS-R taken at 20 µm.
Figure 3E:
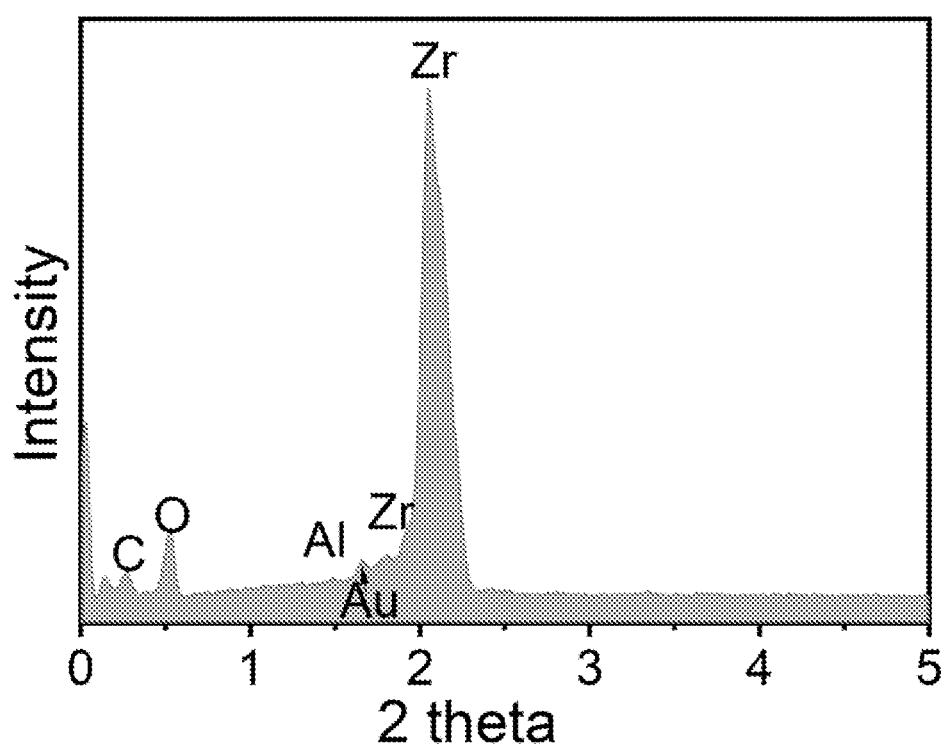
FIG. 3e is an electron diffraction spectroscopy (EDS) spectrum of M-WAS-R.
Figure 4:
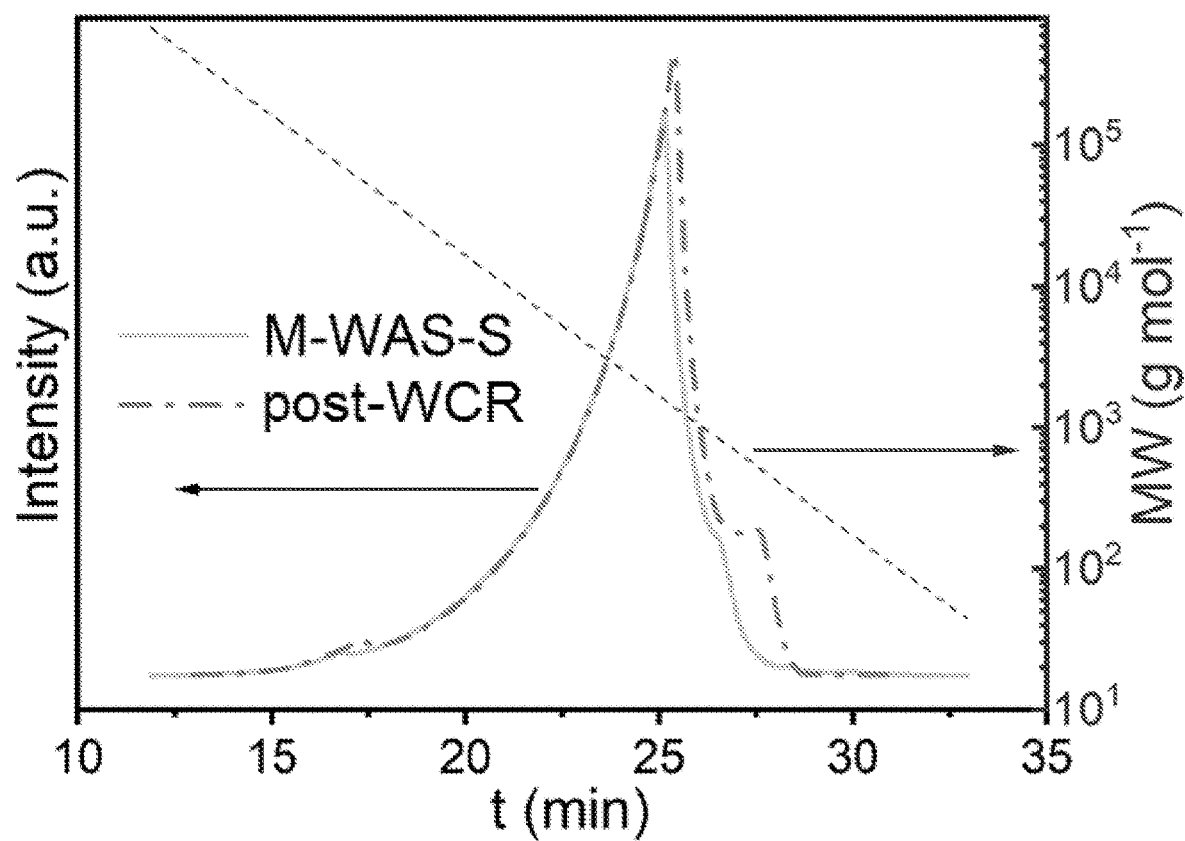
FIG. 4 is a graph showing the Gel Permeation Chromatography (GPC) spectra of M-WAS-S before and after electrochemical conversion.

The prominent dissolution effect of the WAS could also be witnessed by a great reduction in particulate size, which was observed using scanning electron microscopy (SEM) in FIG. 3a and FIG. 3b. In contrast to the thin-film morphology of raw WAS with a dimension of hundreds of micrometres (FIG. 3b), the M-WAS-S (FIG. 3c) and M-WAS-R (FIG. 3d) showed significant size reduction, and nanosized particles were observed. The electron diffraction spectroscopy (EDS) spectrum (FIG. 3e) showed negligible amount of carbon residue in M-WAS-R, which was consistent with the CHNS element analysis. To gain more insight into the molecules dissolved during mechanochemical process, MALDI-TOF-MS and SEC-OCD-OND were further adopted to analyse the molecular weight and functional groups. Despite the narrow detection range (up to 50 kDa), MALFI-TOF mass spectrum of M-WAS-S in FIG. 2e was able to show the complex polymeric structure of dissolved molecules. The domination of peaks less than 10 kDa demonstrates the occurrence of complex lysis of cells and breakdown of compounds, in well accordance with the Gel Permeation Chromatography (GPC) result (green curve in FIG. 4). It is noted that GPC analysis showed the existence of even larger molecules of over 100 kDa. According to the fractionation result of SEC-OCD-OND (FIG. 2f), LMW neutrals dominate the M-WAS-S with minor biopolymers remaining, in accordance with the MALDI-TOF-MS results.

Example 2b: Bag Milling of Woody Biomass

First, woody biomass was processed to smaller pieces (sawdust) before the ball-milling process. The collected waste wood as passed through a size reduction process with a hammer grinder, knife-mill or disk-mill. The dust-contaminated bark and leaves of the branch of Rain Tree was removed and sawed to produce the sawdust particles of around 300 microns.

The mechanochemical disintegration of the woody biomass was then done in a planetary Emax (Retsch) ball miller with zirconium oxide balls. Specifically, 3.0 g wood sawdust and 3.0 g sodium hydroxide were loaded into each 125 ml grinding jar with 70% packing degree of grinding balls and milled at 1800 rpm for 6 hours. 180 g of zirconia milling balls (0.5 mm diameter) were used. The temperature of the outer surface of the jars was controlled to not exceed 60° C. during the whole milling process by the machine built-in temperature controller. After milling, the ball-milled mixture was solubilised in 200 ml DI water and the suspension centrifuged at 9500 rpm for 10 minutes to obtain the supernatant woody biomass extract which was used in the subsequent electroreforming process.

Example 2c: Ball Milling of Chitin and Shrimp Shell Biomass

The mechanochemical disintegration of chitin was done in a planetary Emax (Retsch) ball miller with zirconium milling balls (0.5 mm diameter). Specifically, 3.0 g chitin and 6.0 g kaolinite (or alkaline catalysts, e.g., potassium hydroxide) were loaded into each 125 ml grinding jar with 70% packing degree of grinding balls and milled under 2000 rpm (1900 rpm for alkaline catalysts) for 6 hours. Zirconia milling balls (0.5 mm diameter) were used. The temperature of the outer surface of the jars was controlled to not exceed 65° C. during the whole milling process by the machine built-in temperature controller. After milling, the ball-milled mixture was solubilised in 100 ml DI water and the suspension centrifuged at 9000 rpm for 5 minutes to obtain the supernatant chitin biomass extract which was used in the subsequent electroreforming process. The precipitated kaolinite was recycled and further reused in future ball-milling experiments.

Regarding the ball milling of shrimp shell biomass, glass shrimps (*Caridina heteropoda*) were bought from a local supermarket and their shells peeled off and collected. The shells (no flesh residue) were air-dried and ground to powder with a blender. Prior to ball-milling, the shells were quantified to confirm the content of chitin, $CaCO_3$ and protein as that of literature.

Subsequently, the mechanochemical disintegration of shrimp shell biomass was then done in a planetary Emax (Retsch) ball miller with zirconium milling balls (0.5 mm diameter). Specifically, 6.0 g powdered shrimp shells and 6.0 g kaolinite (or alkaline catalysts, e.g., potassium hydroxide) were loaded into each 125 ml grinding jar with 70% packing degree of grinding balls and milled under 2000 rpm (1900 rpm for alkaline catalysts) for 6 hours. The temperature of the outer surface of the jars was controlled to not exceed 65° C. during the whole milling process by the machine built-in temperature controller. After milling, the ball-milled mixture was solubilised in 100 ml DI water and the suspension centrifuged at 9000 rpm for 5 minutes to obtain the supernatant shrimp shell biomass extract which was used in the subsequent electrochemical conversion process.

Figure 5A:
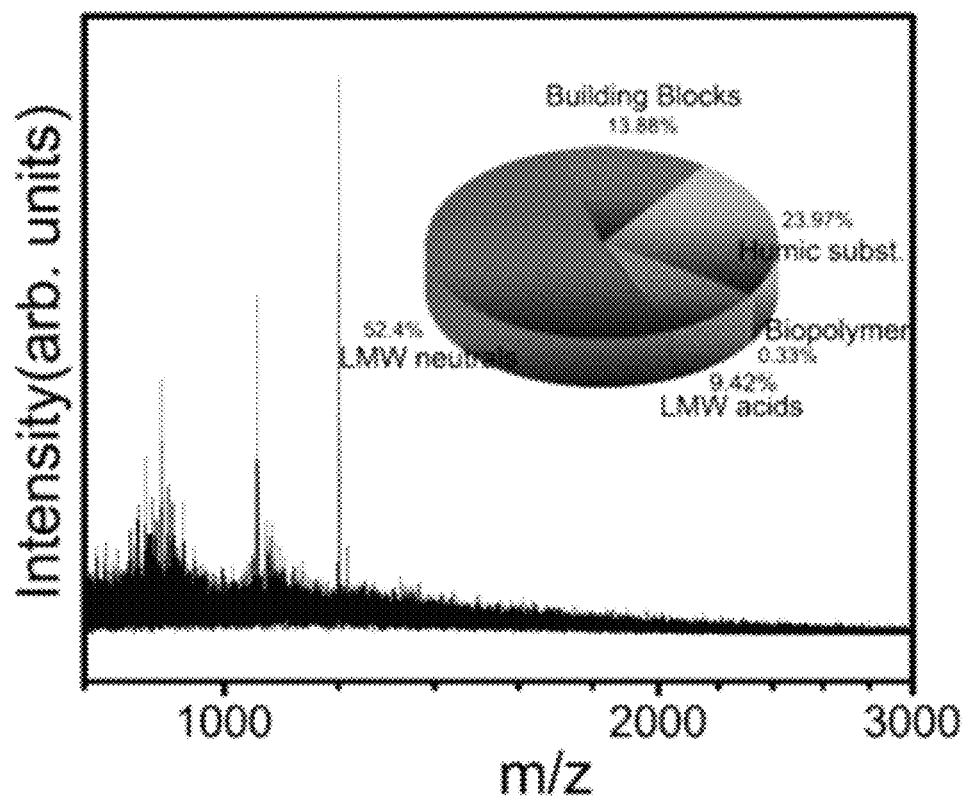
FIG. 5a is a graph showing the MALDI-TOF-MS spectrum of the soluble products from ball-milling shrimp shell biomass. Inset shows the fractionation of the soluble products from ball-milled shrimp shell biomass.

Characterisation of Shrimp Shell Biomass after Ball-Milling $CaCO_3$ remained insoluble after ball milling and was removed by a simple filtration after dispersing the products in water. While the remaining ~71 wt % mass (mainly protein and chitin) underwent partial depolymerization and amorphization under the mechanochemical treatment and then dissolved in water. The MALD-ITOF-MS result (FIG. 5a) Showed that the Molecular Weight of the Dissolved Section mainly locates in the range of 800-1300 Da, while the results from size exclusion chromatography coupled with organic carbon detection and organic nitrogen detection (SEC-OCD-OND) (see the inset of FIG. 5a) demonstrated that the main categories of the dissolved section were humic substance and low molecular weight polysaccharide.

Example 3: Electrode Fabrication and Activation

3D Hierarchically porous Ni on nickel foam (hp-Ni/NF) anode was fabricated following previous work with modifications. Specifically, pre-shaped Ni foam (0.5 cm*0.5 cm*0.3 cm) was washed in 1.0 M HCl aqueous solution and ethanol in sequence, and then used as the working electrode in a two-electrode configuration to electrodeposit Ni particles. A platinum (Pt) wire was used as the counter electrode. A mixture solution of 2.0 M $NH_4Cl$ and 0.1 M $NiSO_4$ was used as the electrolyte, and the electrodeposition was conducted with a constant current density of 2 A $cm^{-2}$ for 500 seconds to form the porous hp-Ni/NF catalyst.

To increase the HER activity, the porous hp-Ni/NF catalyst was further phosphorised under a $PH_3$ atmosphere to fabricate a $Ni_2P$/NF cathode. Specifically, the hp-Ni/NF catalyst was placed at the centre of a quartz tube furnace, with 1.0 g of $NaH_2PO_2 \cdot H_2O$ placed upstream near the hp-Ni/NF catalyst. After the furnace was purged with argon, it was heated up to 400° C. at a ramping rate of 10° C. $min^{-1}$ and kept at the same temperature for 2 hours. Finally, it was naturally cooled down to room temperature, and the $Ni_2P$/NF cathode was obtained.

The preparation of Cu—Ni/CF alloy catalysts was performed following previous work with modifications. Specifically, the co-electrodeposition of Ni and Cu on Cu foam was conducted at −1.7 V vs. Ag/AgCl for 20 minutes with a three-electrode system, where Cu foam, Ag/AgCl (sat. KCl) and Pt wire were used as working, reference, and counter electrodes, respectively. And 0.05 M $H_2SO_4$ solutions containing 10 mM $CuSO_4$ and 10 mM $NiSO_4$ was used as the electrolyte. After electrodeposition, the Cu—Ni/CF electrodes were further rinsed with DI water and dried with $N_2$. All the electrodes were kept at vacuum condition prior to usage.

The hp-Ni/NF anode was activated by running the electrode at a constant current density of 50 mA $cm^{-2}$ until a stable Oxidative Electrochemical Reaction (OER) performance was reached. During activation, the hp-Ni/NF electrode was used as the working electrode, and a Pt wire acted as the counter electrode. An Ag/AgCl (sat. KCl) electrode served as the reference electrode, which was calibrated with potassium ferricyanide prior to each usage. Hydrogen bubbles evolving at cathodic potential via HER during electrodeposition are responsible for the porous structure.

The $Ni_2P$/NF cathode was instead directly used for cathodic hydrogen generation after phosphidation.

Example 4: Electrode Characterisation

Scanning electron microscopy and element mapping were conducted on an FESEM 7800F. X-ray diffraction patterns were recorded on a Shimadzu XRD-6000. The X-ray photoelectron spectroscopy analyses were performed using a Kratos Axis Supra Spectrophotometer. X-ray photoelectron spectra were collected using the monochromatic Al Kα source (1,486.7 eV) at a 300×700 μm² spot size. Low resolution survey and high-resolution region scans at the binding energy of interest were collected for each sample. To minimize charging, all samples were flooded with low-energy electrons and ions from the instrument's built-in charge neutralizer. The samples were also sputter cleaned inside the analysis chamber with 1 keV $Ar^+$ ions for 30 seconds to remove adventitious contaminants and surface oxides. All XPS data were fitted using Shirley background together with Gaussian-Lorentzian function using CASA XPS software, and energy corrections were calibrated by referencing the C is peak of adventitious carbon to 284.8 eV.

Figure 6A:
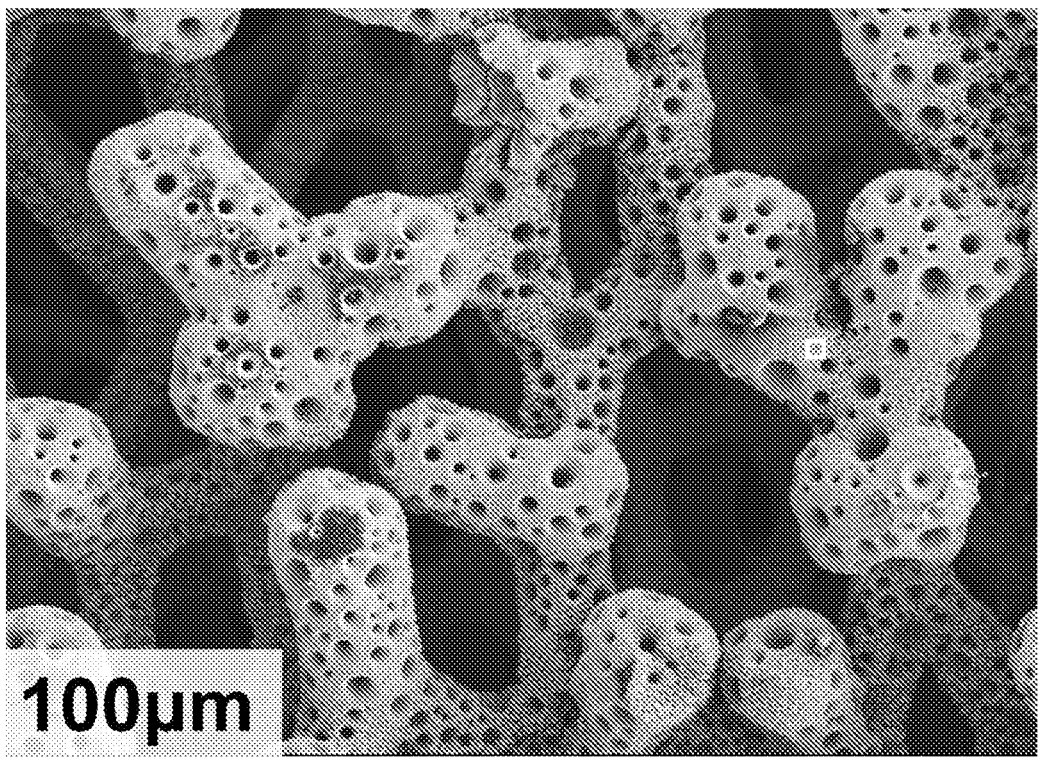
FIG. 6a is a SEM image of synthesised hp-Ni/NF electrode.
Figure 6B:
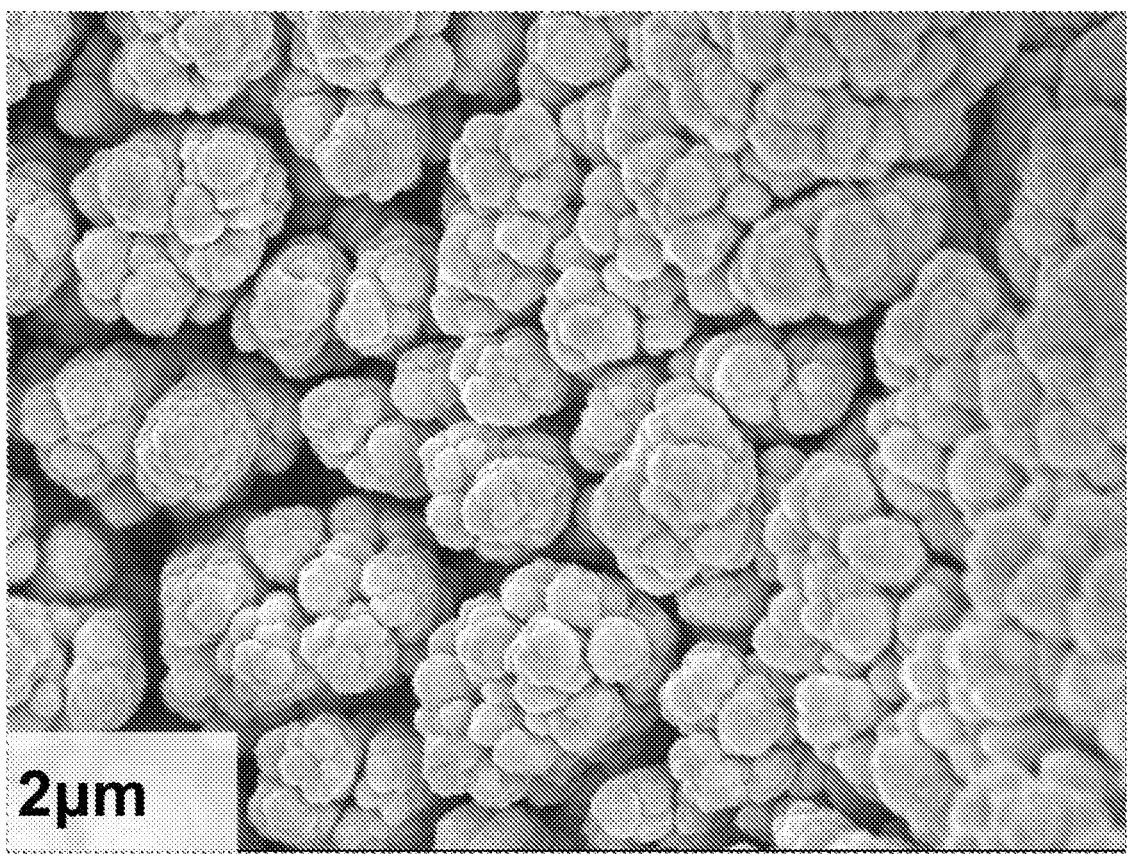
Figure 6C:
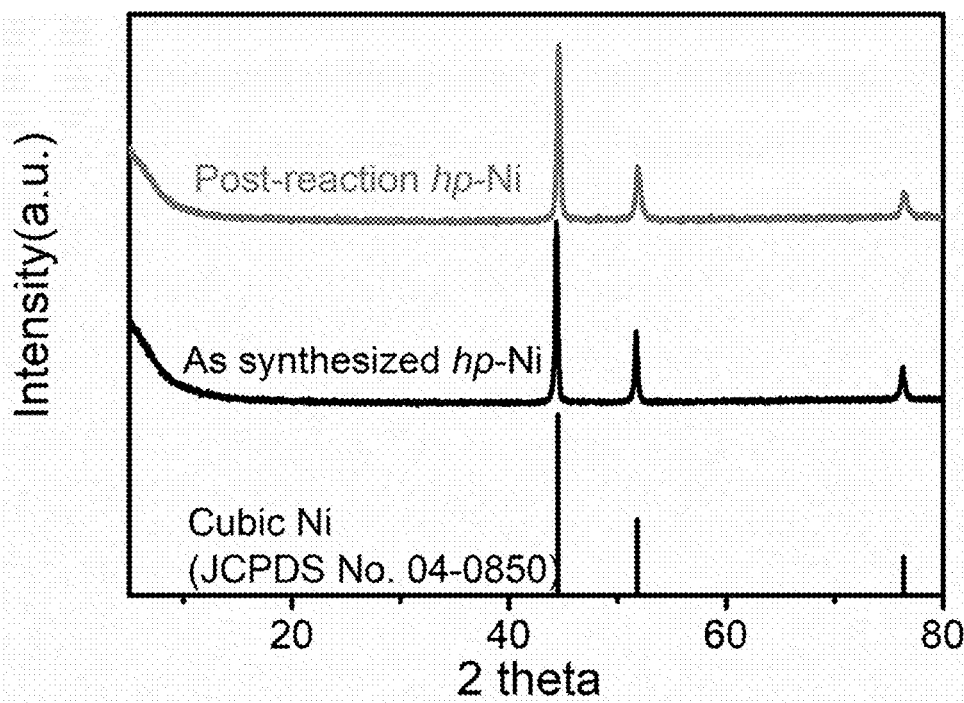
FIG. 6c is a graph showing the XRD patterns of the as-synthesised hp-Ni/NF electrode, the same electrode after electrochemical conversion of organic waste and the standard reference of cubic Ni.
Figure 7:
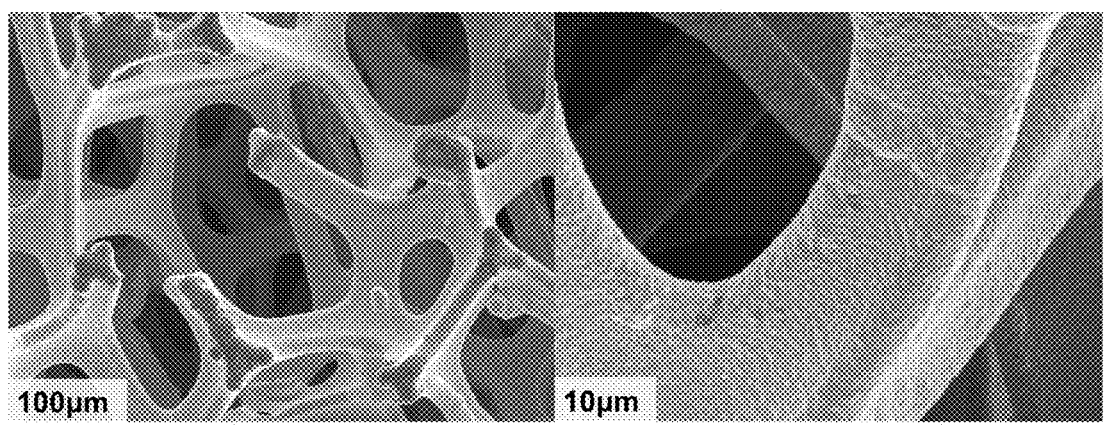
FIG. 7 are SEM images of Ni foam substrate at different magnifications.
Figure 8A:
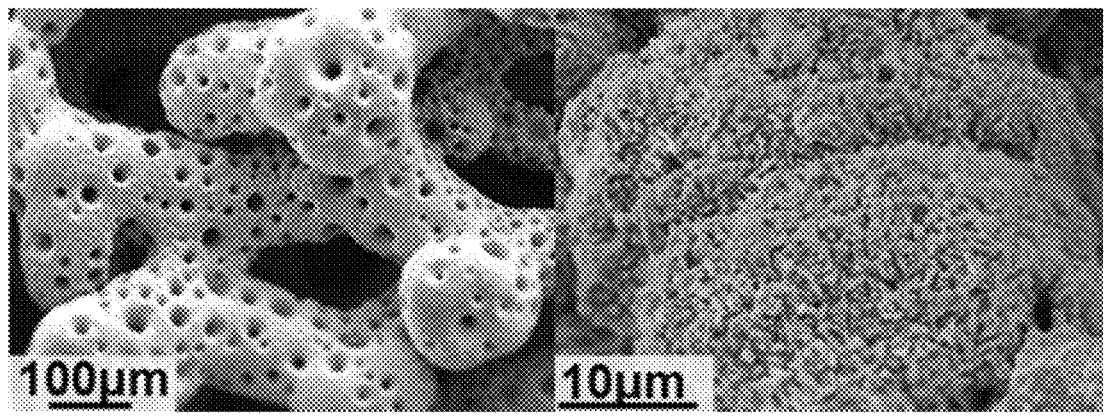
FIG. 8a are SEM images of the as-synthesised $Ni_2P$/NF electrode at different magnifications.
Figure 8B:
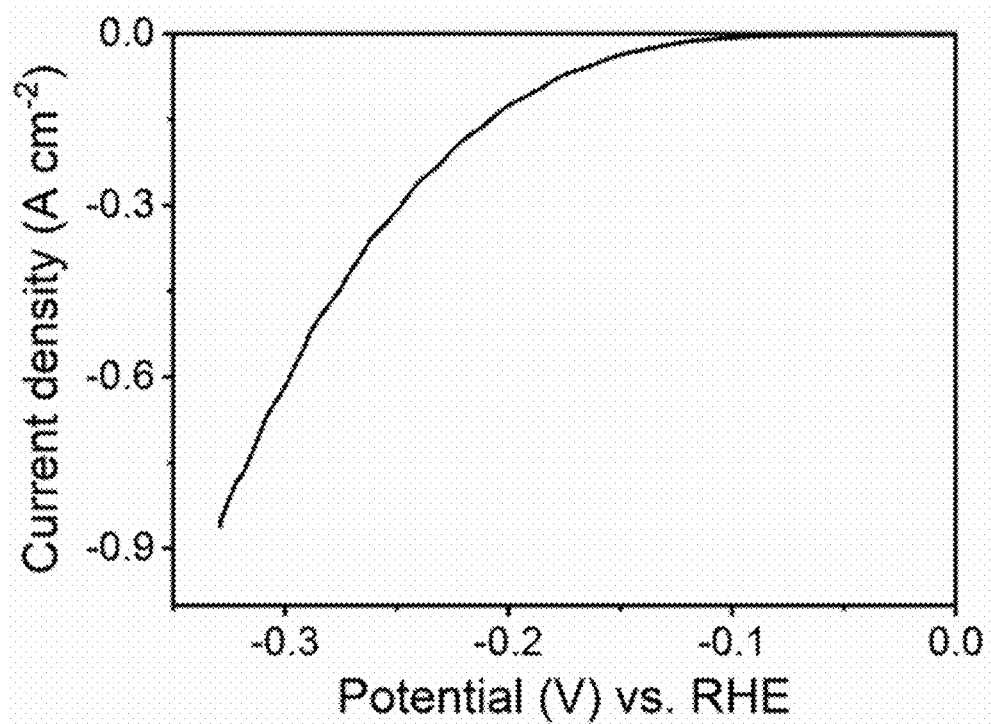
FIG. 8b is a graph showing the LSV curve of $Ni_2P$/NF electrode during the hydrogen evolution reaction (HER).

A typical SEM image of hp-Ni/NF in FIG. 6a shows the retaining of the skeleton of NF (FIG. 7), but its surface was much rougher than that of NF. The enlarged view of the orange square in FIG. 6a shows the loosely stacked nickel nanoparticles on the surface, as presented in FIG. 6b. Overall, hp-Ni/NF exhibited 3D hierarchically porous structure with pore size ranging from nanometres to millimetres. The NF skeleton had many pores with sizes ranging from micrometers to millimeters, and the porous microspheres also had numerous pores with sizes ranging from a few to tens of micrometers. As a result, the hp-Ni/NF electrode has a well defined hierarchically porous structure with pore size ranging from nanometers to millimeters (see FIG. 7). As a consequence, mass transport and gas diffusion can be greatly promoted and large amount of active sites can be exposed, which is critical for WAS conversion. The metallic nature was confirmed by XRD pattern [the middle black curve (as-synthesised hp-Ni/NF) in FIG. 6c], that showed the cubic Ni phase (JCPDS card No. 04-0850). This monolithic structure can endow the hp-Ni/NF electrode with high stability and excellent electrical conductivity. Thus, superior monolithic robustness and electrical conductivity is expected. Though hp-Ni/NF is a good choice for biomass oxidation, the HER performance of hp-Ni/NF is mediocre. Thus, phosphidation was conducted to prepare $Ni_2P/NF$ for cathode (see FIGS. 8a and 8b). It was noted that the $Ni_2P/NF$ exhibited superior HER activity, with overpotential of only 285 mV to reach current density of 500 mA $cm^{-2}$.

Example 5: Electrochemical Conversion of Ball-Milled Organic Waste

The electrochemical conversion of ball-milled organic waste using an electrochemical system is examined. The system is based on an alkaline water electrolyzer (AWE), where two compartments can be separated via an anion-exchange membrane. A nickel-based electrode was used as the anode to valorize organic waste (mostly polysaccharides and humic substances) to volatile organic acids (VFA), while a hydrogen evolution reaction (HER) efficient catalyst was used as cathode to reduce water to produce hydrogen.

Examples of electrochemical conversion of different types of organic waste follows below.

Example 5a: Electrochemical Conversion of M-WAS-S

The electrochemical conversion of M-WAS-S using an electrochemical system was performed. A nickel-based electrode was used as the anode to convert M-WAS-S (mostly polysaccharides and humic substances) to volatile organic acids (VFA), while a hydrogen evolution reaction (HER) efficient catalyst was used as cathode to reduce water to produce hydrogen.

Specifically, 1.0 M KOH aqueous solution was chosen as the basic electrolyte. The electrooxidation process was performed on a Bio-logic vsp-300 electrochemical workstation with a three-electrode glass cell configuration at room temperature. The hp-Ni/NF electrode was used as the working electrode, $Ni_2P/NF$ or Pt wire was employed as the counter electrode, and Ag/AgCl (sat. KCl) electrode served as the reference electrode. The reference electrode was calibrated with potassium ferricyanide prior to each usage.

All newly synthesised hp-Ni/NF electrodes were activated via anodization with a constant current density of 100 mA $cm^{-2}$ until a stable oxygen evolution reaction (OER) performance was obtained. After the electrochemical activation process, the hp-Ni/NF electrode was used as the anode to electrooxidize the M-WAS-S. All of the scan rates were set at 10 mV $cm^{-2}$. All the potentials reported were converted from vs. Ag/AgCl to vs. RHE (reversible hydrogen electrode) by adding a value of 0.197+0.059*pH. The 85% iR compensation was applied with R obtained from EIS measurement to account for the parasitic Ohmic loss.

5 g $L^{-1}$ and 1 g $L^{-1}$ of the solute from M-WAS-S were used for Linear Sweep Voltammetry (LSV) experiment and chronoamperometry (CA) experiment respectively.

Linear Sweep Voltammetry

Figure 6D:
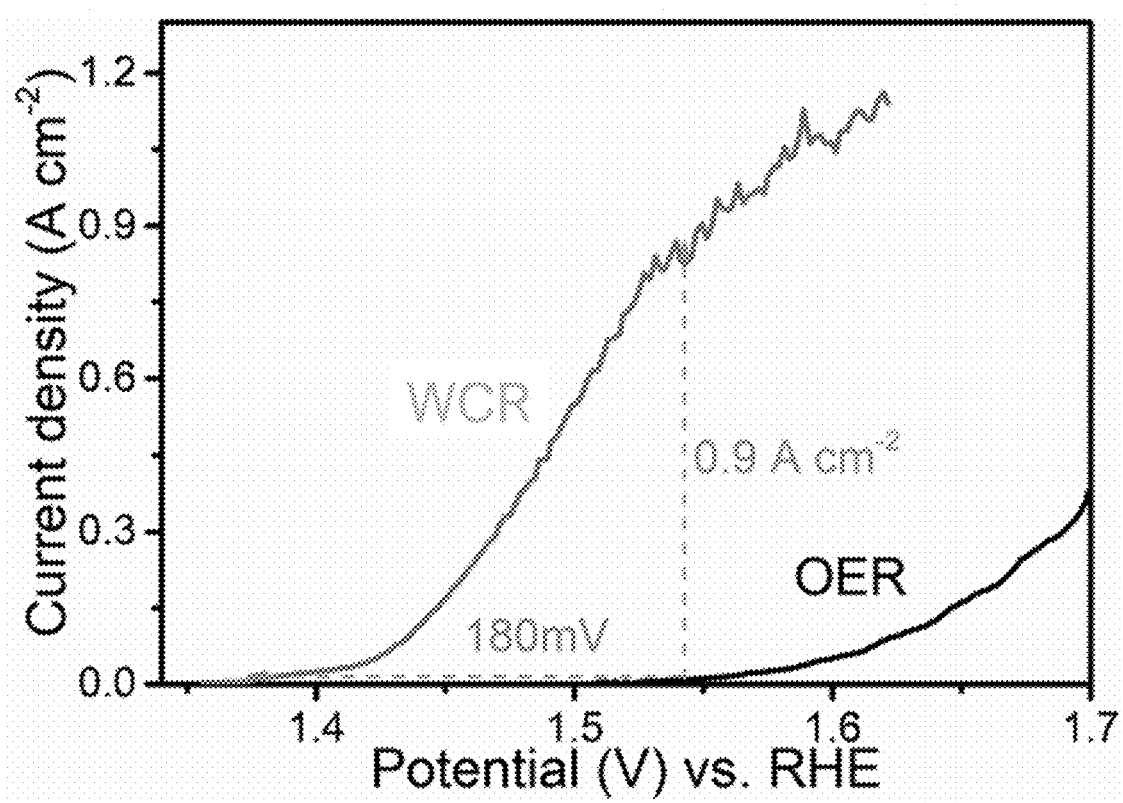
FIG. 6d is a graph showing the LSV curves of hp-Ni/NF anode in the presence of M-WAS-S (WCR) and absence of M-WAS-S(OER).

FIG. 6d depicts the typical linear sweep voltammetry (LSV) curves of WAS conversion reaction (WCR) and oxygen evolution reaction (OER) at the scan rate of 10 mV $s^{-1}$ in 1.0 M KOH, using hp-Ni/NF in 1.0 M KOH with (WCR) and without (OER) adding of 5 g $L^{-1}$ of M-WAS-S.

In the absence of M-WAS-S, the hp-Ni/NF exhibited an onset potential of ~1.54 V vs. RHE. After adding M-WAS-S, near 180 mV negative shift of onset potential and much faster increase of current density were observed, implying that WCR was both thermodynamically and kinetically more favourable than OER. Particularly, WCR exhibits more than 0.9 A $cm^{-2}$ current density at the onset potential of OER. As a result, the hybrid electrolysis comprising the conversion of sludge at the anode saves 11% energy than conventional AWE.

Chronoamperometry

Figure 6E:
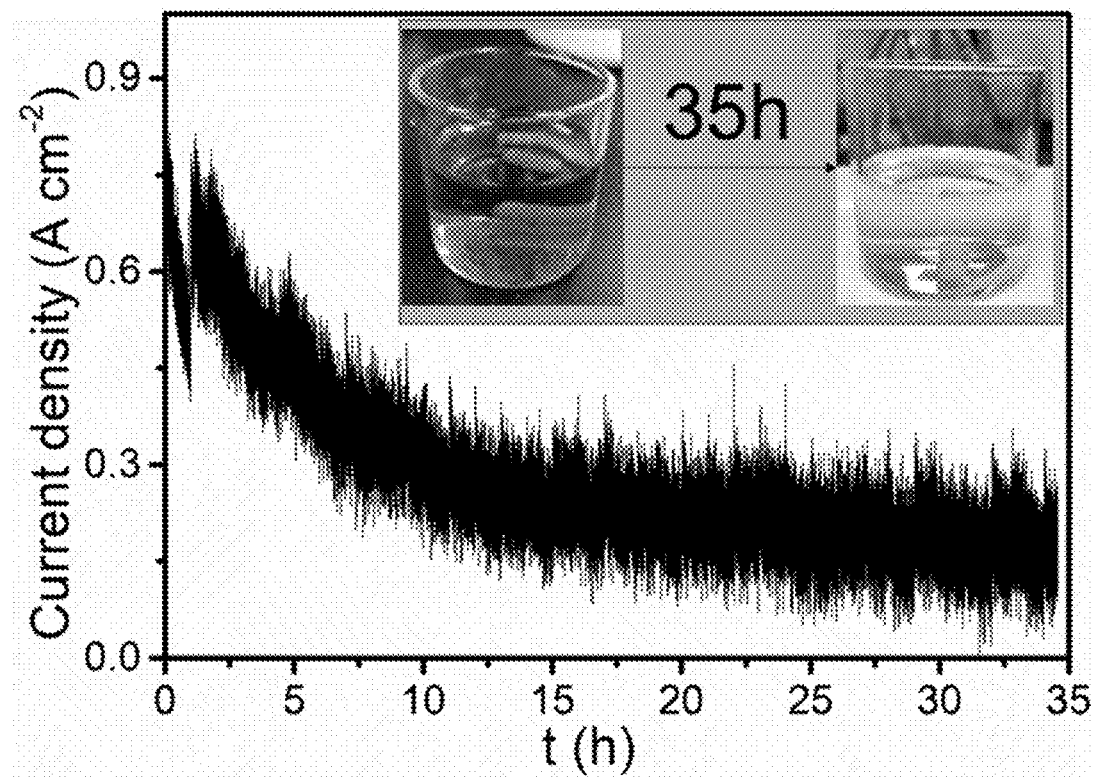
FIG. 6e is a graph showing the chronoamperometry (CA) curve of the electrochemical conversion of M-WAS-S. Inset are photos of M-WAS-S before and after electrochemical conversion.

Long-term chronoamperometry (CA) was conducted at constant potential of 1.55 V vs. RHE to achieve the complete conversion of 1 g $L^{-1}$ of M-WAS-S, as shown in FIG. 6e.

An overall decreasing trend of current density was observed, indicating the gradual consumption of the reactant. The initial increase of current density could be due to the initial depolymerisation and hydrolysis. Moreover, the inset of FIG. 6e shows the obvious fading of colour during reaction.

Stability of hp-Ni/NF

The stability of the hp-Ni/NF anode is critical for practical applications, so it was assessed via long-term and repetitive cycles of M-WAS-S conversion reactions (WCR).

Figure 6F:
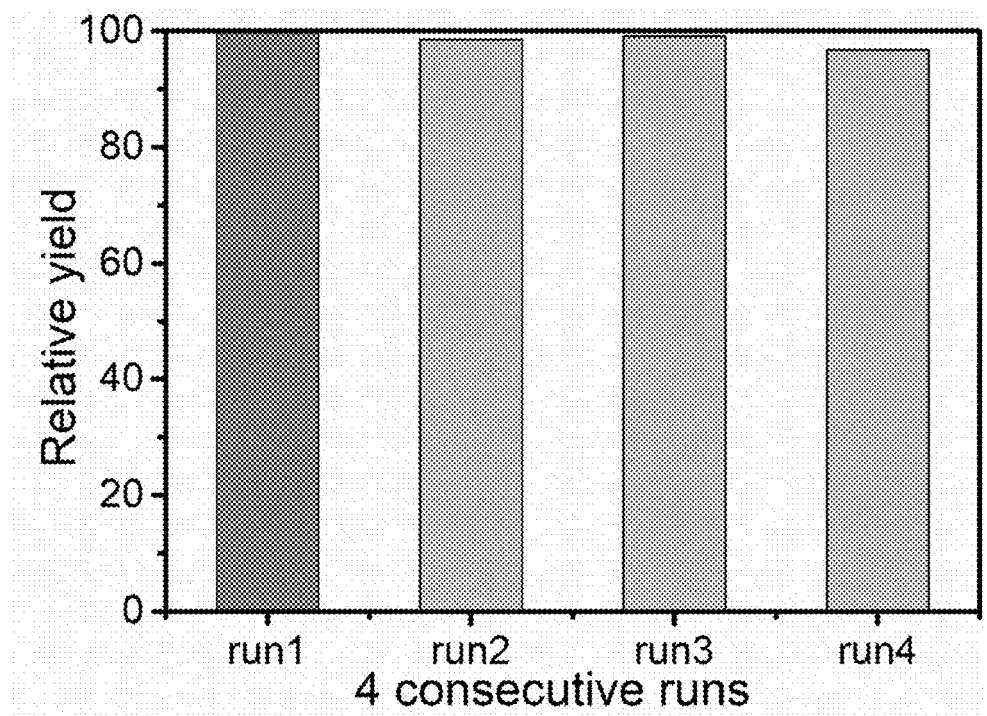
FIG. 6f is a graph showing the relative yield of organic acid in four consecutive electrochemical conversion reactions of M-WAS-S.

The effectiveness of hp-Ni/NF was studied for four consecutive runs and the yield of acetic acid was plotted as shown in FIG. 6f. The relative yield of organic acid in four consecutive runs of were performed using the same anode in 1.0 M KOH with 1 g $L^{-1}$ the soluble products from M-WAS-S at constant potential of 1.55 V vs. RHE, with the yield of first run set to standard (100%).

Figure 6G:
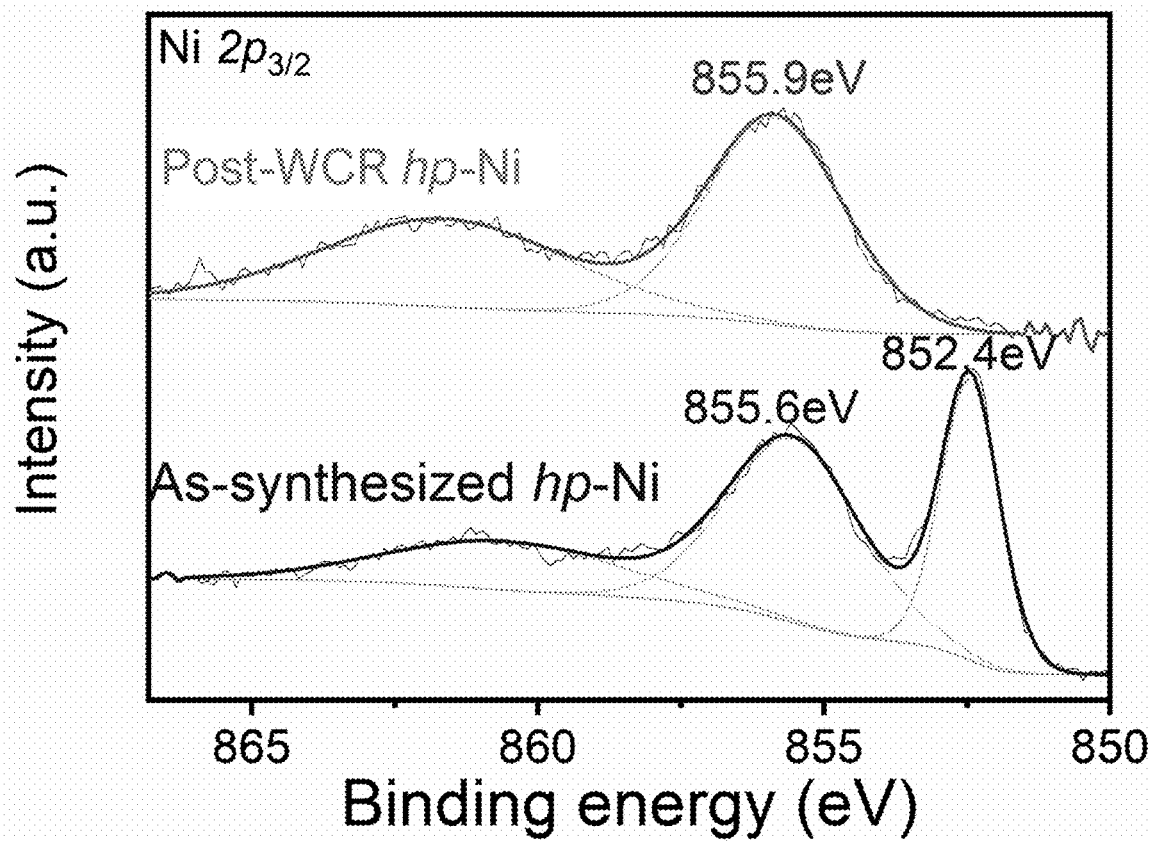
FIG. 6g is a graph showing the X-ray Photoelectron Spectroscopy (XPS) spectrum of Ni 2p state of the hp-Ni/NF anode before and after WCR.
Figure 6H:
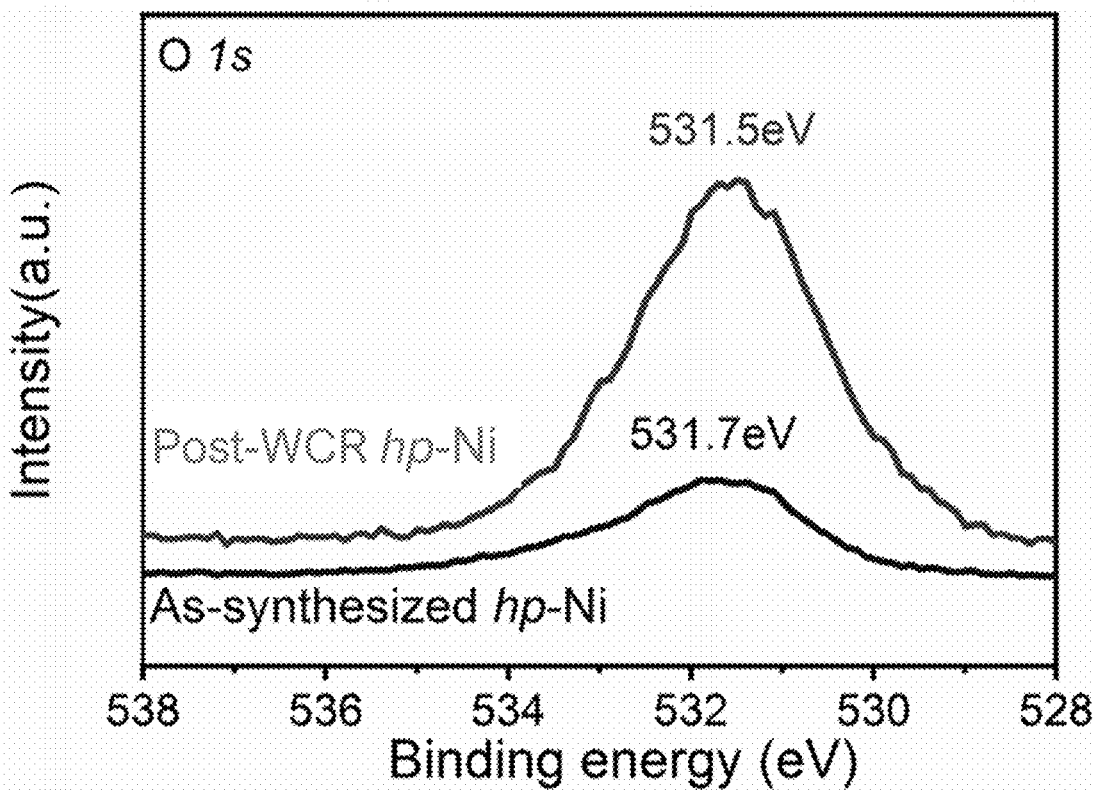
FIG. 6h is a graph showing the XPS spectrum of O 1s state of the hp-Ni/NF anode before and after WCR.
Figure 9:
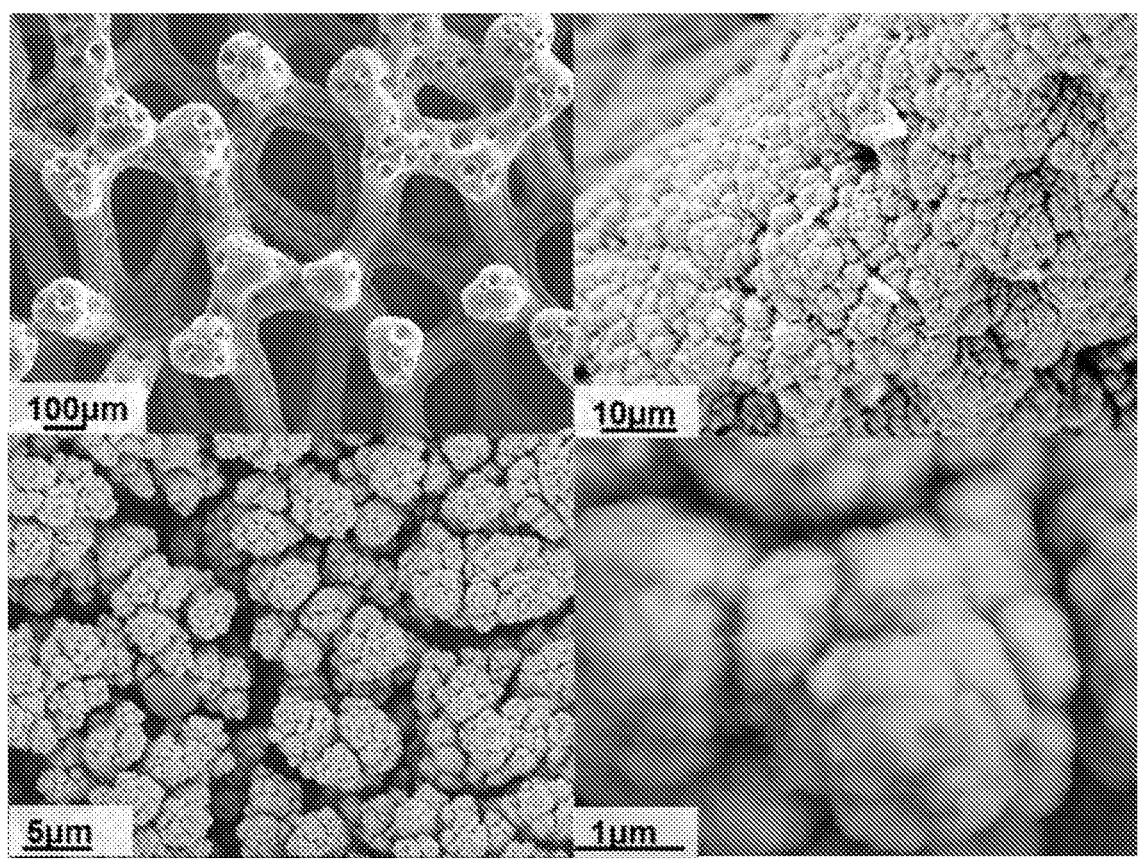
FIG. 9 are SEM images of the hp-Ni/NF anode after reaction at different magnifications.
Figure 11:
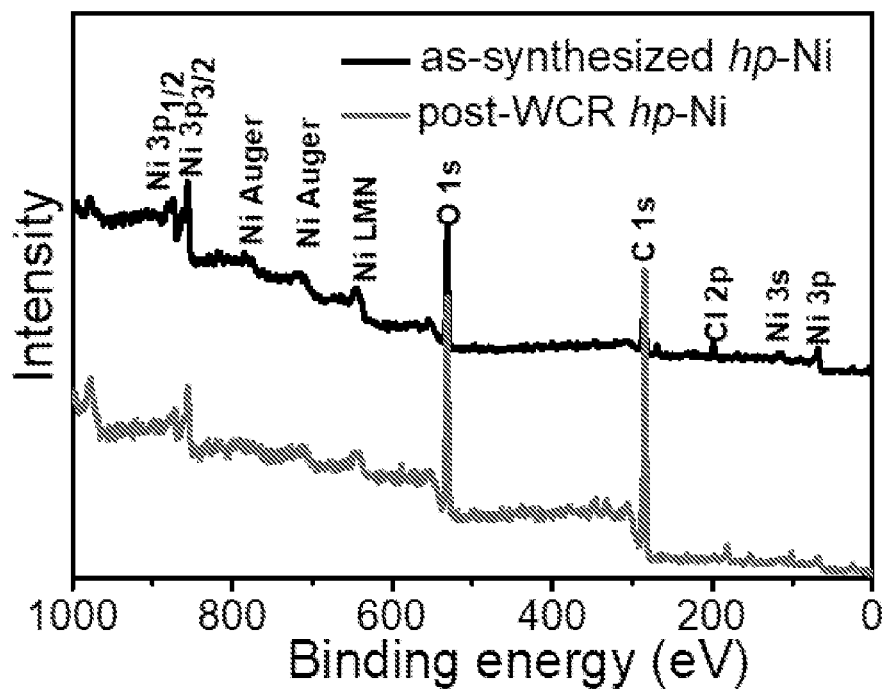
FIG. 11 is a graph showing the XPS spectrum of the hp-Ni/NF anode as-synthesised, and after WCR.

A near 100% retaining of yield was observed. SEM images (FIG. 9) and XRD patterns (the upper red curve in FIG. 6c) of the hp-Ni/NF electrode post-conversion also show the structure robustness and well-retained crystallinity. As depicted in the X-ray spectroscopy (XPS) spectrums (FIG. 11), oxidation of surface nickel to nickel oxide/oxyhydroxide occurred during the conversion process. The increase of carbon peak comparing with the as-synthesised hp-Ni/NF is attributed to the minor unreacted WAS, consistent with the SEM images of post-WCR hp-Ni/NF sample (FIG. 9). Previous reports show that the valence state of Ni on the surface is critical for the electrochemical activities and high-valent nickel species are always preferred for electrooxidation. Hence, high-resolution XPS spectra were obtained to understand the variation of valence state of Ni during reaction. As shown in FIG. 6g, the peak of metallic nickel (at 852.4 eV) disappears while the peak of $Ni^{2+}$ (at 855.6 eV) shifts to higher energy after reaction on Ni 2p spectra. Moreover, the peak of O 1s was more pronounced after reaction (FIG. 6h). These observations indicated further surface oxidation of hp-Ni/NF to form high-valent nickel species, which can be the highly active catalytic site during WCR.

Hydrogen Safety

Figure 6I:
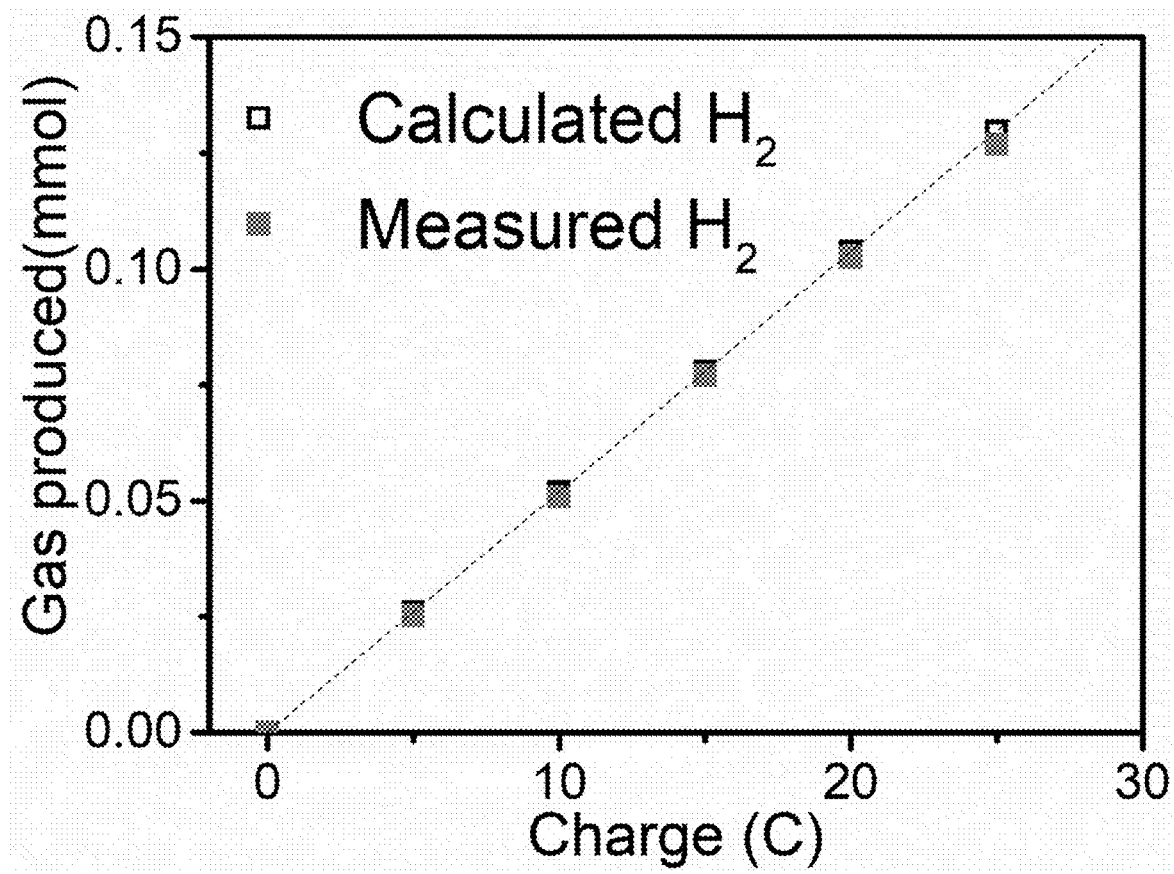
FIG. 6i is a graph showing the calculated and measured $H_2$ obtained after WCR.
Figure 6J:
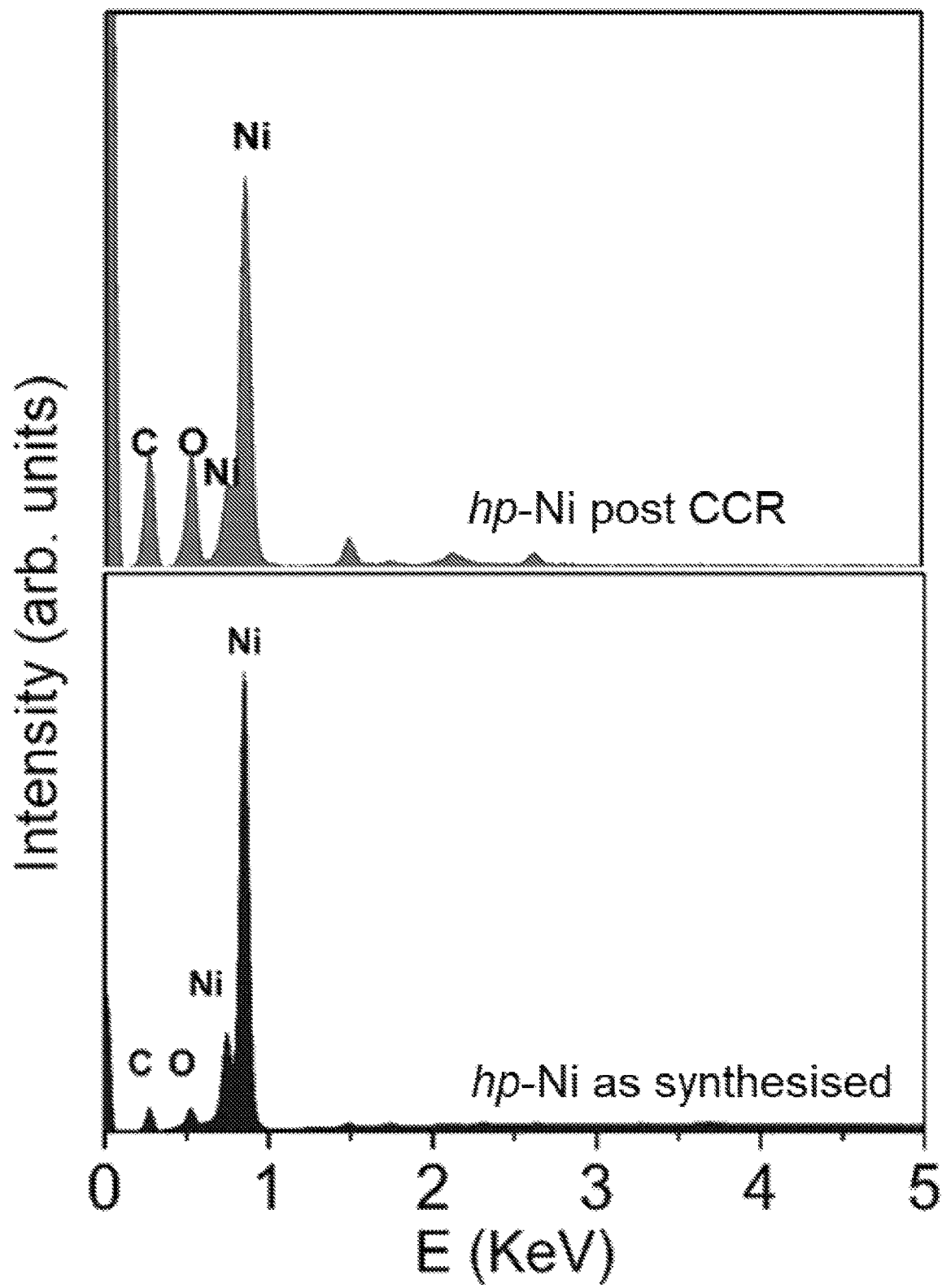
FIG. 6j is a graph showing the EDS spectrum of electrode as synthesised and after CCR.

For safe and efficient green hydrogen generation, it is crucial to study the influence of WCR on the hydrogen evolution reaction (HER). Thus, Gas Chromatography-Thermal Conductivity Detector (GC-TCD) was employed to quantify the produced hydrogen in the present disclosed electrochemical cell. As shown in FIG. 6i, near 100% Faradaic efficiency for HER was obtained at the cathode. The very minor loss of Faradaic efficiency was ascribed to the reductive accumulation of heavy metals. Due the significant suppression of OER (which produces gaseous oxygen, $O_2$) by WCR (which produces organic acids), the risk arising from the explosive $H_2$—$O_2$ gaseous mixture in conventional water electrolysis is effectively mitigated. Thus the electrochemical conversion of sludge, producing both organic acids and hydrogen in the process, is both safe, and leads to significant energy and cost savings. The conversion also valorizes sludge with no prior known uses.

Product Identification Quantification Post-Conversion

Zero carbon loss is the premise of atomically efficient economy, which is challenging for biological anaerobic digestion (AD) processes due to the unavoidable release of carbon dioxide. In contrast, organic carbon can be fully utilised in an electrochemical process.

Total Organic Carbon, Nitrogen and Inorganic Carbon

The balance of organic carbon during the electrochemical conversion was assessed by Total Organic Carbon (TOC) measurements. The total organic carbon (TOC), inorganic carbon (IC), and total nitrogen (TN) in reaction liquid/solid sample were analysed using TOC/TN analyser (Shimazu, Japan). Chemical oxygen demand (COD) was measured using the standard APHA methods. Biomass was measured by direct weighing after lyophilization of a specific amount of product solution. The elements of C, H, N were measured by the elemental analyser (Elementar, Vario EL Cube). The elements of P, S, Fe, Mg, Na, K, and Ca were quantified via ICP-OES (PerkinElmer Optima 8300) and the elements of Cr, Mn, Ni, As, Mo, Cd, Co, Pb, Cu, Al and Zn were analysed by iCAP Q ICP-MS (Thermo Scientific). M-WAS-S liquid samples (before and after WCR) were directly analysed, while the solid samples of WAS-D and M-WAS-R were digested first using the reported method prior to analysis.

Figure 12A:
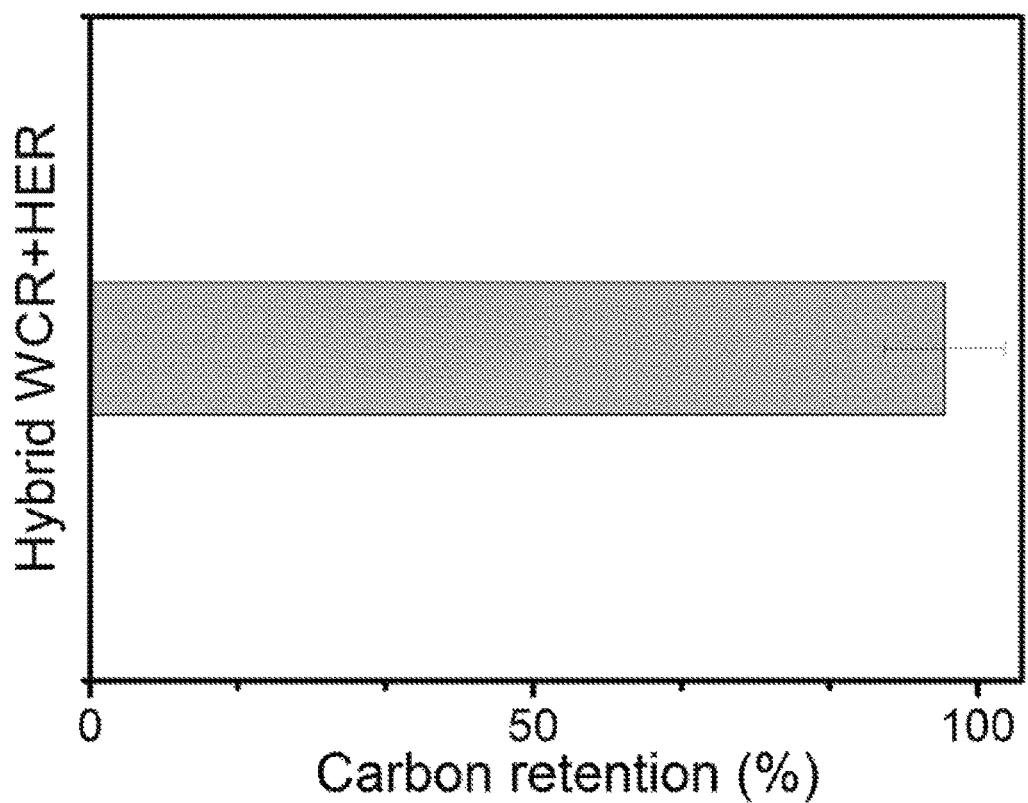
FIG. 12a is a graph showing the carbon balance after WCR and HER.

As depicted in FIG. 12a, negligible loss of organic carbon was confirmed which is a great advantage over conventional AD processes. The negligible loss of carbon is crucial in atom-efficient economy, where carbon, nitrogen and other important elements can be retained and reused in other applications.

Figure 12B:
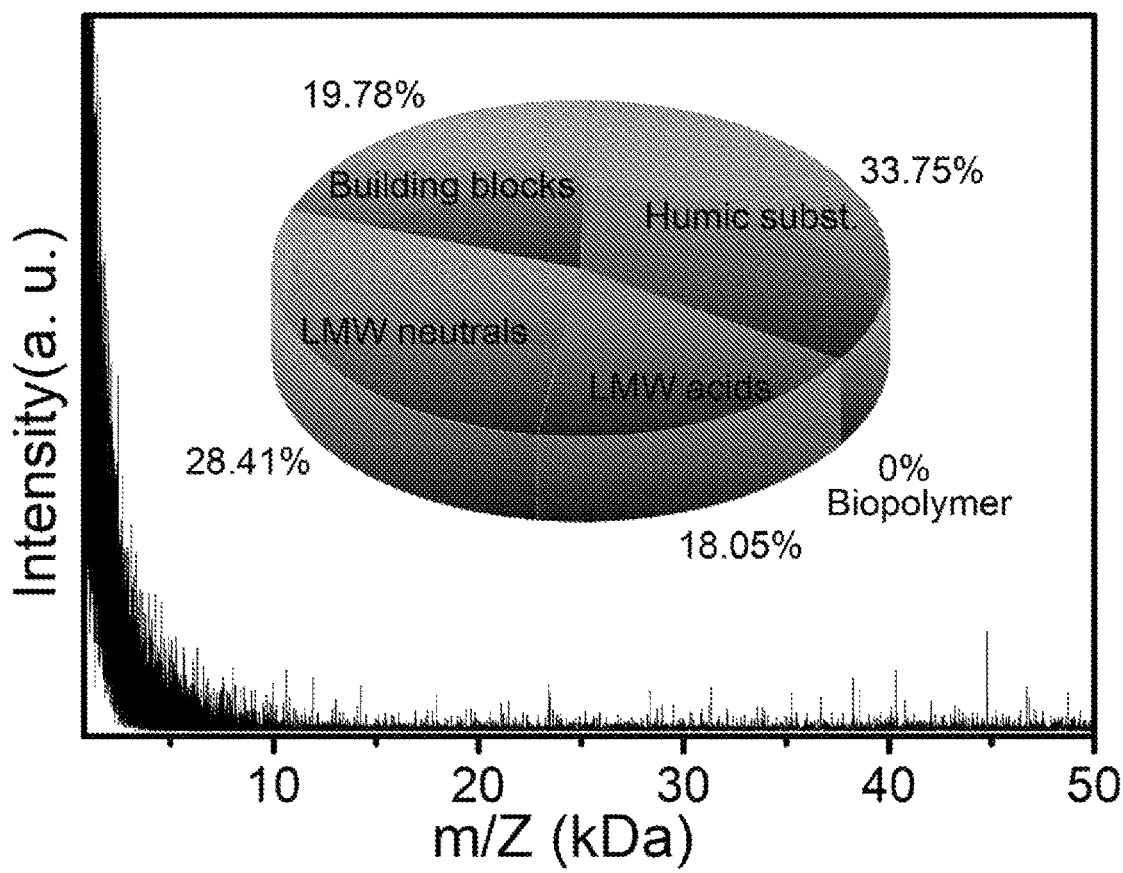
FIG. 12b is a graph showing the MALDI-TOF-MS spectrum of M-WAS-S after electrochemical conversion. Inset shows the corresponding SEC-OCD-OND fractionation result.

Thereafter, the variation of molecules via Matrix-Assisted Laser Desorption/Ionization-Time of Flight-Mass Spectrometry (MALDI-TOF-MS) was studied. The MALDI-TOF-MS spectra was obtained using a Bruker Autoflex III Smartbeam TOF/TOF 200 system equipped with a nitrogen laser (337 nm, 200 Hz maximum firing rate) with a mass range of <50,000 Da. The sample was prepared by mixing 1 μL product solution with 1 μL saturated 2,5-dihydroxybenzoic acid (2,5-DHB) matrix solution. Prior to MALDI-TOF-MS, the analyte was filtered through 4.5 μm membrane. As shown in FIG. 12b, though a large portion of high molecular weight (MW) polymers remained, a significant downshift of MW was observed due to the gradual hydrolysis and decomposition under such alkaline and oxidative conditions. This was even more significant as shown in the Gel Permeation Chromatograph (GPC) spectra (orange curve in FIG. 4).

Size Exclusion Chromatography-Organic Carbon Detection-Organic Nitrogen Detection (SEC-OCD-OND) was subsequently performed to confirm the reduction of MW and to understand the variation of the molecule structures. A SEC-OCD-OND system (DOC-LABOR, Karlsruhe, Germany) was used to quantify the major soluble organic fractions according to the difference of size and chemical functions. The flow rate of the mobile phase was set 1.1 mL $min^{-1}$ and a TSK HW 50S column (3000 theoretical plates, Toso, Japan) was used. A UV detector (UVD 254 nm, type S-200, Knauer, Berlin, Germany) was used to analyse organic carbon and nitrogen in sequence with different flow rates. Finally, the dissolved hydrophilic organics were categorized into biopolymers (>20 kDa, including high molecular weight (HMW) proteins and HMW polysaccharides), humic substances (HS, ~1000 Da), building blocks (300-500 Da), low molecular weight (LWM) acids (summaric value for monoprotic organic acids <350 Da) and LMW neutrals (<350 Da, including mono-oligosaccharides, alcohols, aldehydes, ketones). 1.0 g of proteins and polysaccharides equal to 0.497 and 0.444 g of equivalent carbon, respectively, based on their respective typical chemical formulae of $C_{52.5}H_{6.65}N_{16}O_{21.5}S_2$ and $(C_6H_{10}O_5)$.

To identify and quantify the amino acid content using LC-MS, 0.1 g of lyophilised sample was first dissolved in 25 mL 6 N HCl solution, containing 3 vol % phenol and 1 vol % methanesulfonic acid in a tube. Then, it was purged with nitrogen for 30 seconds and sealed immediately, followed by heating at 110-115° C. for 11-24 hours and cooling down naturally. Thereafter, it was filtered through 0.2 μm PTFE filter before diluting with ACN and 0.1 M HCl solution. Typically, 10 L of sample was firstly added into 990 μL 0.1 M HCl aqueous solution. Then 100 μL of above solution was further added into 400 μL ACN. Eventually, aliquots were transferred to sample vials for direct injection and analysed using LC-MS system with Poroshell 120 HILIC-Z column.

The SEC-OCD-OND results of the M-WAS-S samples post conversion (inset of FIG. 12b) corroborated the decrease in MW. Comparing with M-WAS-S samples pre-electrochemical conversion, high MW biopolymers were noted to have disappeared, Low Molecular Weight (LMW) neutral molecules decreased and LMW acids increased during the conversion process. The unexpected increase of humic substances (HS) and insignificant change of building blocks could be due to the breakdown of biopolymers and the limited resolution of the instrument.

Figure 12C:
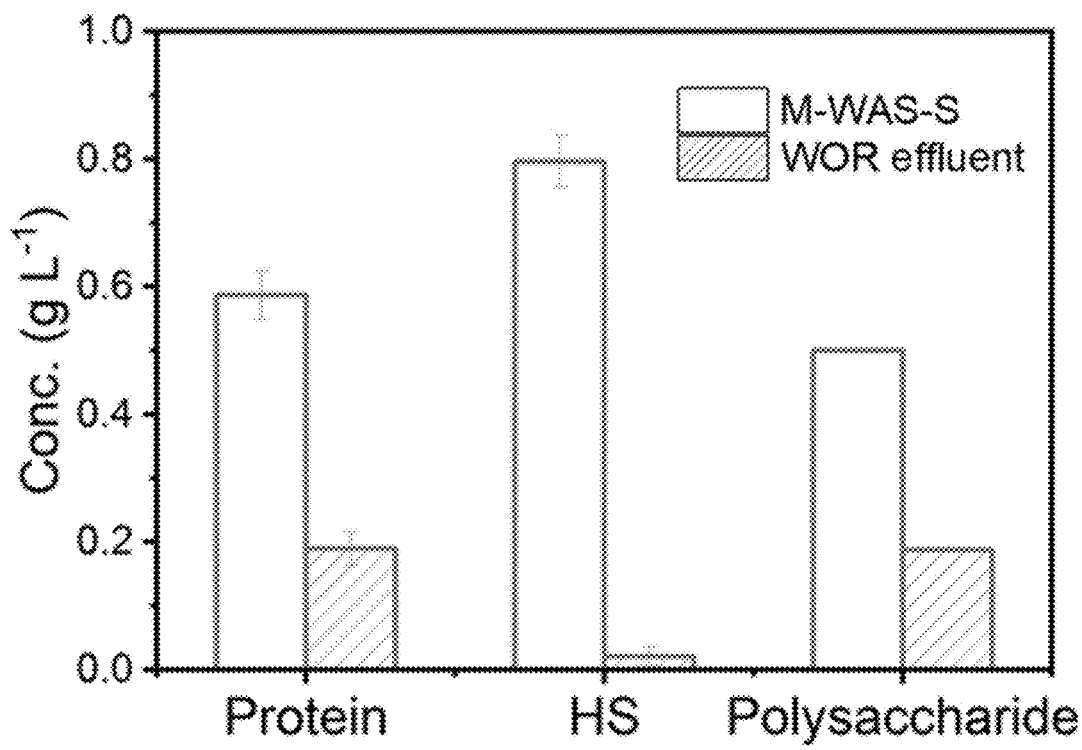
FIG. 12c is a graph quantifying the protein and humic substances (HS) in M-WAS-S before and after electrochemical conversion.

HS, polysaccharides and protein were quantified as displayed in FIG. 12c, where the proteins, polysaccharides and HS were quantified with standard Pierce™ BCA protein assay kit, phenol-sulfuric acid method and modified Lowry method respectively. It was observed that protein content was reduced by about two thirds post-electrochemical conversion; polysaccharides was reduced by more than halved; while HS almost totally disappeared during the electrochemical conversion, in line with the complete fading of colour in the inset of FIG. 6e.

Figure 13A:
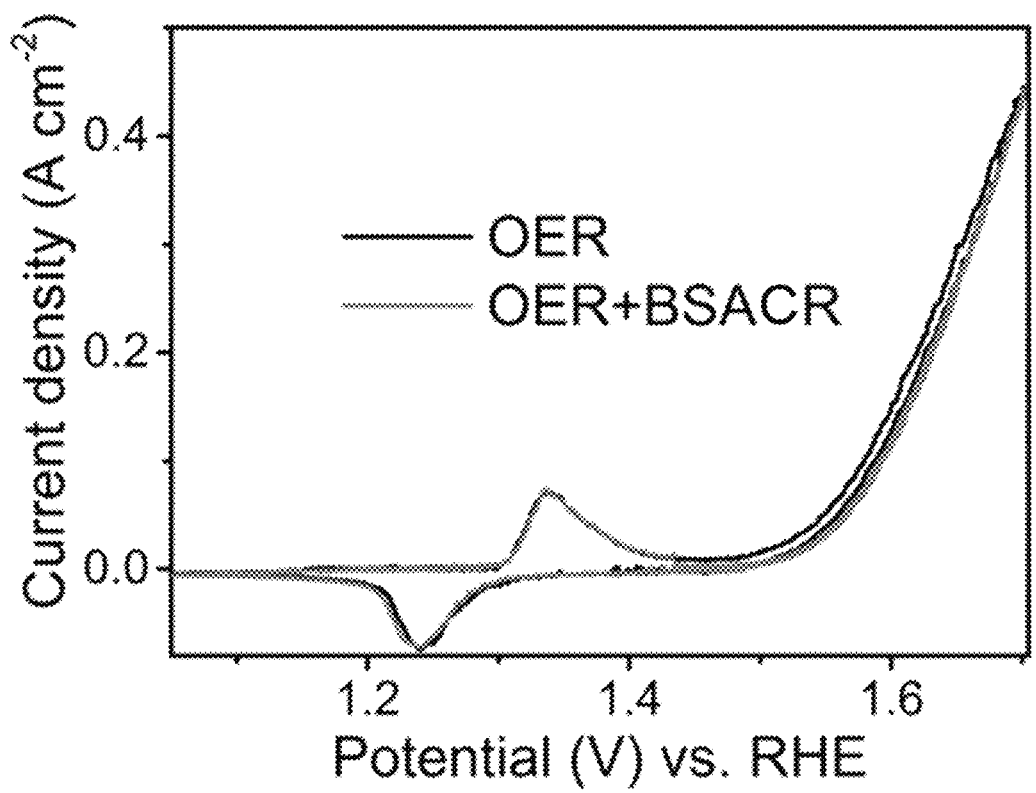
FIG. 13a is a graph showing the cyclic voltammogram of hp-Ni/NF anode with (OER+BSACR) and without (OER) the addition of Bovine Serum Albumin (BSA).
Figure 13B:
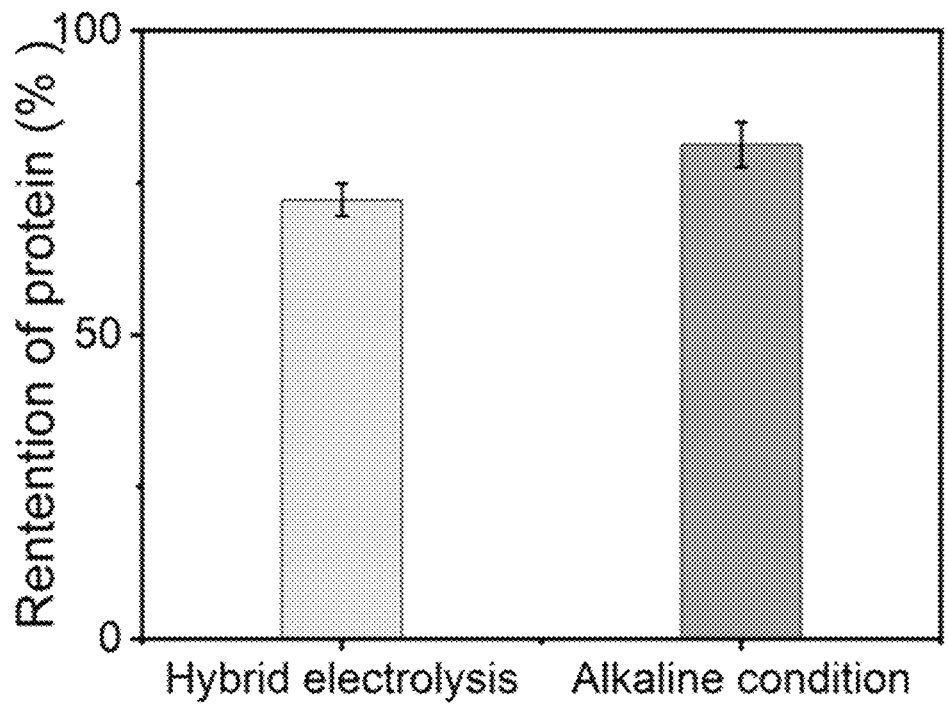
FIG. 13b is a graph showing the quantification of proteins in BSA after treatment under only alkaline conditions and after electrochemical conversion.
Figure 13C:
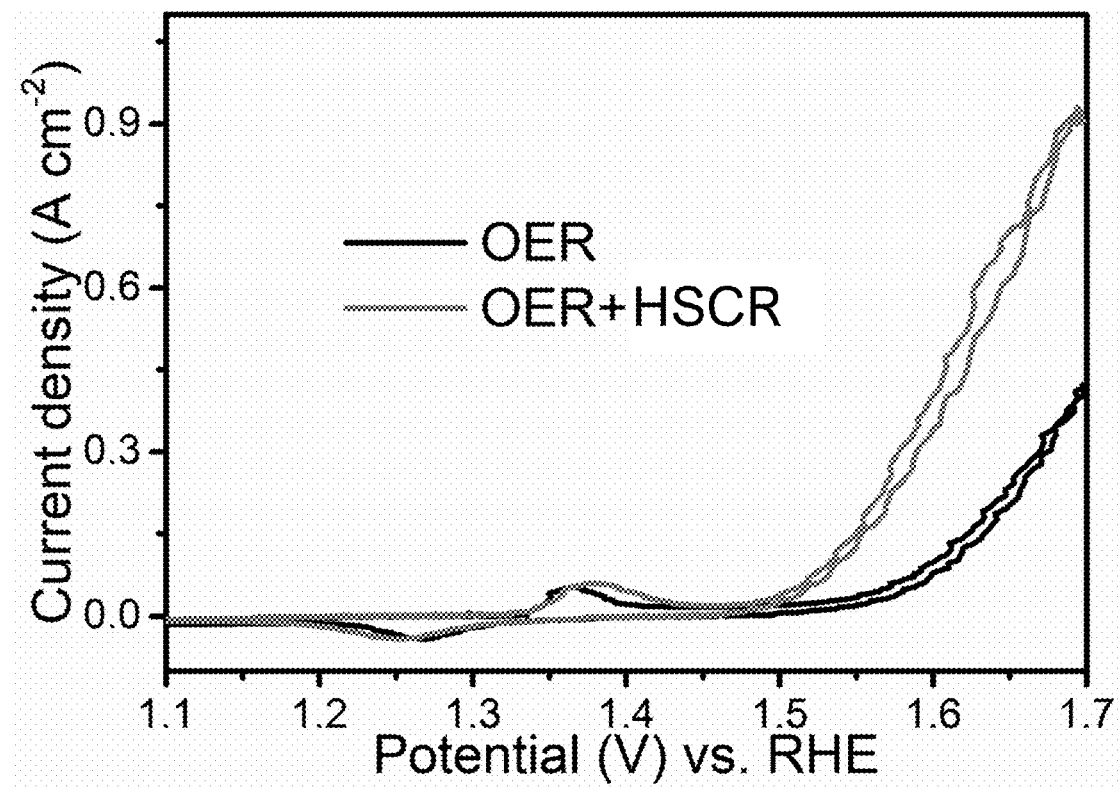
FIG. 13c is a graph showing the cyclic voltammogram of hp-Ni/NF anode with (OER+HSCR) and without (OER) the addition of humic substances.
Figure 13D:
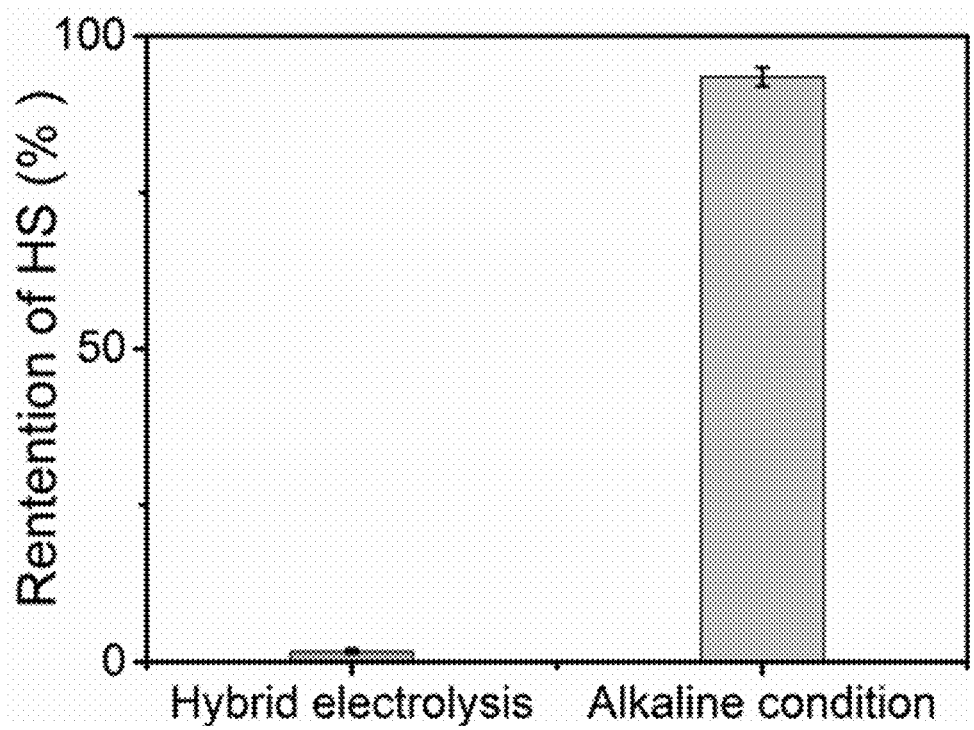
FIG. 13d is a graph showing the quantification of humic substances (HS) after treatment under only alkaline conditions and after electrochemical conversion.

To further confirm it, the electrochemical response of standard protein and HS samples (i.e., Bovine Serum Albumin (BSA) and HS, respectively) were studied under the same electrochemical conditions. Expectedly, HS could be effectively degraded, while BSA only went through slow hydrolysis and partial oxidation of the reductive groups under such alkaline and oxidative conditions (FIG. 13a and FIG. 13b). Moreover, LC-MS and GC-FID quantification results of post-conversion BSA samples showed trace production of amino acids and organic acids respectively, suggesting the minor influence of the electrochemical conversion utilised in the present invention on proteins. In contrast, the electrolysis of humic substances (HS) resulted in the increase in organic acids formed dominantly acetic acid (FIG. 13c and FIG. 13d). Notably, SEC-OCD-OND fractionation results showed the conversion of LMW neutrals to LMW acids in agreement with previous work.

Therefore, Gas Chromatography-Mass Spectrometry (GC-MS) method with liquid-liquid extraction (LLE) using ethyl acetate as solvent was then adopted to identify the organic acid products. Specifically, the identification was performed on GC-MS (gas chromatography-mass spectrometry, GCMS-QP2010ULTRA, Shimadzu) with ZB-WAX plus (Phenomenex) column of 30 m×0.25 mm with a film thickness of 0.25 μm. Specifically, 4 runs of reaction solution were collected and acidified with 37% HCl solution to pH value of 2.0 prior to extraction. Then, the acidified solutions were further liquid-liquid extracted with ethyl acetate. 3 microliters of extracted samples were injected for each test. Splitless injection was used at 240° C. with helium as carrier gas at flow rate of 1 mL min$^{-1}$. The temperature program was as follows: holding at 50° C. for 7 min, then ramping to 240° C. at rate of 7° C. min$^{-1}$, and holding for 14 min. The MS was operated in electron ionization (EI) mode with the ion source temperature at 220° C., and mass spectra were acquired from m/z 30 to 500 after a 5-min solvent cut time. The peaks were identified using the NIST11 library (National Institute of Standards and Technology, Gaithersburg, MD, http://www.nist.gov/srd/mslist.htm), and a compound was identified if the match was greater than 80% (most matches were considerably higher).

Figure 12D:
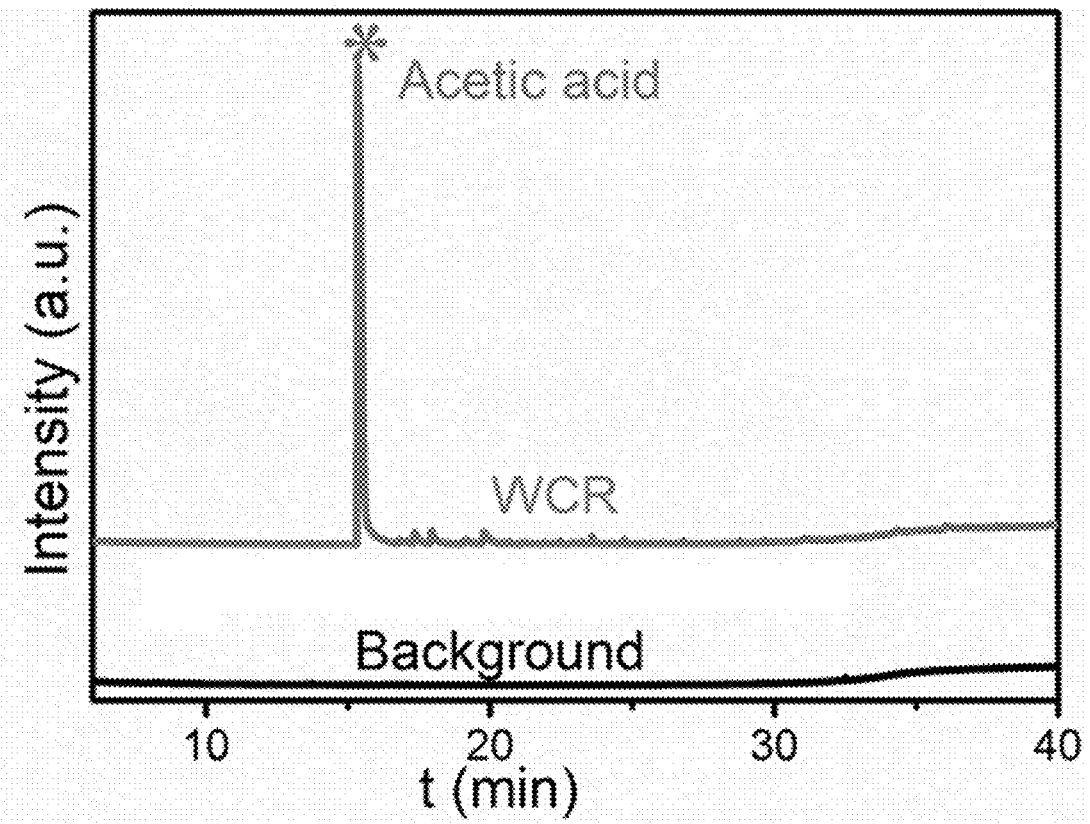
FIG. 12d is a graph showing the GC-MS analysis of the anodic products from WCR after LLE with ethyl acetate.

As shown in FIG. 12d, acetic acid (HAc) dominated the organic acid products (red curve in FIG. 12d), with negligible amounts of formic acid and propanoic acid formed in sharp contrast to the flat background spectrum of the solvent (the black curve in FIG. 12d). The high selectivity of the conversion for HAc is an unique feature of the hybrid electrolysis.

Figure 12E:
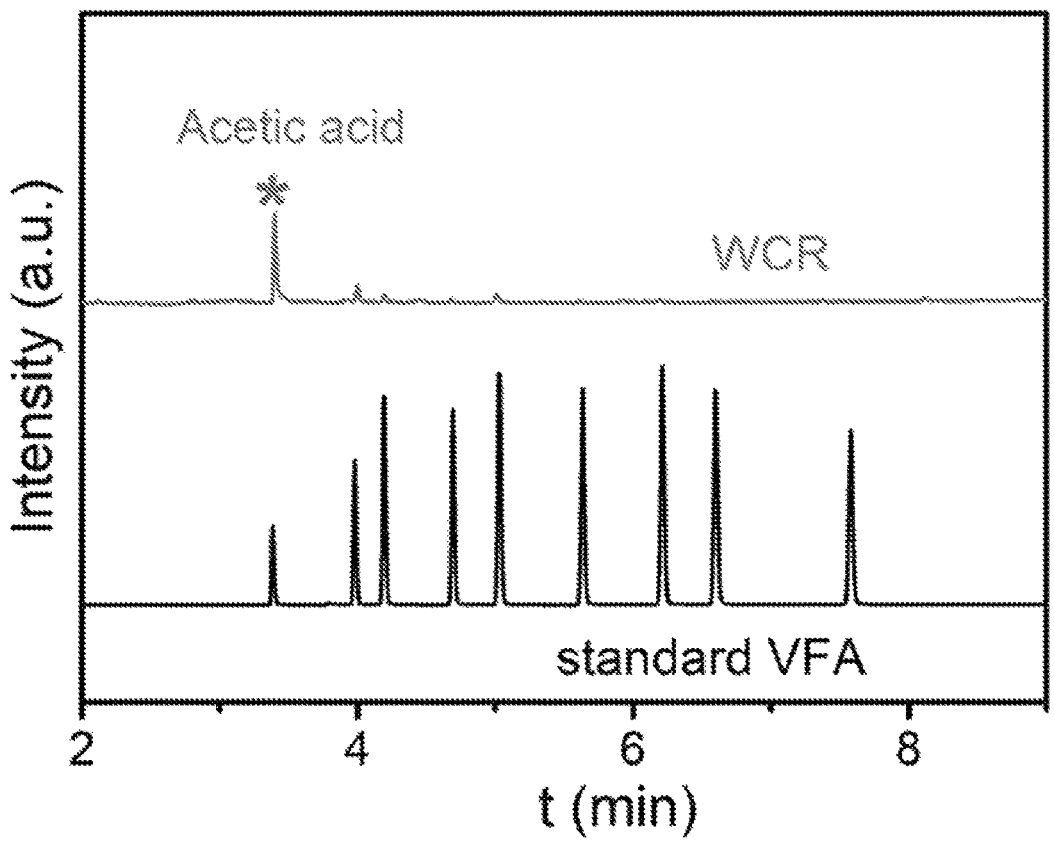
FIG. 12e is a graph showing the GC-FID quantification of acetic acid after WCR against a 1 mM VFA standard.
Figure 12F:
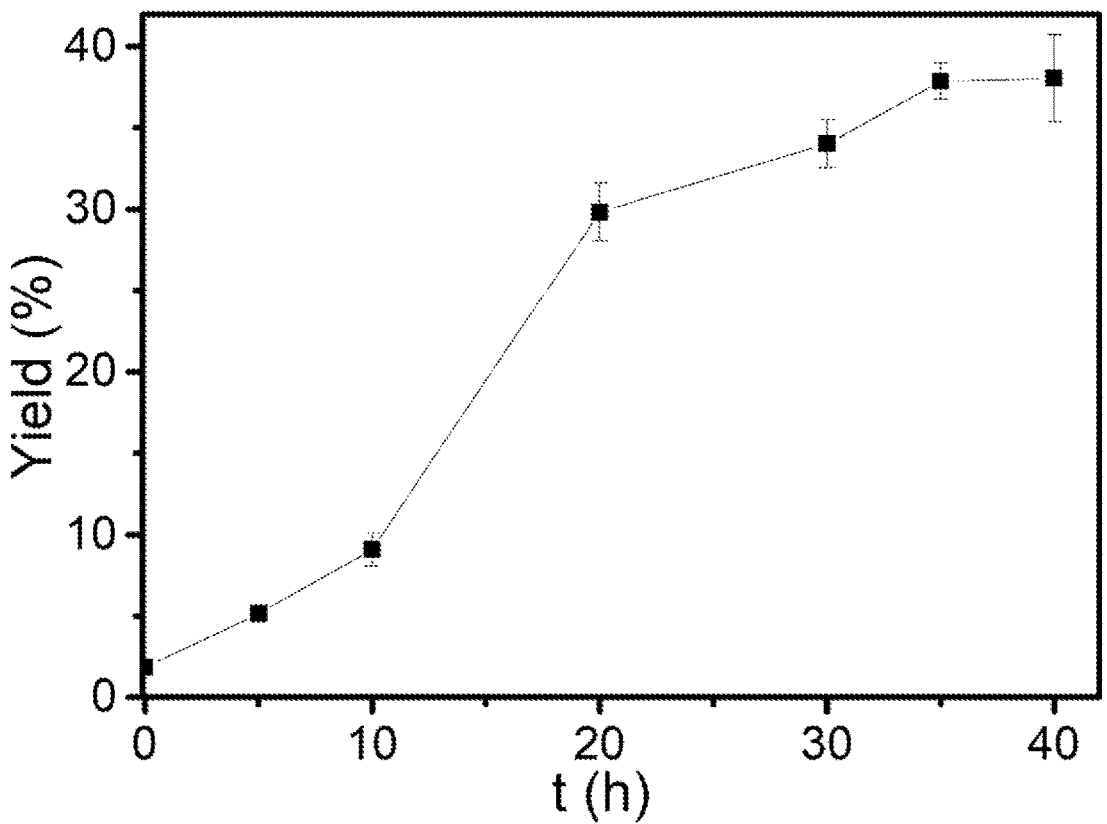
FIG. 12f is a graph showing the time-dependent yield of acetic acid of M-WAS-S.

Subsequently, Gas Chromatography-Flame Ionization Detector (GC-FID) was employed to quantify the acetic acid yields. The GC-FID spectra in FIG. 12e shows the production of 1.9 mM acetic acid after the conversion of 0.3 g L$^{-1}$ M-WAS-S(red curve), along with 1.0 mM VFA standard (black curve). The yield of acetic acid was calculated by the ratio of the Total Organic Carbon (TOC) in HAc to that of M-WAS-S added at different reaction times. As shown in FIG. 12f, maximum of 40 TOC % of HAc could be obtained within 35-hour reaction duration from 1 g L$^{-1}$ of M-WAS-S sample. The rest of the TOC was ascribed to the remaining protein materials and some unreacted lignocellulose that were inert to the hybrid electrolysis. Thus, the final hybrid electrolysis organic product is dominated by acetate and bioliable protein materials, both of which are critical bionutrients and may be well assimilated by bacteria and plants.

Heavy Metal Removal

Although over 96 wt % of WAS are carbon (C), nitrogen (N), oxygen (O) and hydrogen (H), the rest of the present elements are also critical to both ecological systems and human health. Particularly, N, Phosphorus (P) and Potassium (K) are important nutrients to plants, while heavy metals are very toxic to microorganisms even at trace level. Hence, the presence of such heavy metals in sludge poses a significant threat to human health via in vivo enrichment. Thus, it is necessary to assess the applicability of the integrated process via more detailed elements analyses.

Figure 2C:
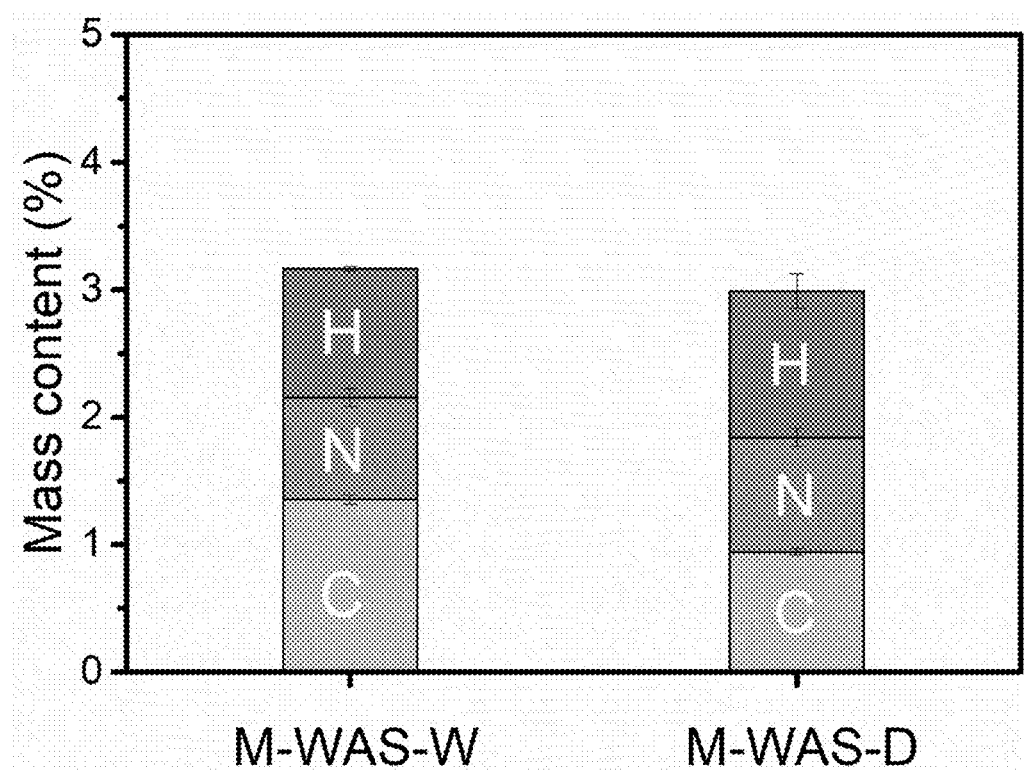
FIG. 2c is a graph showing the mass concentration of C, N and H elements in M-WAS-D and M-WAS-W.
Figure 2D:
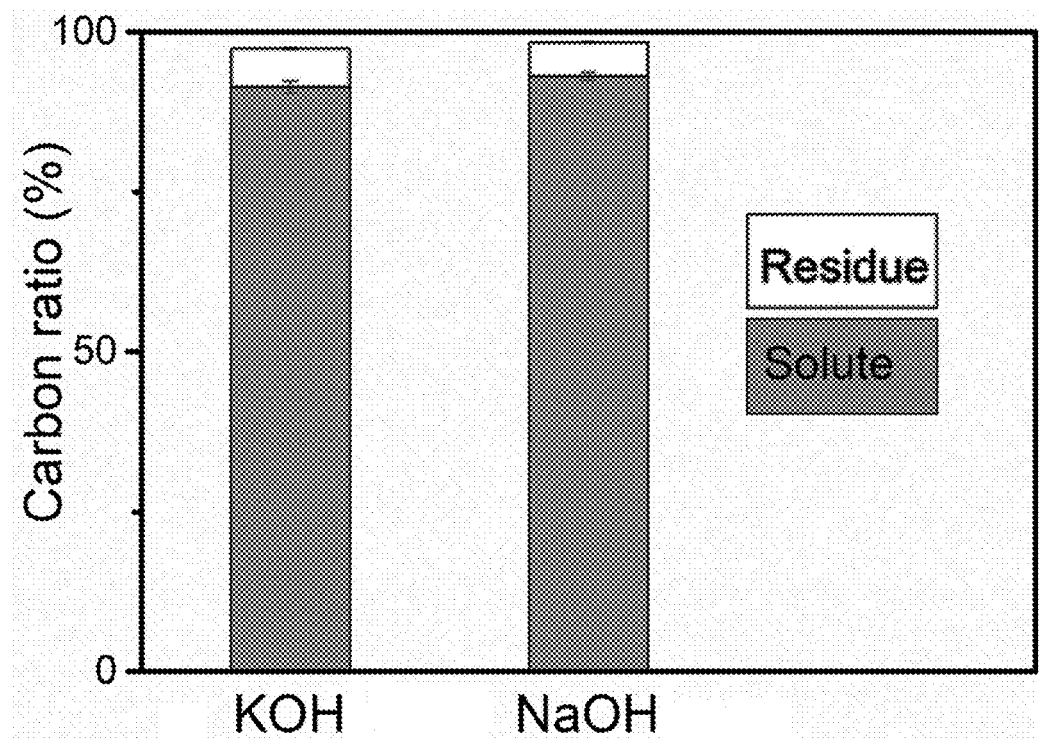
FIG. 2d is a graph showing the calculated solubility of WAS after ball milling under different alkaline conditions.
Figure 14A:
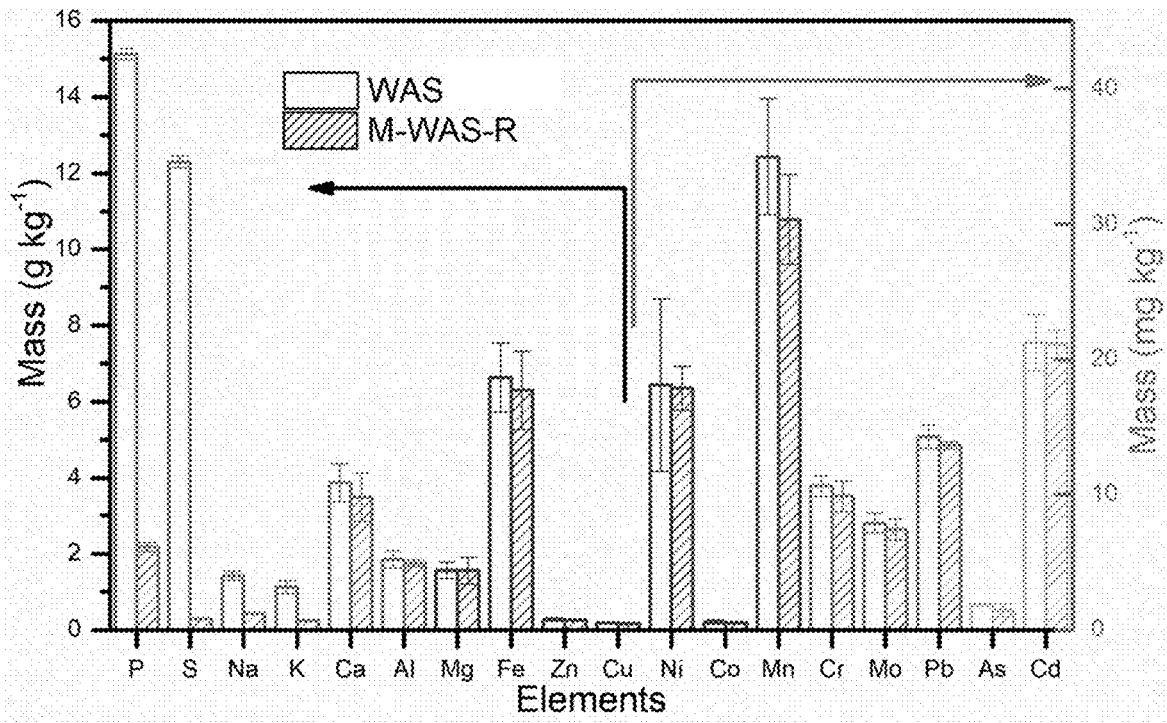
FIG. 14a is a graph showing the elemental composition of WAS and M-WAS-R, normalized to per kg of WAS feed.
Figure 14B:
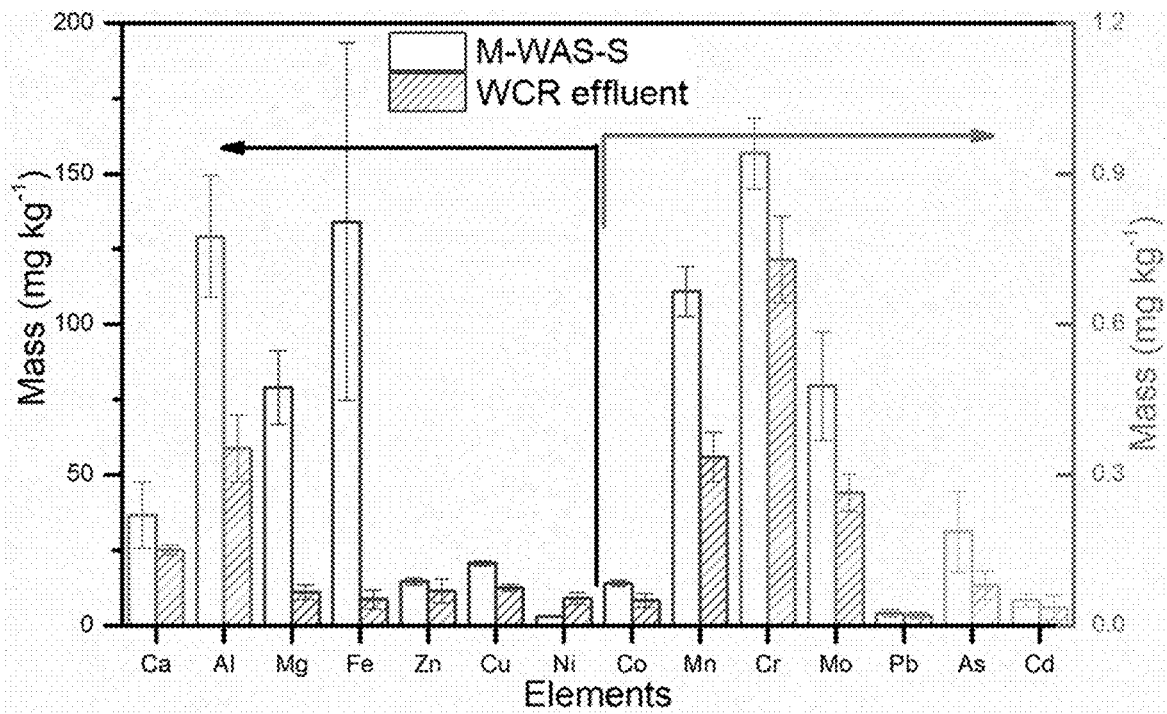
FIG. 14b is a graph showing the elemental composition of M-WAS-S and WCR effluent, normalized to per kg of WAS feed.

The complete dissolution of C, N and H has been discussed in FIGS. 2c and d, and the variations of the remaining elements in the conversion process were investigated. As shown in FIG. 14a and FIG. 14b, most of the useful elements were dissolved after ball milling. Specifically, over 97% of S, 85% of P, 77% of K and 70% of sodium (Na) were well dissolved, which is among the highest solubility reported to date.

In sharp contrast, the remaining elements were almost completely remaining in the solid phase (M-WAS-R), that is due to the low solubility of most metal ions in basic media. The solid phase products containing these metal elements were separated by centrifugation after ball milling and thus almost completely removed from the dissolved organics. In the subsequent electrochemical conversion of M-WAS-S, the concentration of other metal elements was further decreased (WCR effluent) as depicted in FIG. 14b. Most metals ions precipitated as metal hydroxide under strong basic conditions, and the inert metal ions were reduced and deposited at the cathode during hybrid electrolysis, further minimizing the metal content in the electrolysis product. The minor increasing of Ni was attributed to the inevitable dissolution of Ni from hp-Ni/NF anode during electrooxidation, similar to previous works. Overall, the final concentration of metal ions in the electrolyte solution post conversion was far below that specified in the regulation control, however, nutrient elements were very abundant. Thus, the product obtained post-electrochemical conversion has significant potential as fertilizers and in bio-applications without the risks arising from heavy metals.

Electrochemical Conversion of N and P

It is known that Nitrogen (N) and Phosphorus (P) have diverse forms, but only specific forms are organism liable. Herein, the detailed pathways of N and P throughout the electrochemical conversion process were studied. Previous work demonstrated that organic P in the form of C—O—P dominated in WAS, while dissolved P would either exist in the forms of orthophosphates (ortho-P) or pyrophosphates (pyro-P), both of which are bioavailable. As shown in FIG. 14a, organic P was well dissolved (>85%) after mechanical treatment (ball milling). Further, vanadomolybdophosphoric acid colorimetric method showed that over 86.9% of the phosphorus present existed as ortho-P. While all of the dissolved P fully remained after the electrochemical conversion, the percentage of ortho-P was observed to further increase to 92.8%.

Figure 15:
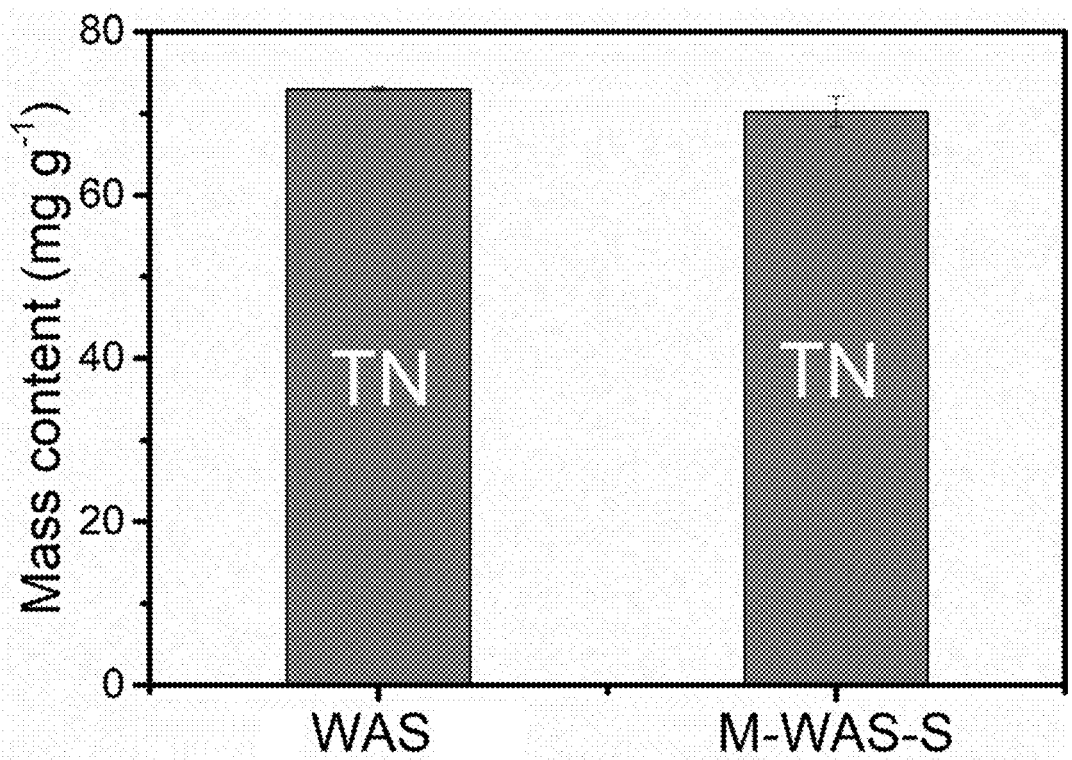
FIG. 15 is a graph showing the nitrogen balance of WAS and M-WAS-S, normalized to per kg of WAS feed.
Figure 16:
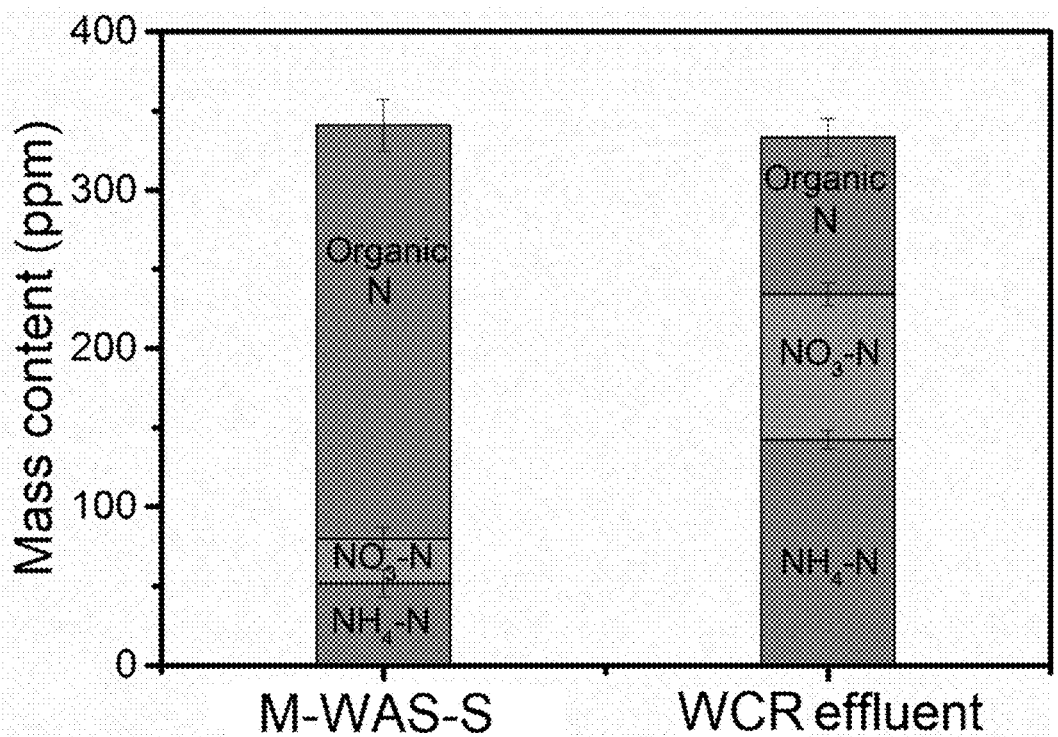
FIG. 16 is a graph quantifying the different forms of nitrogen of M-WAS-S and the WCR effluent.

Comparatively, N was more labile during the whole process. First of all, the quantification results of Total Nitrogen (TN) (FIG. 15 and FIG. 16) prove the negligible loss of N during both ball milling and subsequent electrochemical conversion processes, which is very beneficial to the goal of maximizing energy and resource recovery. Further (FIG. 16), the gradual release of organic N was observed alongside the formation of both $NH_4$—N and $NO_3$—N, while negligible amounts of $NO_2$—N was detected. Typically, around 15% of $NH_4$—N and 8.3% of $NO_3$—N were formed in the initial ball milling step. Subsequently, $NH_4$—N and $NO_3$—N increased to 42.7% and 27.6% respectively after the electrochemical conversion process. In contrast, only 29.7% of N remained in the form of organic N eventually, which accounted for the remaining proteinaceous materials. Therefore, the final product is rich in $NH_4$—N and $NO_3$—N, both of which are bioavailable and important ingredient of nitrogen fertilizer.

Moreover, recent progress in the electrochemical (co-) reduction of nitrates makes the final product even more valuable, with which not only the ratio of $NH_4$—N and $NO_3$—N may be well tuned, but also amide nitrogen fertilizer may be produced.

Concurrent Electrochemical Conversion of WCR Effluent and M-WAS-S

Figure 10:
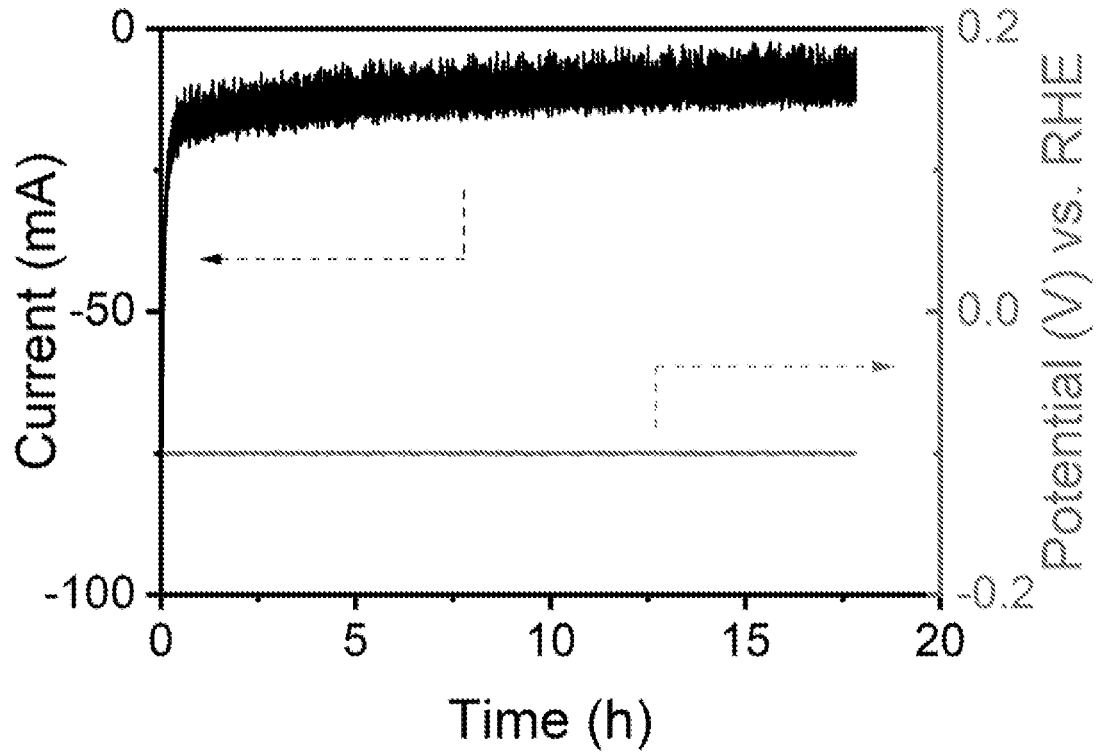
FIG. 10 is a graph showing the electrochemical reduction of WCR effluent to nitrates.

Particularly, urea can be synthesised via co-electro-reduction of nitrate and carbon dioxide. Another potential value of the final product is in supporting the biological synthesis of single-cell protein or polyhydroxyalkanoates (PHA). In these processes, $NH_4$—N is preferred while $NO_3$—N always needs to be minimised. The electro-reduction of nitrate in the above WCR effluent was demonstrated in a two-compartment H-cell with an anion-exchange membrane (Fumapem FAA-3-PK-130), where Cu—Ni/CF, Ag/AgCl (sat. KCl) and Pt wire were used as working, reference, and counter electrodes, respectively. The WCR effluent was used as catholyte, and fresh M-WAS-S was used as anolyte. Long-term chronoamperometry at constant potential of −0.1 V vs. RHE was applied to achieve the complete reduction of nitrate to ammonia (FIG. 10). The decrease in current indicated a gradual reduction in nitrate concentration as the reaction progressed. As such, present disclosed method may also be used to oxidise organic waste, while at the same time reduce the nitrogenous products from prior electrochemical conversion of organic waste.

The selective conversion of $NO_3$—N to $NH_4$—N has thus been proved herein. Further, the electrolyte solution after electrochemical conversion was rich in P and K. Thus, the electrolyte solution possesses high potential to support biological syntheses of protein or PHA.

Example 5b: Electrochemical Conversion of Woody Biomass

The single electrochemical cell utilised for electrochemically converting woody biomass is demonstrated as shown in FIG. 2a. The electrochemical conversion was performed in the same way in Example 5a, except that a fixed amount (4 ml) of woody biomass extract was dissolved in 1M KOH solution (32 ml). After the electrochemical conversion process, the catalyst was used to oxidize woody biomass extract at constant voltage 0.65 V vs Hg/HgO for 24 h. At intervals of 1, 2, 4, 7 and 24 hours, 5 ml of the sample was collected for product analysis.

Cyclic Voltammetry

For cyclic voltammetry (CV), the scan rate was set at 10 mV s$^{-1}$. All potentials were converted from vs. Hg/HgO to vs. RHE (reversible hydrogen electrode). iR (current times parasitic resistance) compensation was applied in all the electrochemical experiments to account for the non-optimized Ohmic loss.

Figure 17A:
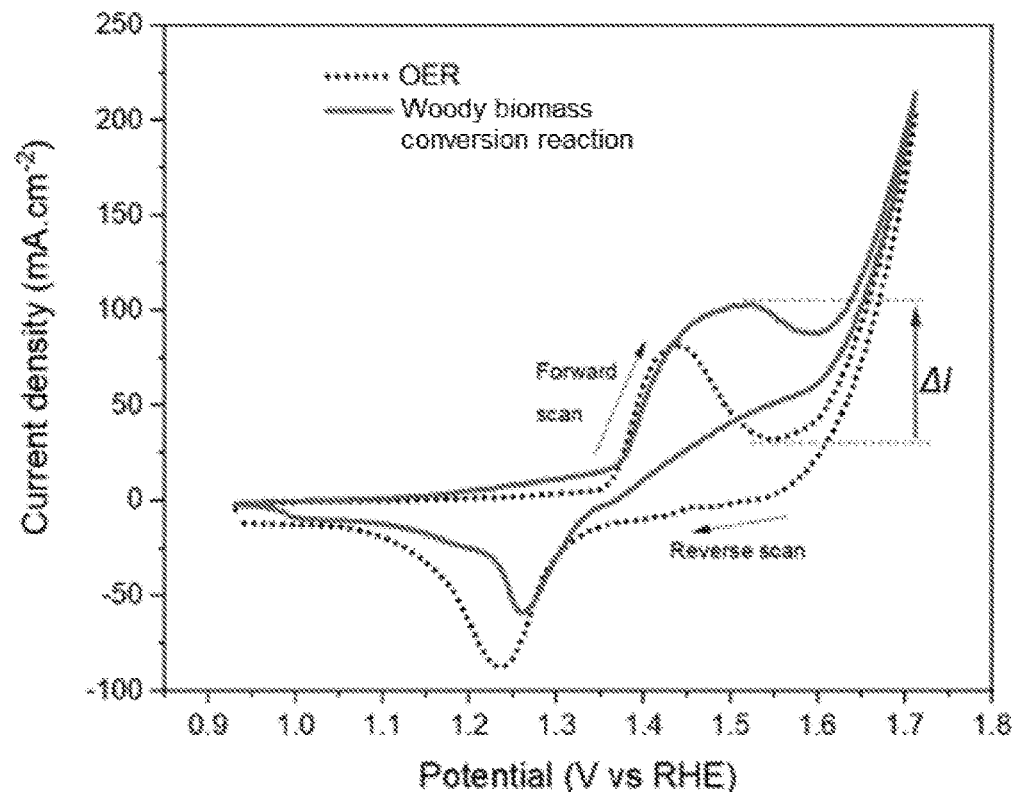
FIG. 17a is a graph showing the cyclic voltammetry (CV) curve of the electrochemical conversion of ball-milled woody biomass and oxygen evolution reaction (OER).

FIG. 17a displays the reaction CV curves when 1.7 g/L of mechanically treated woody biomass was added into 30 mL of 1 M KOH. Arrows indicate the sweep directions. AI shows the current density difference between woody biomass conversion reaction and OER at 1.55 V vs. RHE. In the forward scan cycle of OER CV, Ni was oxidised, giving the oxidation peak near 1.4 V vs. RHE. The current density continued to increase slowly when oxidised Ni oxidised water via OER. In the backward scan cycle, oxidised Ni was reduced, resulting in the reduction peak near 1.25 V vs. RHE. In contrast, at 1.55 V vs. RHE, the woody biomass conversion reaction occurred together with Ni oxidation, causing an overall 3-fold increase (AI) in current density. At such, when operated at the potential window (~1.5 to 1.6 V vs. RHE), the anodic conversion of woody biomass dominated OER. With this, the hybrid AWE is much more energy-efficient than conventional AWE.

Product Identification and Quantification

Product identification was performed in the same way as that detailed in Example 5a.

Figure 17B:
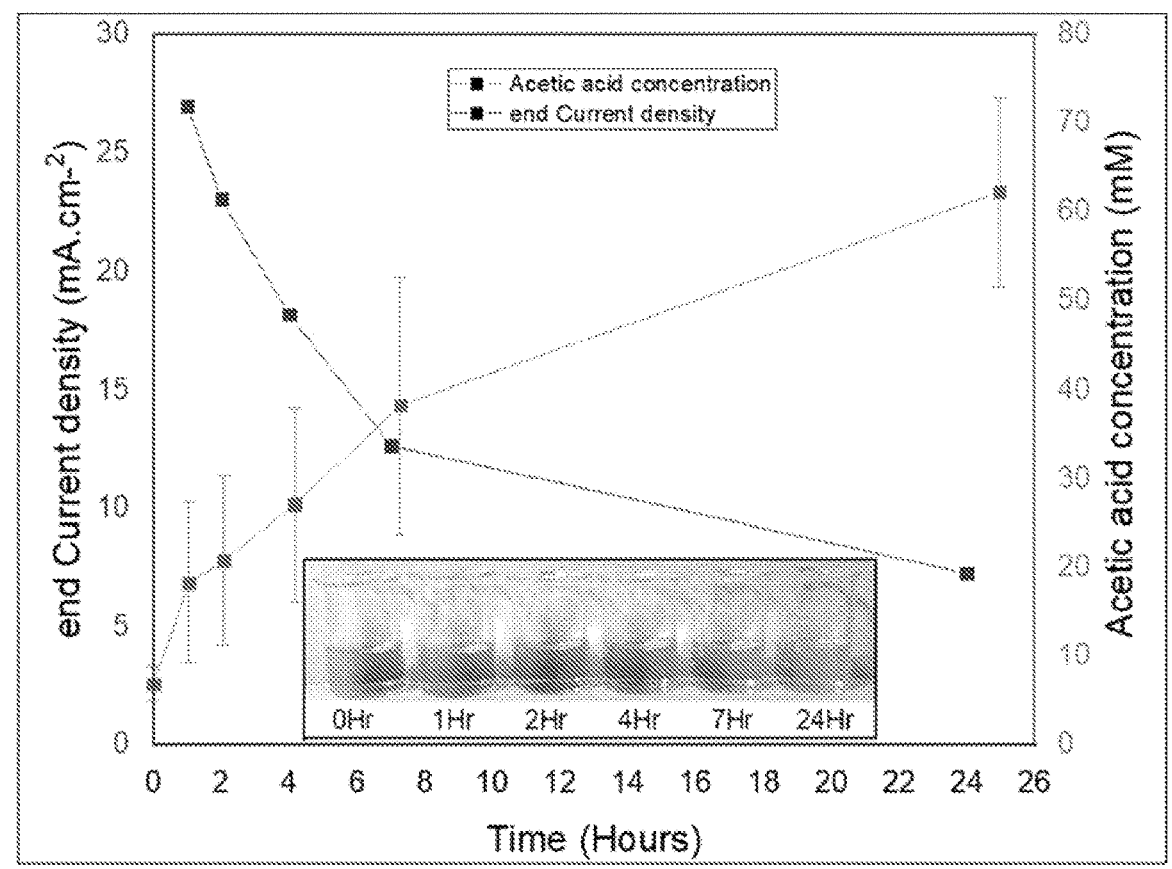
FIG. 17b is a graph showing the time-dependent current density and acetic acid concentration during electrochemical conversion of ball-milled woody biomass.

In FIG. 17b, the analysis from the organic acid detection test implied that the main product was acetic acid with logarithmic increase in concentration over a period of 24 hours. The ending current density was inversely proportional to the concentration of acetic acid, implying that the reactant species had been oxidised over time. Furthermore, the color of the solution changed from dark yellow tone (before electrochemical conversion) gradually to transparent at the end of the 24 hours reaction. This color reduction could be the indication of oxidising effect from breaking of complex organic compounds.

Total Organic Carbon and Nitrogen

The total organic carbon (TOC) in liquid phase was analysed in the same way as detailed in Example 5a.

Briefly, the TOC was analysed using a TOC analyzer (Shimadzu TOC 5000A). The TOC was used for calculation of the conversion of woody biomass to organic acids, as well as the selectivity of the organic acids formed. The converted products were quantified on GC-FID (Agilent 8890 GC with a flame ionization detector) by using a DB-FFAP GC column. Prior to GC-FID analysis, 5 mL of the sample was neutralised by adding 0.75 μL of 6 M HCl. Then, the solution was filtered by poly (ether sulfone) (PES) membrane filters (0.45 μm pore size). Sequentially, 0.9 ml of sample were added to 0.1 ml of 10% formic acid in a 1.5 mL glass vial before transferring into the GC-FID. The oven temperature programming was as follows: 80° C., hold 1 min; Ramp 1-20° C. min$^{-1}$ and run 2 mins; Ramp 2-10° C. min$^{-1}$ and run 8.5 mins; 205° C., hold 2 min with inlet, column, and front inlet FID temperature at 260° C., 80° C. and 260° C., respectively. The yields of all acetic acid were calculated based on carbon by using the following equation: Yield %=mass of carbon in product/mass of carbon in soluble woody extract×100%.

Table 1 summarizes the concentration and selectivity of acetic acid with respect to the chronoamperometry (CA) duration as an average of duplicate runs. From the results, the electrochemical conversion of woody biomass demonstrated a remarkable selectively of 70% within 24 hours.

TABLE 1

Organic acid analysis with concentration and selectivity of acetic acid against chronoamperometry (CA) duration

| CA duration (hours) | Acetic acid (mM) | Acetic acid (selectively %) |
|---|---|---|
| 0 | 6.93 | 6.39 |
| 1 | 18.30 | 18.25 |
| 2 | 20.82 | 20.79 |
| 4 | 27.09 | 27.33 |
| 7 | 38.28 | 40.40 |
| 24 | 62.28 | 70.06 |

Example 5c: Electrochemical Conversion of Chitin

Chitin, as a substitute for shrimp shell biomass, was subjected to the same electrochemical conversion process as detailed in Example 5a with the difference being that 16.7 mg L$^{-1}$ of chitin was dissolved in 1.0 M KOH solution by ultrasonic treatment for 30 min followed by a sequential freezing-thawing process (see Methods for more details). The scan rate was 10 mVs$^{-1}$ in all cyclic voltammetry (CV) measurements. 85% iR compensation was applied to all current-voltage measurements to account for the Ohmic loss, where R was obtained by electrochemical impedance spectroscopy (EIS).

Cyclic Voltammetry

Figure 18A:
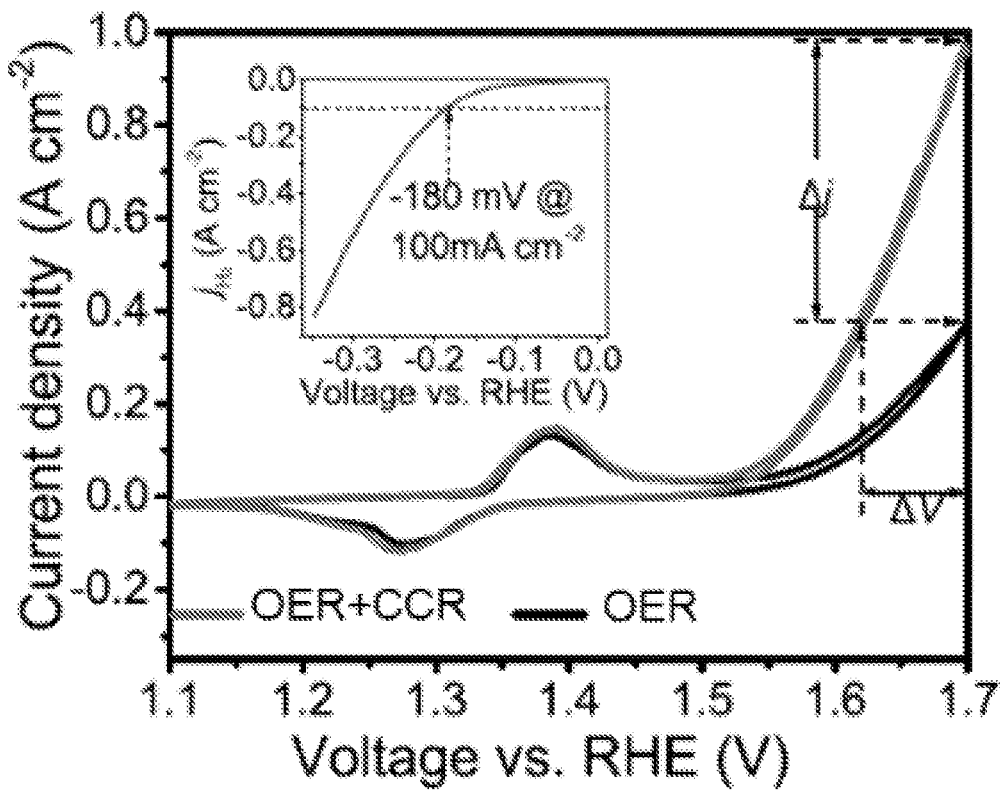
FIG. 18a is a graph showing the CV of the chitin conversion reaction (OER+CCR) and oxygen evolution reaction (OER). Inset is a Linear Sweep Voltammogram (LSV) of the hydrogen evolution reaction (HER) using the $Ni_2P$/NF cathode.
Figure 19A:
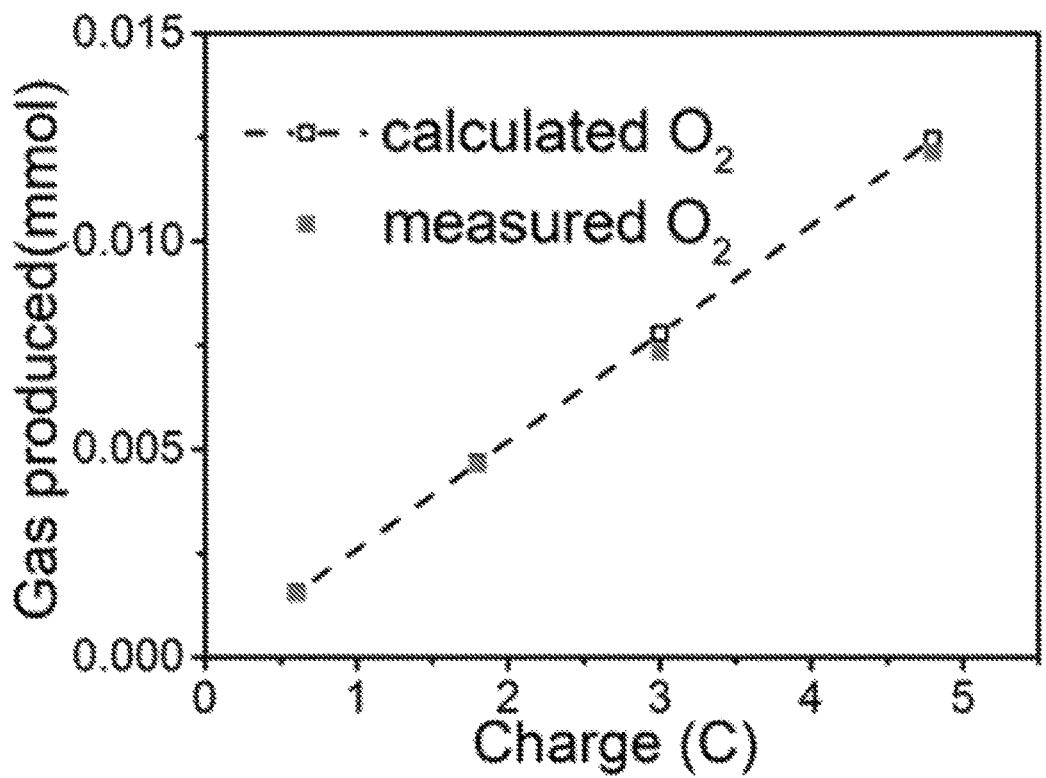
FIG. 19a is a graph showing the GC-FID quantification of oxygen product in the electrochemical cell in the absence of chitin.
Figure 19B:
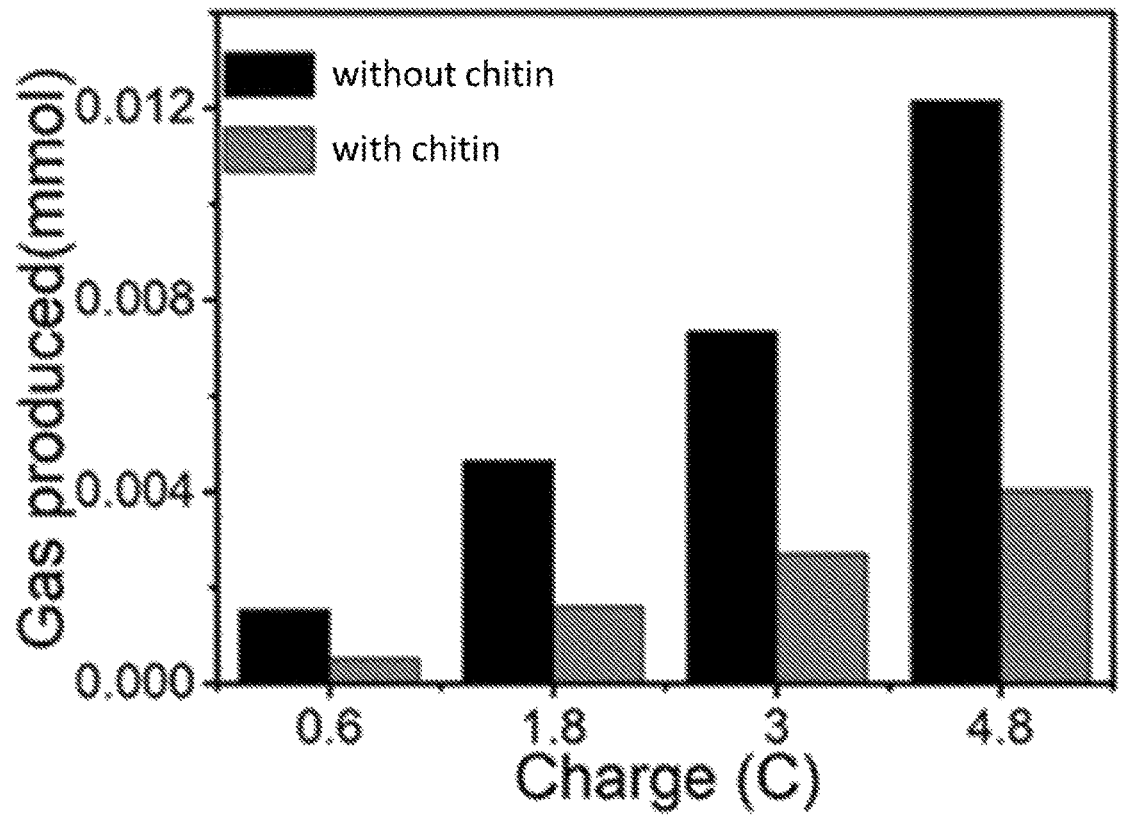
FIG. 19b is a graph showing oxygen evolution during electrochemical conversion with and without chitin.

FIG. 18*a* depicts the CV curves of the anode in 1.0M KOH with (red) and without (black) 33.3 mg L-1 chitin, respectively. Δj labels the current density difference at 1.7 V vs. RHE, and ΔV labels the potential difference at 0.4 A cm$^{-2}$. In the absence of chitin, the anode showed good Oxygen Evolution Reaction (OER) activity in basic media with onset potential of 1.55 V vs. RHE. Significant OER current appeared after Ni oxidation peak ($Ni^{2+} \rightarrow Ni^{3+}$) at around 1.40 V vs. RHE, indicating $Ni^{3+}$ was the active center for water oxidation. In the presence of chitin, the anodic current emerged earlier and increased faster than the pure OER current. Specifically, the current density was Δj~600 mA cm$^{-2}$ (or 2.5 times) higher at 1.7 V vs. RHE, and the potential was ΔV~80 mV lower at 0.4 A cm$^{-2}$, than those of the pure OER curves, suggesting the electrochemical conversion of chitin (CCR) was kinetically more favorable than OER (see labels in FIG. 18*a*). It was noted that, at high overpotential, nonnegligible OER could occur concurrently with CCR, thus the observed current density comes from both OER and CCR (OER+CCR). CCR and OER are believed to share the same active sites because the generated oxygen decreased when chitin was added, as demonstrated in FIG. 19*a* and FIG. 19*b*.

Additionally, it was observed that the $Ni_2P/NF$ cathode was very active for HER in 1.0M KOH electrolyte with a potential of −180 mV vs. RHE for current density of 100 mA cm$^{-2}$.

Electrochemical Impedance

Figure 18B:
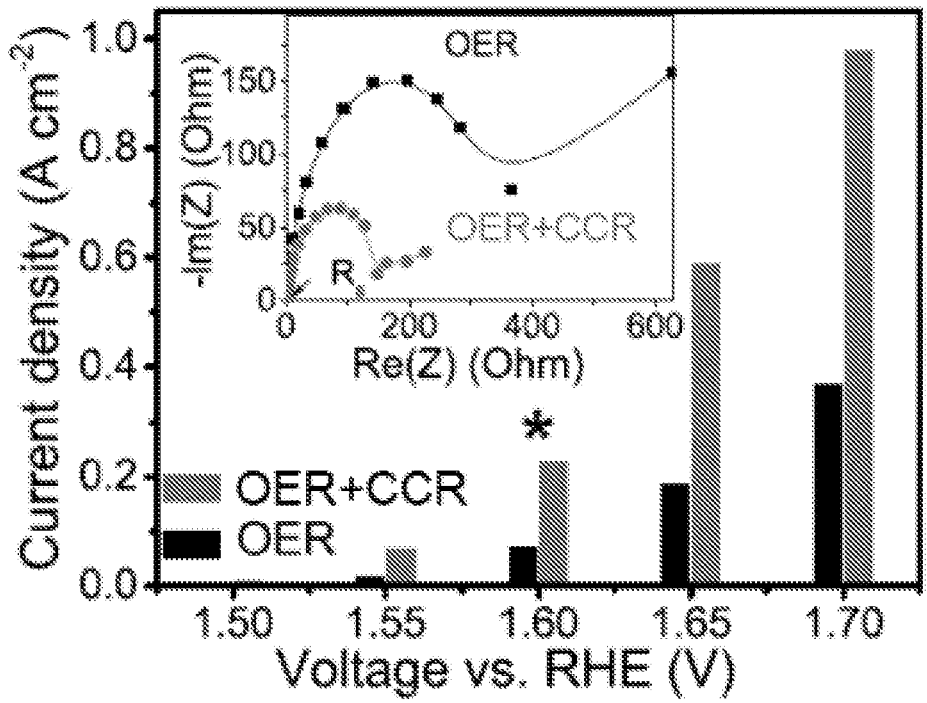
FIG. 18b is a graph comparing current density at various potential with (OER+CCR) and without (OER) chitin. Inset is the corresponding electrochemical impedance spectra (EIS) at open-circuit potential. *labels the voltage where faradaic efficiency of the oxygen evolution reaction (OER) is characterized in FIG. 20.
Figure 21:
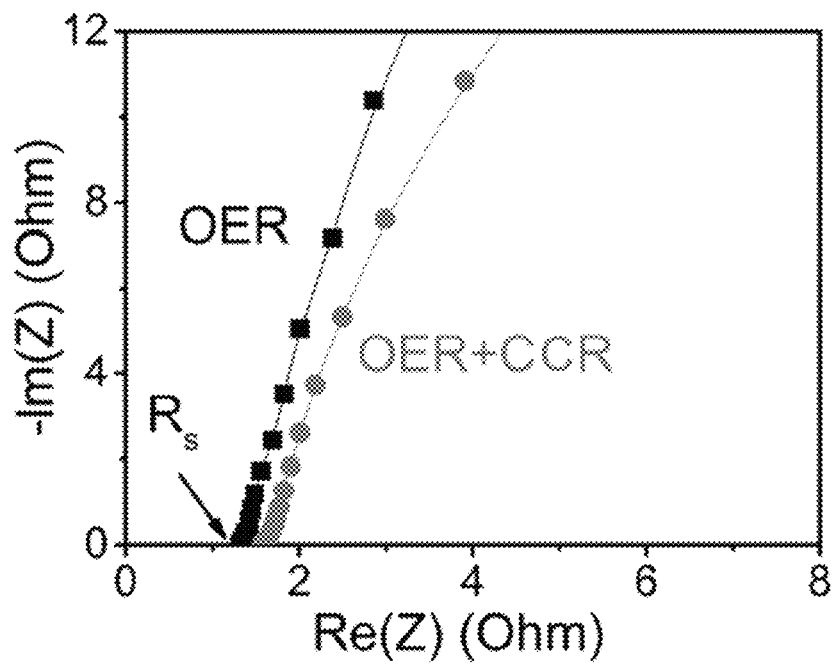
FIG. 21 is a graph showing the EIS spectra of the electrochemical conversion with (OER+CCR) and without (OER) chitin.
Figure 22A:
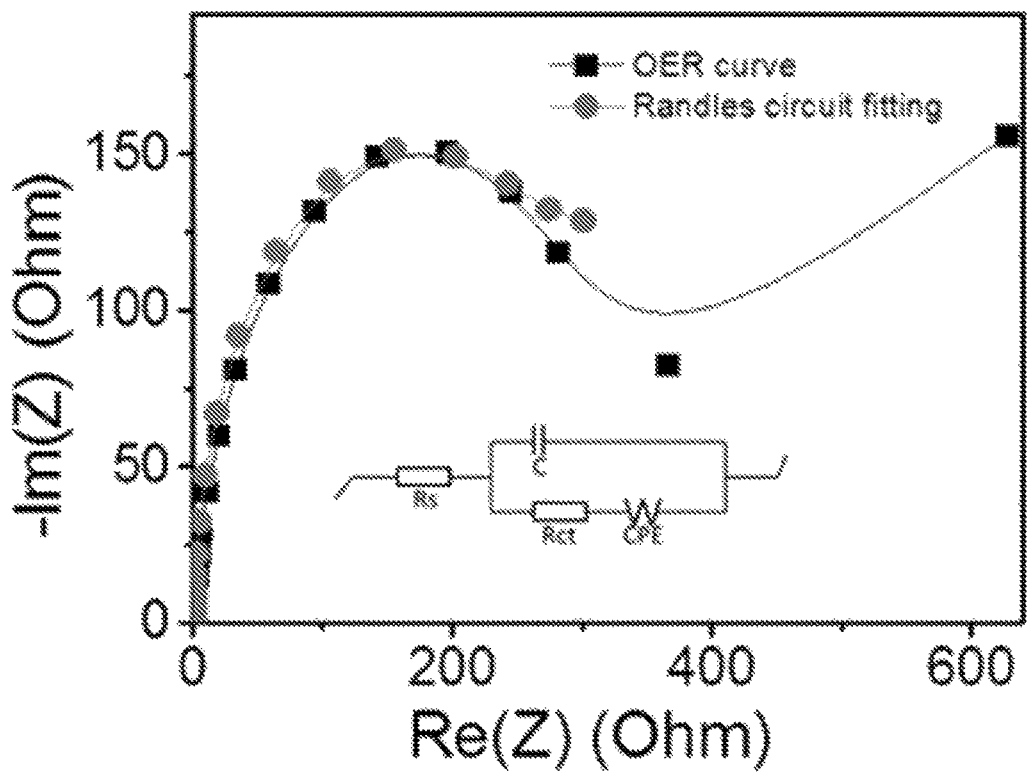
FIG. 22a is a graph showing the Nyquist plot, at open circuit, of the oxygen evolution reaction (OER).
Figure 22B:
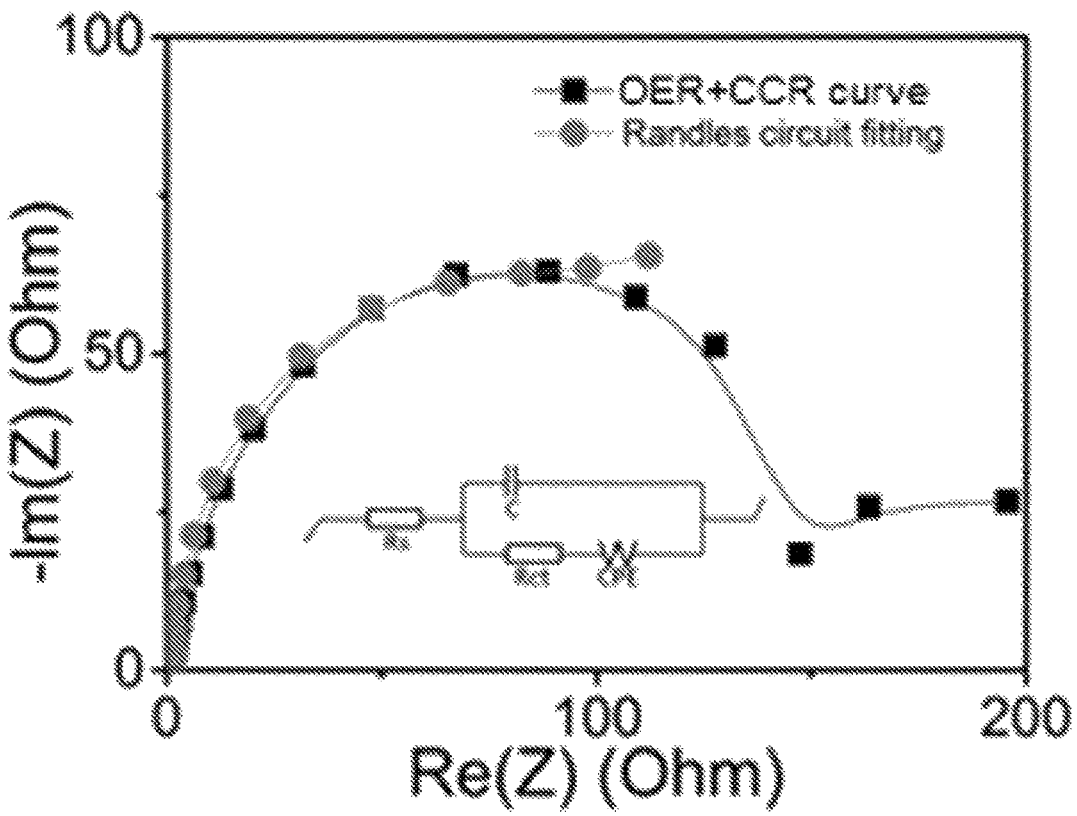
FIG. 22b is a graph showing the Nyquist plot, at open circuit, of the chitin conversion reaction (OER+CCR).

The EIS spectra at open-circuit voltage (OCV) show that the series resistances Rs (left intersection point with x-axis) for both the oxygen evolution reaction (OER)+chitin conversion reaction (CCR) (red circles) and pure OER (black squares) curves are similar (FIG. 21 and the inset of FIG. 18*b*). In contrast, the charge-transfer resistance Ra (diameter of the semicircle) of the OER+CCR curve was 2.4 times lower than that of the pure OER curve (FIG. 22*a*, FIG. 22*b* and Table 2). This comparison suggested that the much higher current density observed in CV scan (FIG. 18) was caused by a much faster kinetics/reaction rate of CCR than that of OER. Similar to OER, the CCR current increased after the Ni oxidation peak, suggesting that high-valent Ni species were responsible for chitin conversion. The differences between the current densities of OER+CCR and OER at the same potential are summarised in FIG. 18*b*. It was evident that the CCR current (i.e., the difference between red and black bar) as larger than pure OER current in the full range of the potential applied, and selective chitin conversion (negligible OER) was possible with a potential lower than 1.55 V vs. RHE.

TABLE 2

Randles circuit fitted impedance for oxygen evolution reaction (OER), chitin conversion reaction (CCR), and ball-milled chitin conversion reaction (M-CCR) at open circuit potential

| | RS (OHM) | RCT (OHM) | CPE (OHM S$^{-0.5}$) |
|---|---|---|---|
| OER | 1.42 | 265.8 | 49.7 |
| CCR | 1.68 | 94.9 | 16.1 |
| M-CCR | 1.66 | 37.2 | 13.7 |

Oxygen Generation

Figure 18C:
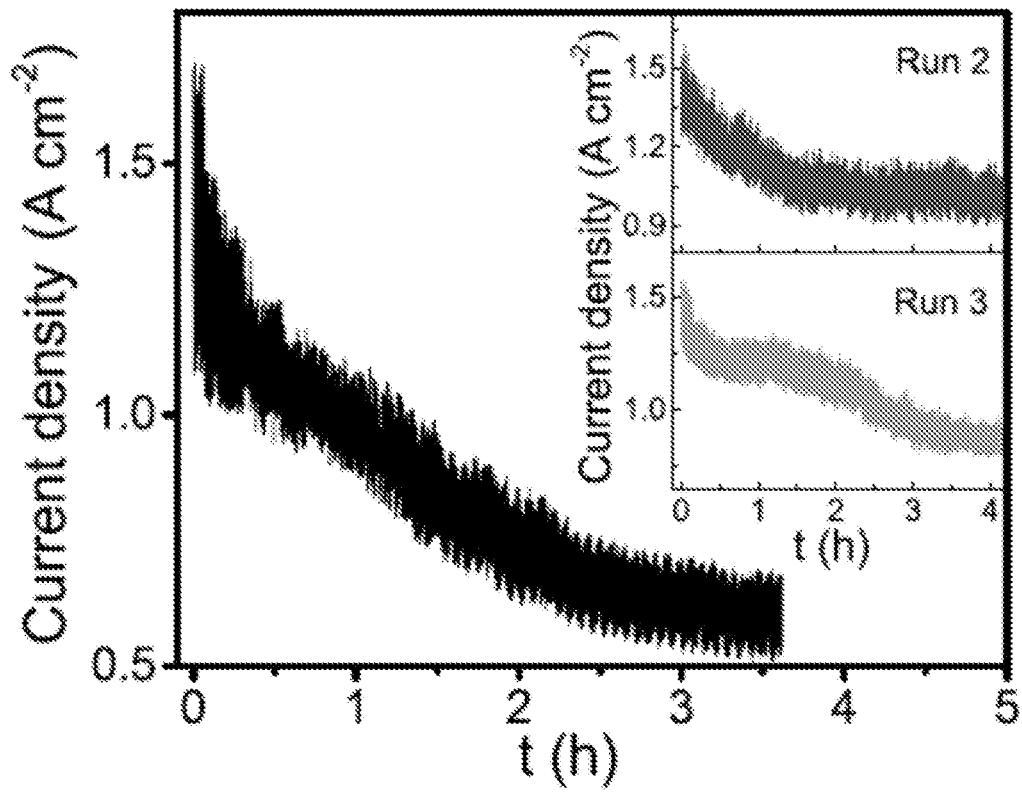
FIG. 18c are graphs showing the three consecutive runs of the chitin conversion reaction, with current density plotted against reaction duration.
Figure 20:
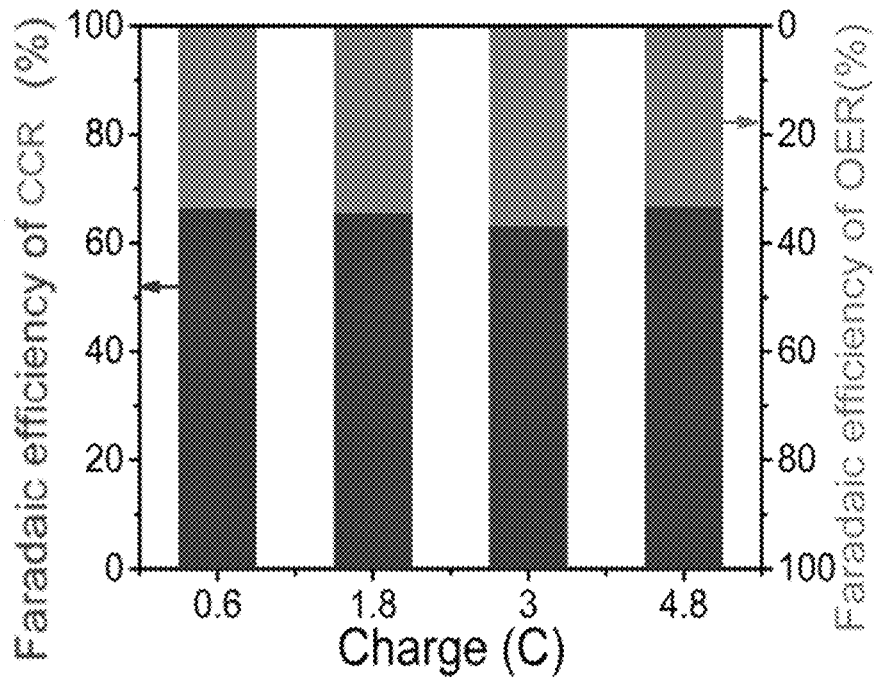
FIG. 20 is a graph showing the faradaic efficiency of the chitin conversion reaction (CCR) and oxygen evolution reaction (OER).
Figure 23A:
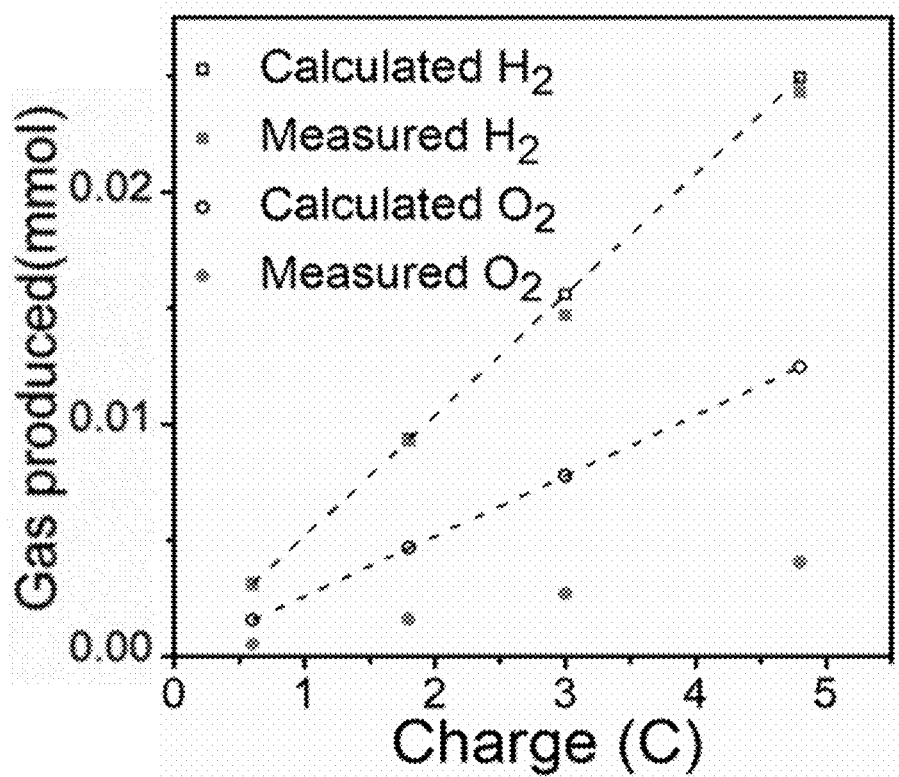
FIG. 23a is a graph showing the experimental and calculated $H_2$ and $O_2$ quantity produced in the electrochemical cell in the presence of chitin.
Figure 23B:
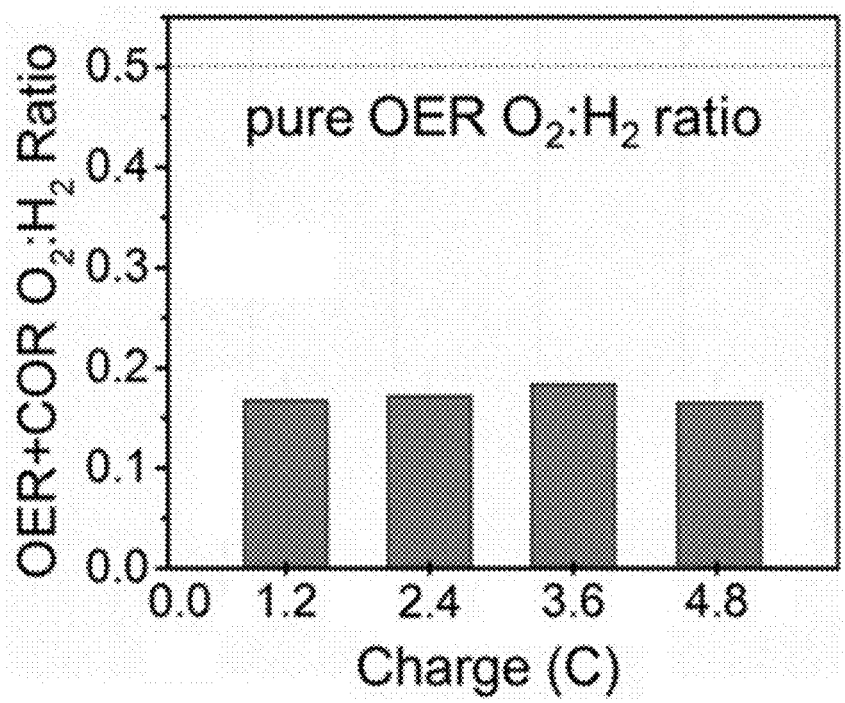
FIG. 23b is a graph showing the time-dependent ratio of $O_2/H_2$ evolution during a chitin conversion reaction (CCR) and hydrogen evolution reaction (HER).

The generated oxygen was analysed by gas chromatography with a thermal conductivity detector (GC-TCD), as displayed in FIG. 23*a* and FIG. 23*b*. It was confirmed that the generated oxygen was much less than the theoretical value (i.e., $O_2:H_2=1:2$). Faradaic efficiency of $O_2$ at 1.6 V vs. RHE was about 30% (FIG. 20), consistent with the current density ratio measured in FIG. 18*b* (labeled as *). The chronoamperometry curve in FIG. 18*c* showed that the total current (OER+CCR) decreases with the reaction duration. 33.3 mg L$^{-1}$ of the initial chitin could be mostly converted in 3.5 h at a potential of 1.7 V vs. RHE.

Stability of Electrode

Figure 24:
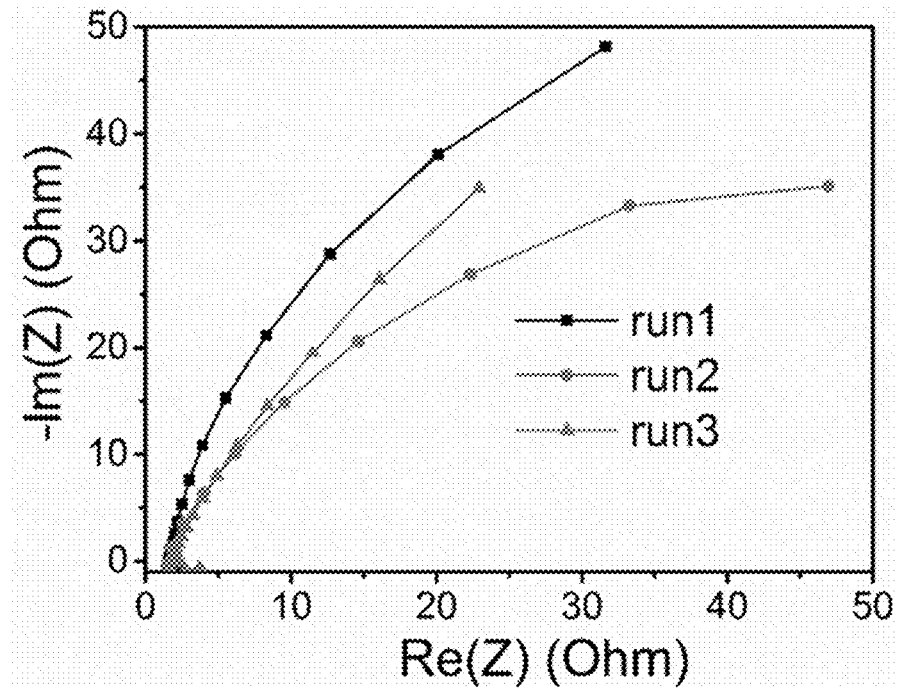
FIG. 24 is a graph showing the EIS spectrum at open circuit potential for three consecutive chitin conversion reaction (CCR) runs.
Figure 25:
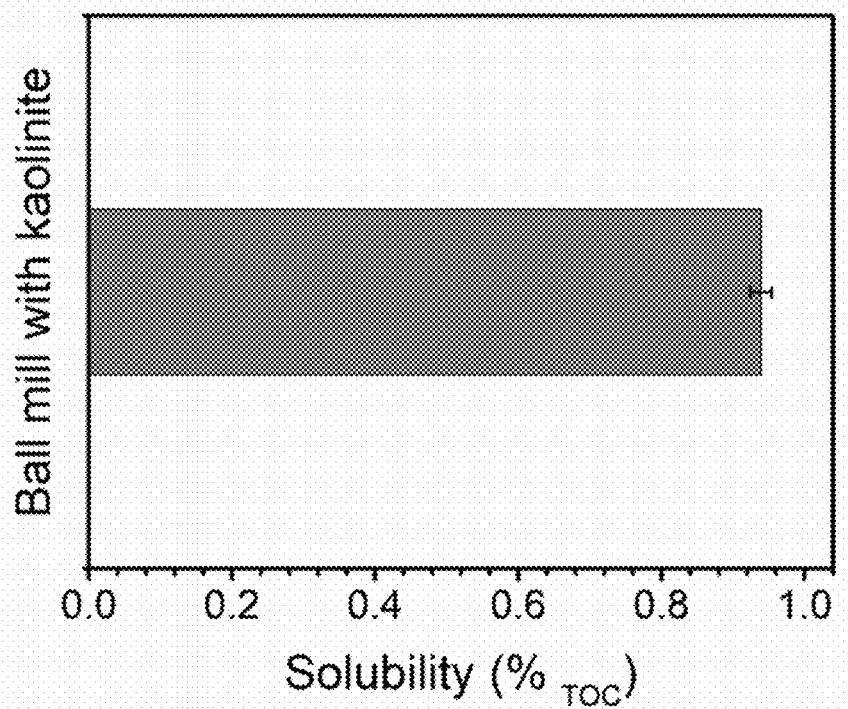
FIG. 25 is a graph showing the solubility of the Total Organic Carbon (TOC) after ball-milling of chitin in the presence of kaolinite.

The stability and reusability of the electrode for chitin conversion were also evaluated by repeating the conversion of fresh chitin samples using the same anode. As shown in the inset of FIG. 18*c*, the activity of the anode for chitin oxidation could be well preserved in three consecutive runs, which was also corroborated by similar Electrochemical Impedance Spectroscopy (EIS) curves (FIG. 24). To significantly increase the chitin solubility in the KOH electrolyte, a mechanochemical pre-treatment process was conducted (see FIG. 25 and Example 2c). Ball-milled chitin (3.5 g L$^{-1}$, M-CCR curve in FIG. 18*d*) showed much higher current density with an overpotential reduction of 170 mV owing to the increased solubility (FIGS. 26 and 27) as well as the thermodynamic and kinetic favorability (see FIG. 28), due to the greatly reduced molecular weight that will be detailed later.

Comparison of Energy Usage in the Electrochemical Conversion

Figure 18D:
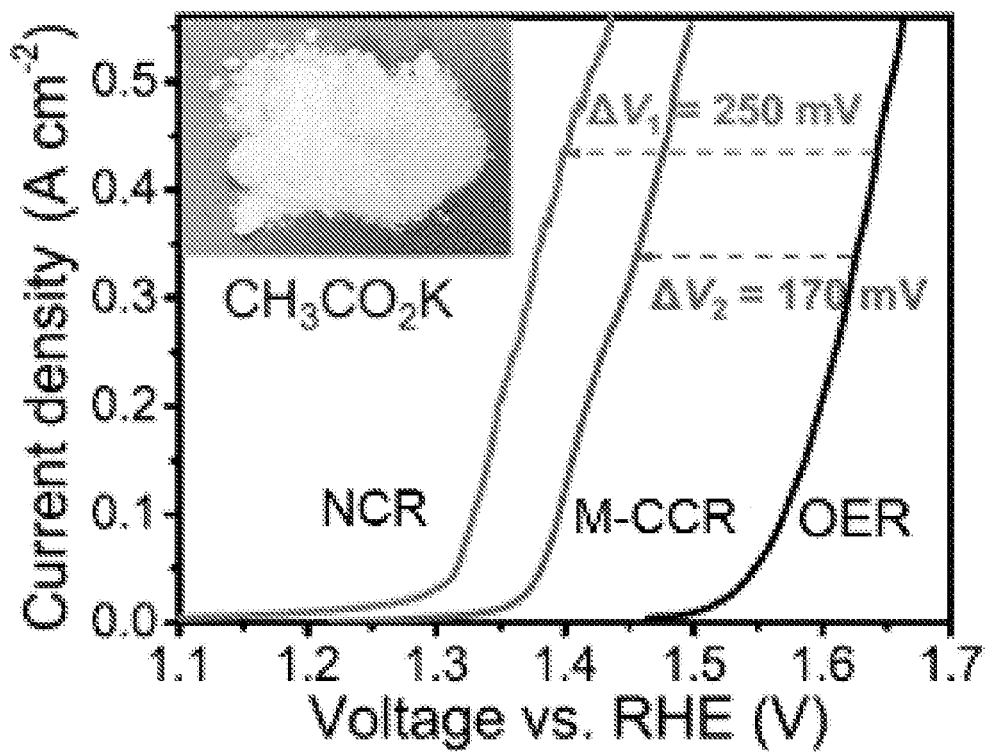
FIG. 18d is a graph showing the LSV spectrum of the anodic reaction in the presence of N-acetylglucosamine (NCR), ball-milled chitin (M-CCR), and without any substrate (OER).

In order to see the potential of CCR in energy savings, the monomer of chitin, N-Acetyl Glucosamine (NAG), which dissolved well in the electrolyte was tested. As shown in FIG. 18*d*, the NAG conversion reaction (NCR) current with 2.2 g L$^{-1}$ of NAG as reactant leapt at around 1.24 V vs. RHE, which was much lower than the onset potential of OER around 1.49 V vs. RHE. As a result, highly selective NAG conversion (without OER) occurred in the potential window ranging from 1.24 to 1.49 V vs. RHE. Such a low onset potential of NCR indicated that $Ni^{2+}$ was able to oxidize NAG. The 250 mV reduction in OER overpotential corresponded to 15% energy usage in electrolysis. It is worth noting there was negligible oxygen detected by Gas Chromatography-Thermal Conductivity Detector (GC-TCD) up to 1.45 V vs. RHE (FIG. 29*a* to FIG. 29*d*).

Figure 30:
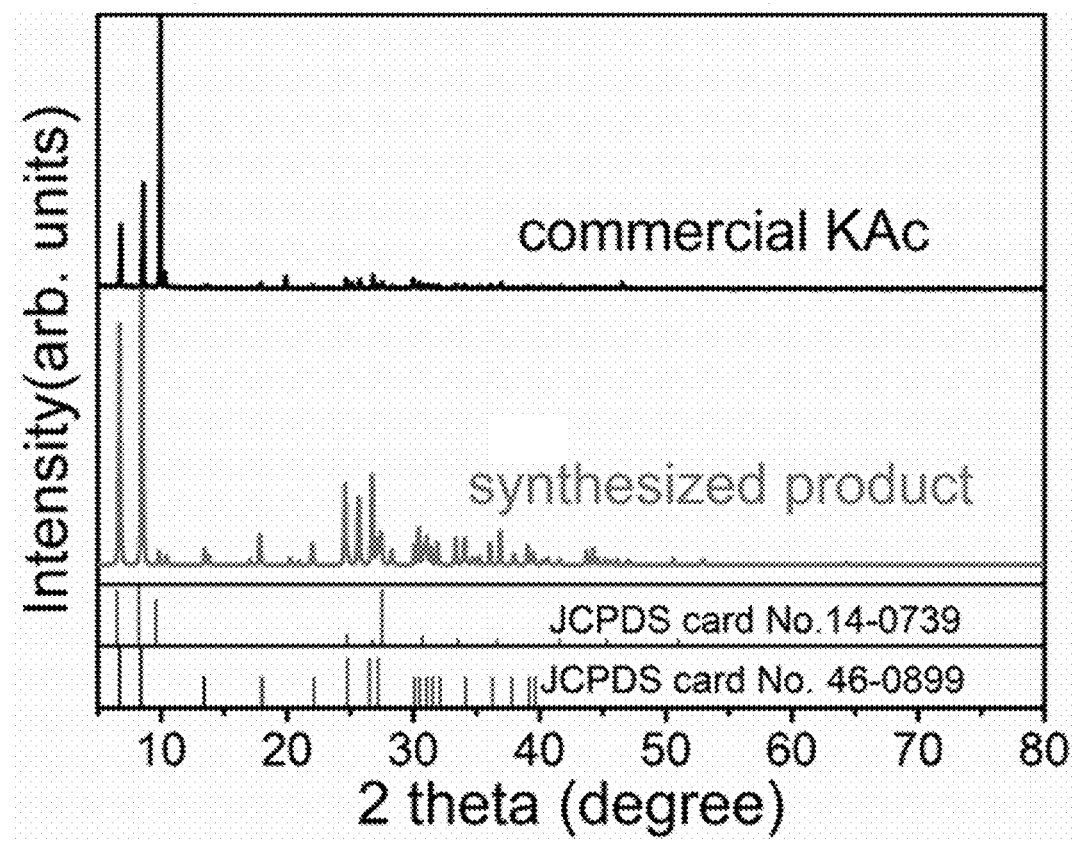
FIG. 30 is a graph showing the XRD pattern of KAc product, with commercial potassium acetate shown for comparison.

Further, a previously reported precipitation method was adopted to extract potassium acetate product (see FIG. 30).

Briefly, the post-reaction solution was concentrated at 40° C. under vacuum to a viscous state. The concentrated product was further cooled to 0° C. in an ice bath. A fleck of potassium acetate was added to initialize crystallization. The product was allowed to crystallize at 0° C. for 30 min. The crystalline slurry was then filtered over a medium-porosity glass frit and compacted to aid the removal of any excess KOH solution from the crystalline product. The resulting solid was further dried at 80° C. under vacuum condition for one day to get acetate hydrate product with purity of 99%. The remaining KOH solution can be further recycled for the next run of electrolysis, as depicted in FIG. 46.

Figure 31:
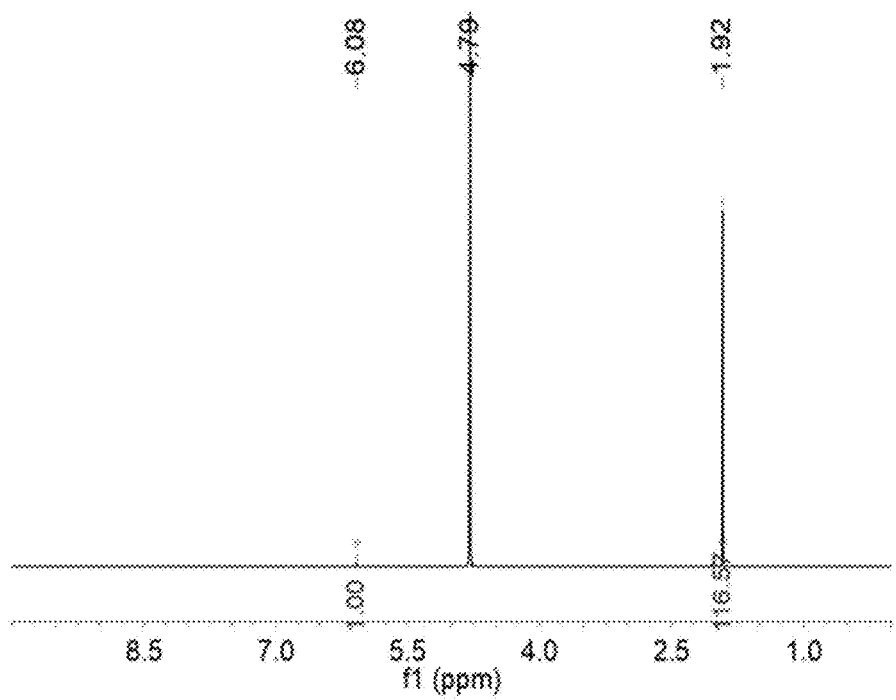
FIG. 31 is a $^1$H NMR spectrum of the KAc product, with 0.2 ml of 25 mM maleic acid added as standard.
Figure 32:
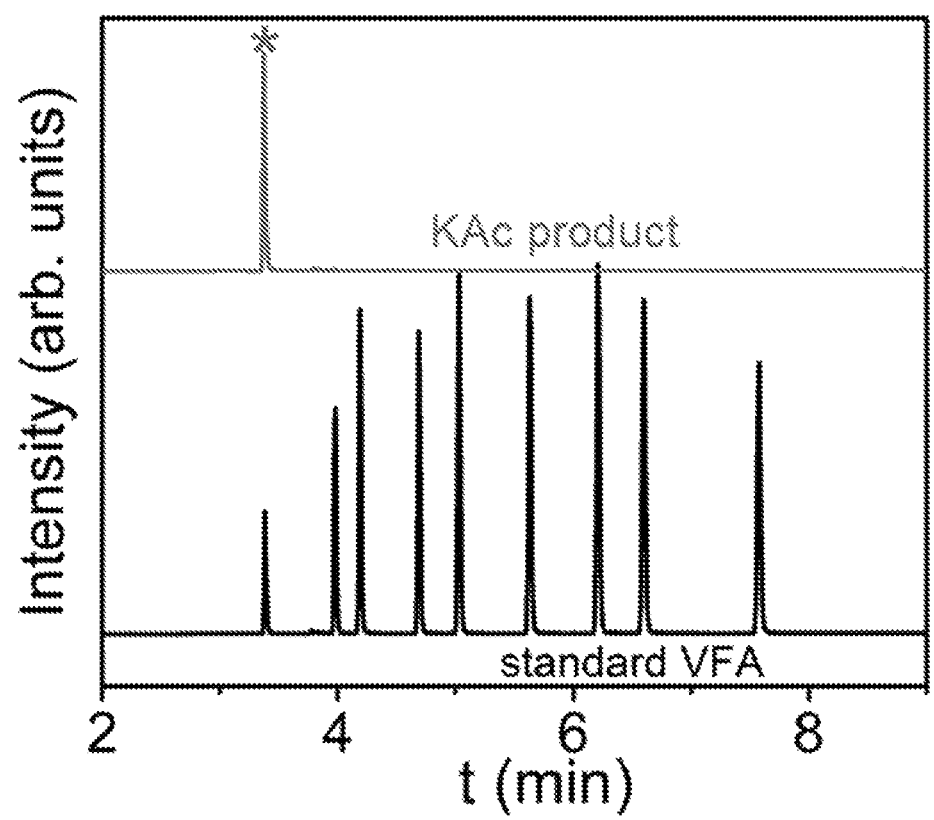
FIG. 32 is a graph showing the GC-FID quantification of KAc product against 4 mM VFA standard.

An optical image of the powder of potassium acetate hydrate ($CH_3CO_2K \cdot xH_2O$) product is found in the inset of FIG. 18*d*, with detailed characterizations shown in FIGS. 30-32. It is noted that the energy ΔG needed for pyranose-ring opening and glycosidic bond breaking was much lower than that of water splitting. This is consistent with the observed much lower onset potential of N-acetyl glucosamine conversion reaction (NCR) than that of OER.

However, the thermodynamic advantage of chitin conversion reaction (CCR) over OER was much smaller due to the high degree of polymerization of NAG in chitin, resulting in the extra energy barrier arising from depolymerization.

CCR Product Identification and Quantification

The converted products formed at the anode were first identified by GC-mass spectrometry (GC-MS) method in the same way as detailed in Example 5a.

Briefly, liquid-liquid extraction (LLE) and solid-phase extraction (SPE) were performed ethyl acetate (EAc) and dichloromethane (DCM) as the solvent and SPE cartridge as the solid-phase column, respectively. The identification of products and intermediates were performed on GC-MS (gas chromatography-mass spectrometry, GCMS-QP2010ULTRA, Shimadzu) with ZB-WAXplus (Phenomenex) column of 30 m×0.25 mm with a film thickness of 0.25 μm. For the intermediate's identification, the reaction solutions at different reaction time, ranging from 10 minutes to 2 hours, were collected. For product identification, 4 runs of reaction solutions were collected for further extraction. Prior to extraction, the reaction solutions were acidified with 37 wt % HCl solution to pH value of 2.0. The acidified solutions were further liquid-liquid extracted using dichloromethane (DCM) and ethyl acetate and solid-liquid extracted with cartridges (Waters Oasis®HLB, Waters Corporation, United States), respectively. Three microliters of extracted samples were injected for each test. The splitless injection was used at 240° C. with helium as a carrier gas at 1 mL min$^{-1}$. The temperature program was as follows: 50° C., hold 7 minutes, increase 7° C. min$^{-1}$ to 240° C., hold for 14 minutes. The MS was operated in electron ionization (EI) mode with the ion source temperature at 220° C., and mass spectra were acquired from m/z 30 to 500 after a solvent cut time of 5 minutes. The peaks were identified using the NIST11 library (National Institute of Standards and Technology, Gaithersburg, MD, http://www.nist.gov/srd/mslist.htm), and a compound was identified if the match was >80% (most matches were considerably higher).

Figure 33A:
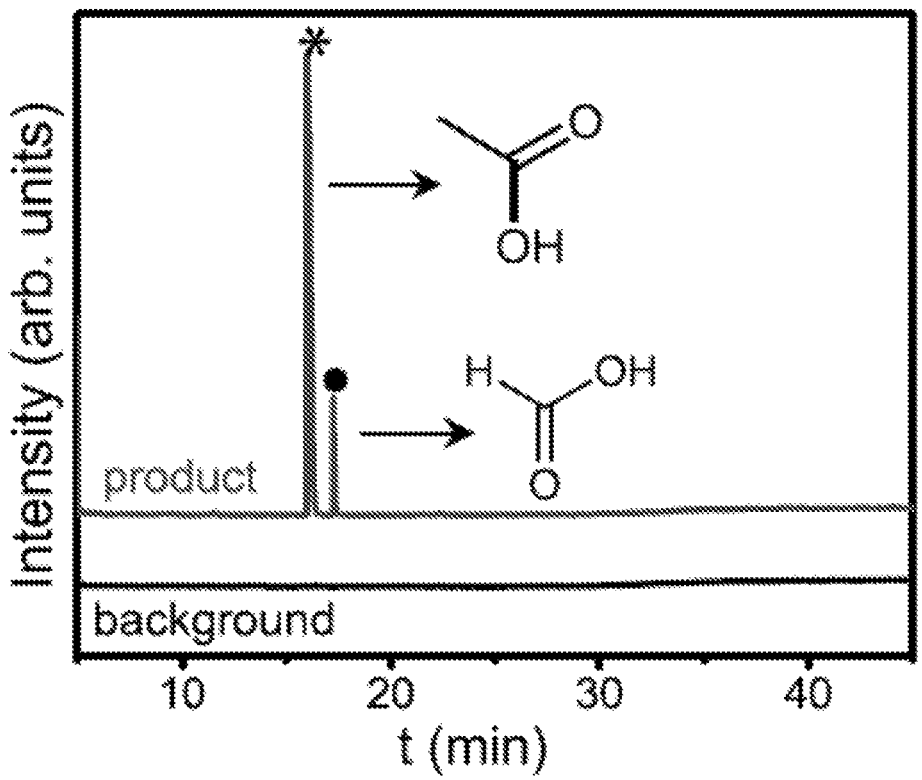
FIG. 33a is a graph showing the GC-MS analysis of chitin conversion reaction products after liquid-liquid extraction (LLE) with ethyl acetate.
Figure 33B:
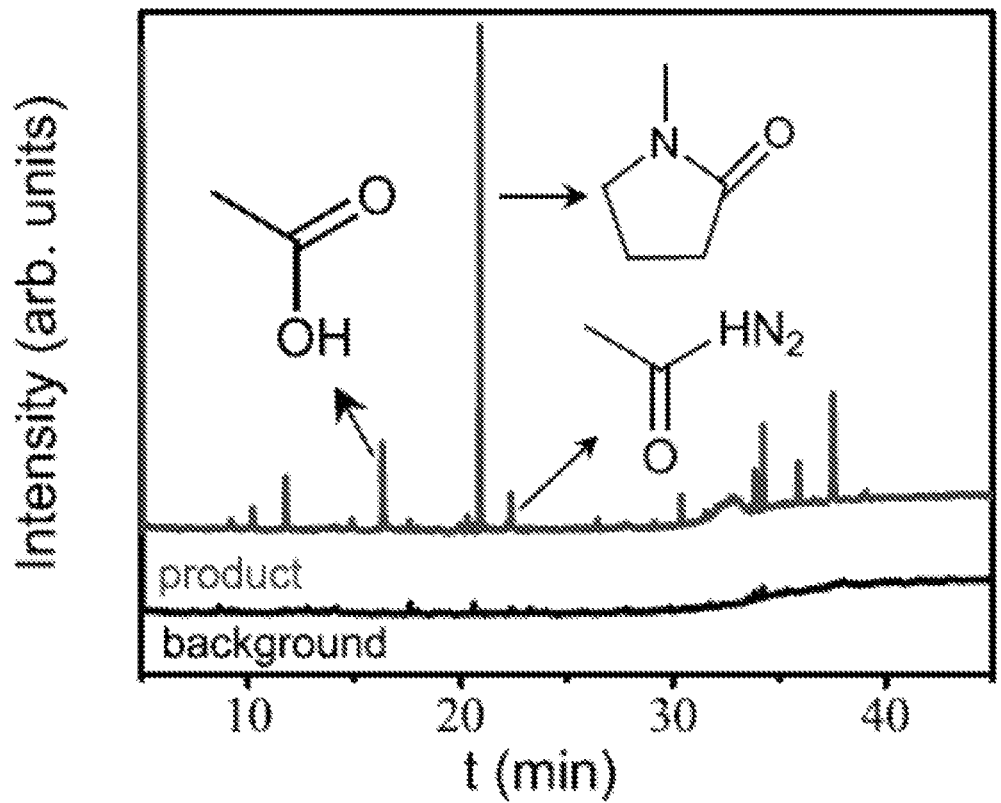
FIG. 33b is a graph showing the GC-MS analysis of chitin conversion reaction products after solid-phase extraction (SPE) with DCM.
Figure 34:
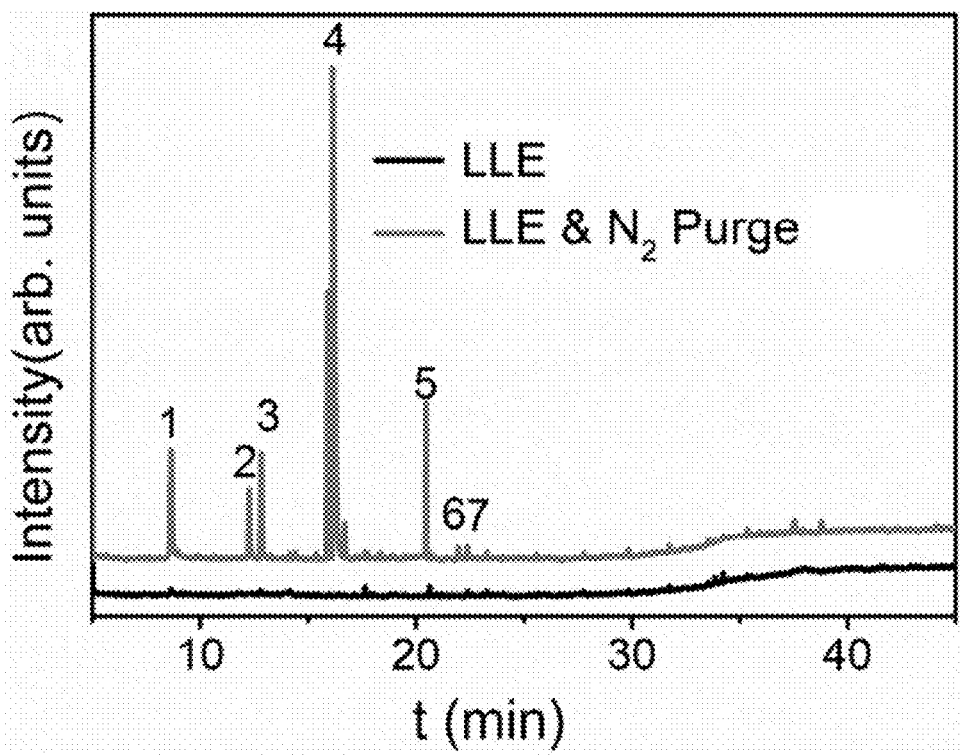
FIG. 34 is a graph showing the GC-MS measurement of the intermediates during chitin conversion reaction (CCR) after liquid-liquid extraction (DCM), and after liquid-liquid extraction with nitrogen purge and capture (DCM LLE & $N_2$ Purge).

In order to test for all possible CCR products/intermediates, the products at various stages of reaction before the reactant was fully converted were collected. LLE extraction using EAc solvent (red spectrum in FIG. 33a) showed organic acid products, which contained dominantly acetic acid (HAc) with minor formic acid, in contrast to the flat background spectrum (solvent only). SPE extraction results (FIG. 33b) showed N-containing chemicals, where NMP appeared to be dominant. Various intermediate products were also found by other extraction methods, as shown in FIG. 34. The corresponding chemicals of the peaks were (1) Tetrahydrofurfuryl alcohol, (2) 2-Hydroxyisobutyric acid, (3) 3-hydroxybutyraldehyde, (4) Acetic Acid, (5) 5-Methyl-3-hexanol, (6) 3-Amino-2-methylpropanoic acid, and (7) Acetamide. In addition, 2-butenedioic acid, glyoxalic acid and threitol were identified by methanol SPE.

Figure 33C:
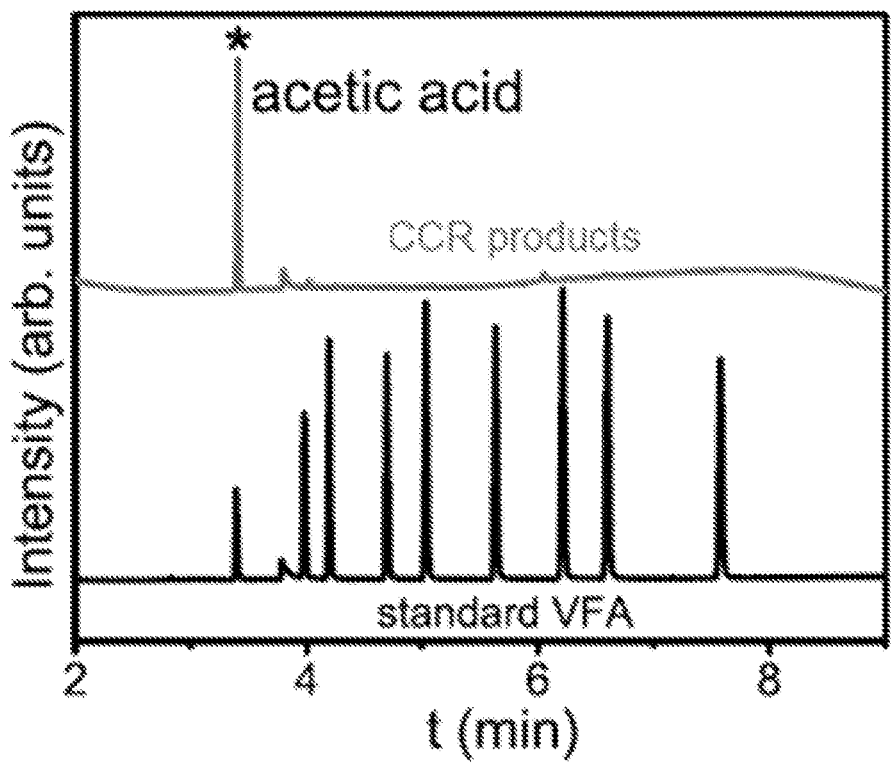
FIG. 33c is a graph showing the GC-FID quantification of acetic acid after electrochemical conversion of chitin, with a VFA spectrum for comparison.

To quantify the yield of HAc, GC with flame-ionization detector (GC-FID) measurements were performed as shown in FIG. 33c. The spectrum of CCR products after completely converting 133.3 mg L$^{-1}$ of chitin, along with 0.1 mM of VFA standard, indicates a HAc concentration of 0.5 mM in the solution after electrochemical conversion.

Figure 26:
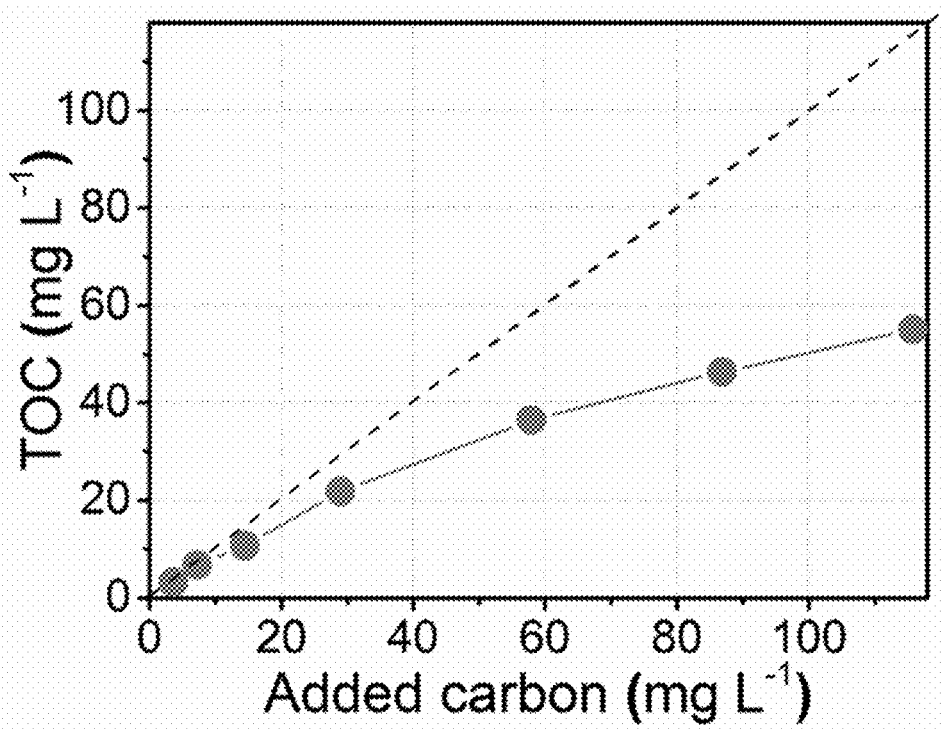
FIG. 26 is a graph showing the dissolution curve of chitin under the freeze-thaw method by TOC testing. Dotted line indicates 100% theoretical solubility.
Figure 27:
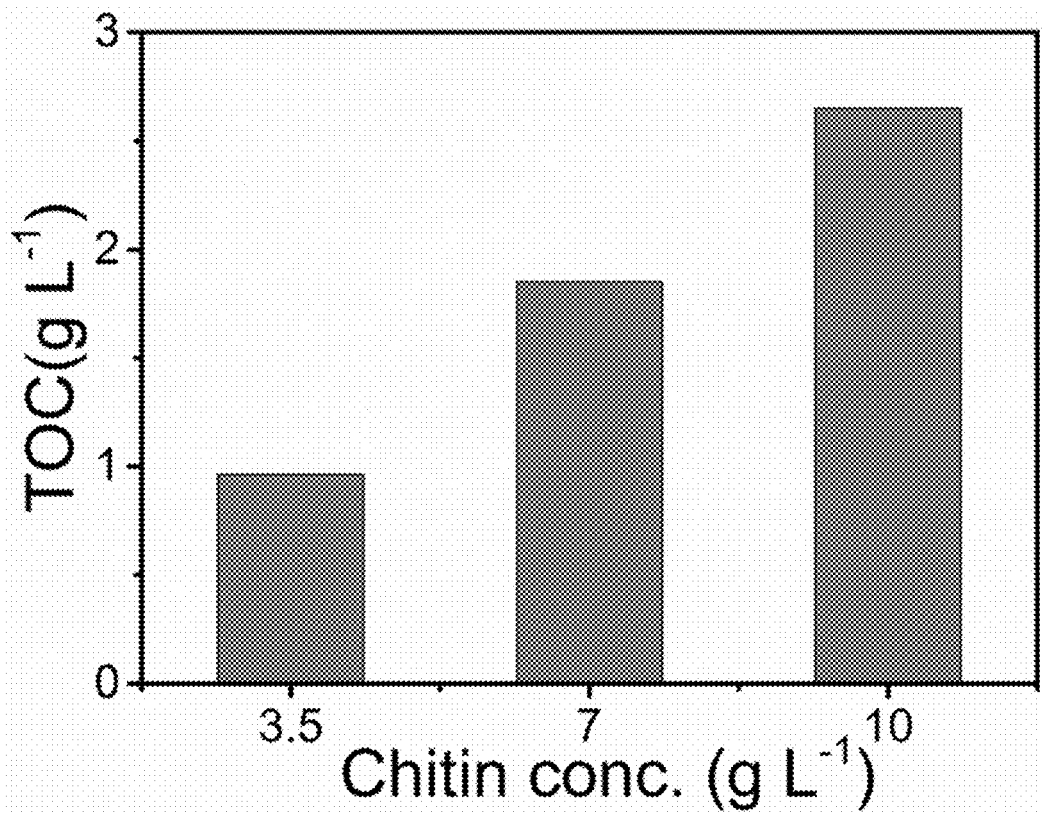
FIG. 27 is a graph showing the solubility of the TOC of chitin, after ball-milling treatment, plotted against different initial starting concentrations of chitin.
Figure 28:
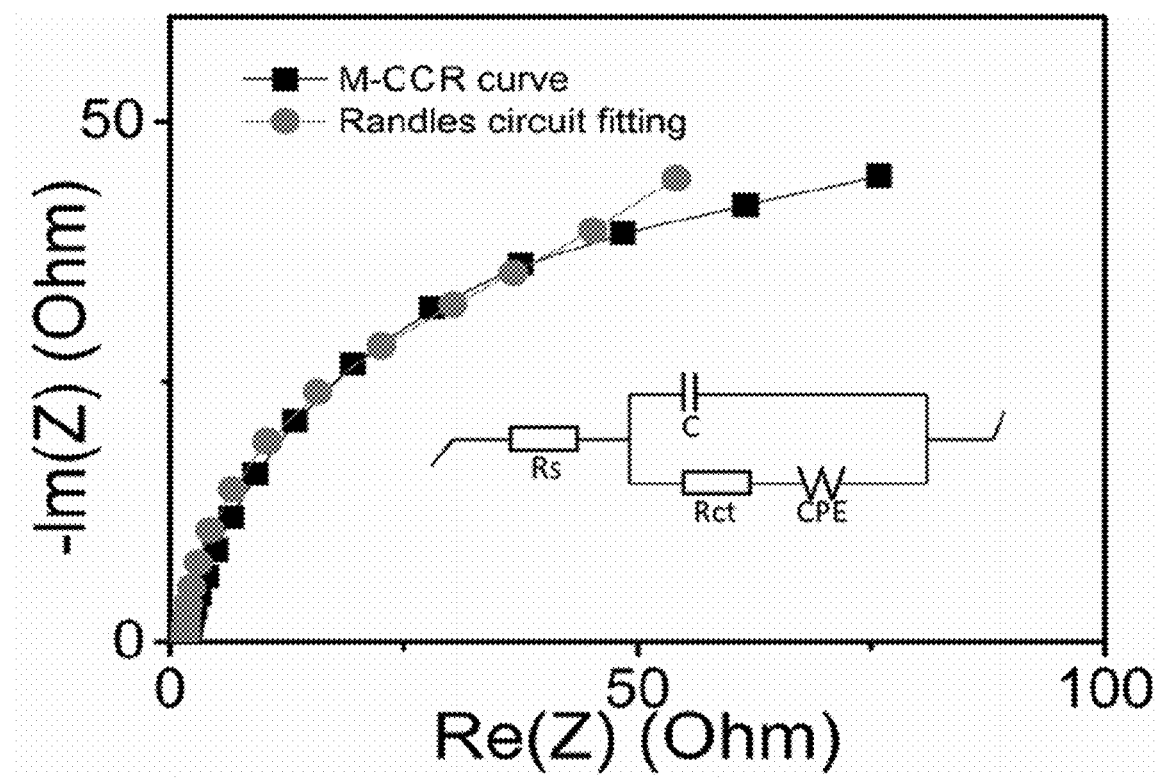
FIG. 28 is a Nyquist plot of the ball-milled chitin conversion reaction (M-CCR) with Randles circuit fitting.
Figure 29A:
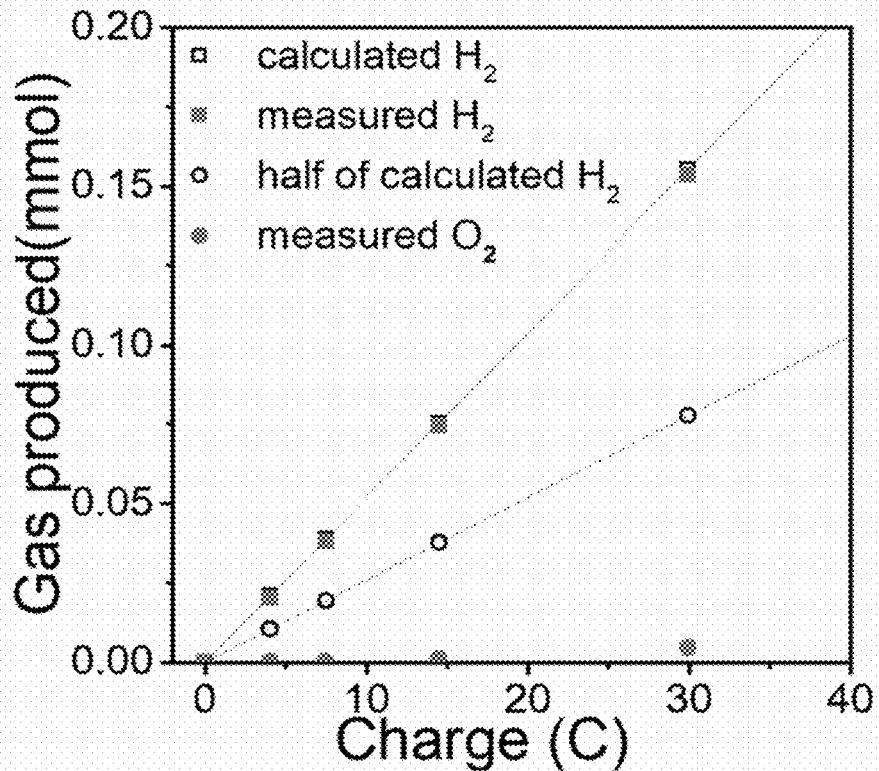
FIG. 29a is a graph showing the theoretical and experimental $H_2$ and $O_2$ quantity during ball-milled chitin conversion reaction (CCR) and hydrogen evolution reaction (HER) at different potentials.
Figure 29B:
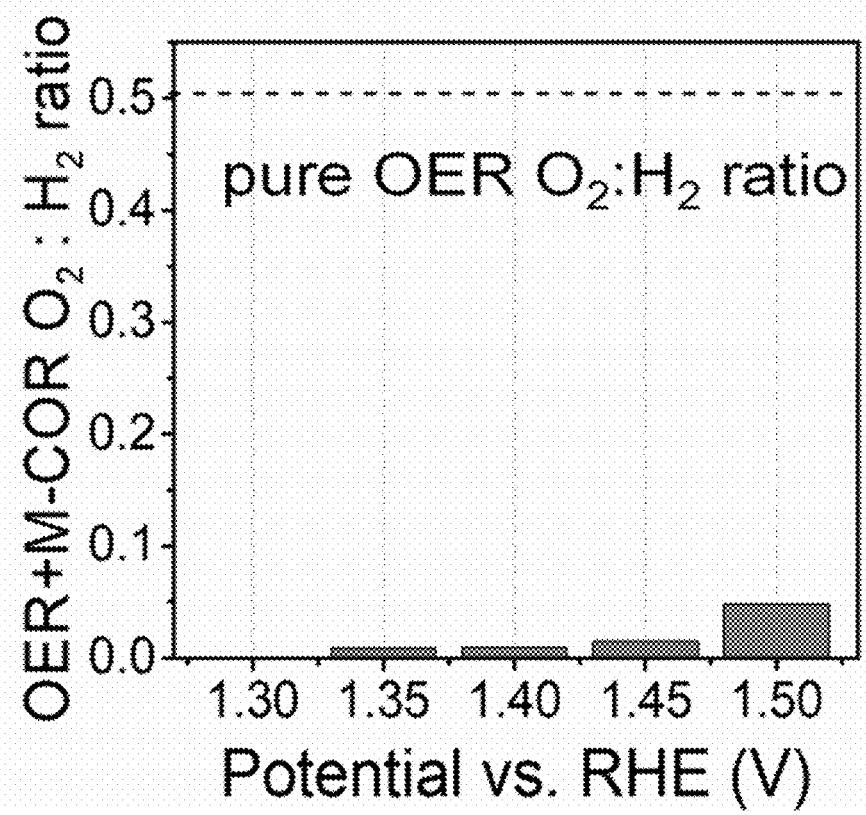
FIG. 29b is a graph showing the ratio of $O_2:H_2$ at different potentials during ball-milled chitin conversion reaction (CCR) and hydrogen evolution reaction (HER).
Figure 29C:
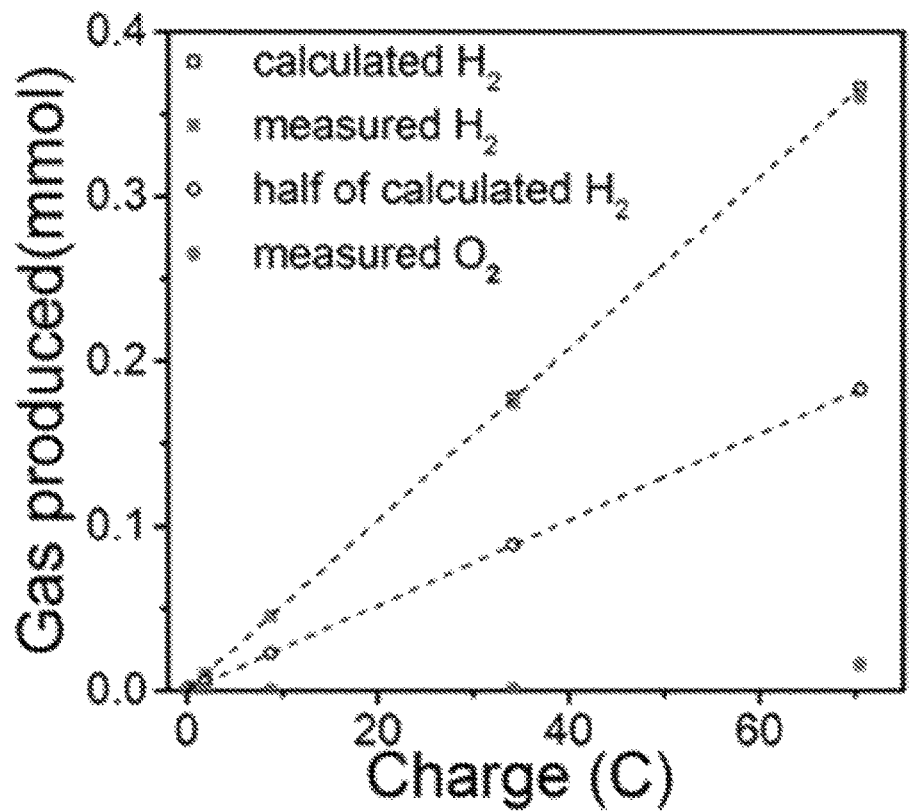
FIG. 29c is a graph showing the theoretical and experimental $H_2$ and $O_2$ quantity during N-acetyl glucosamine conversion reaction (NCR) and hydrogen evolution reaction (HER) at different potentials.
Figure 29D:
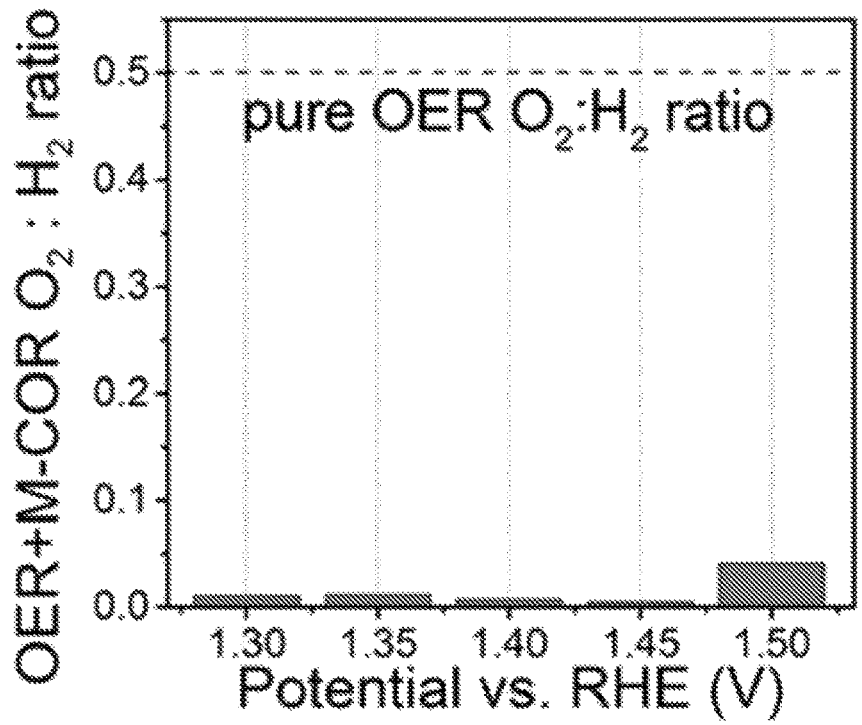
FIG. 29d is a graph showing the ratio of $O_2:H_2$ at different potentials for an electrochemical cell comprising N-acetyl glucosamine conversion reaction (NCR) and hydrogen evolution reaction (HER).
Figure 33D:
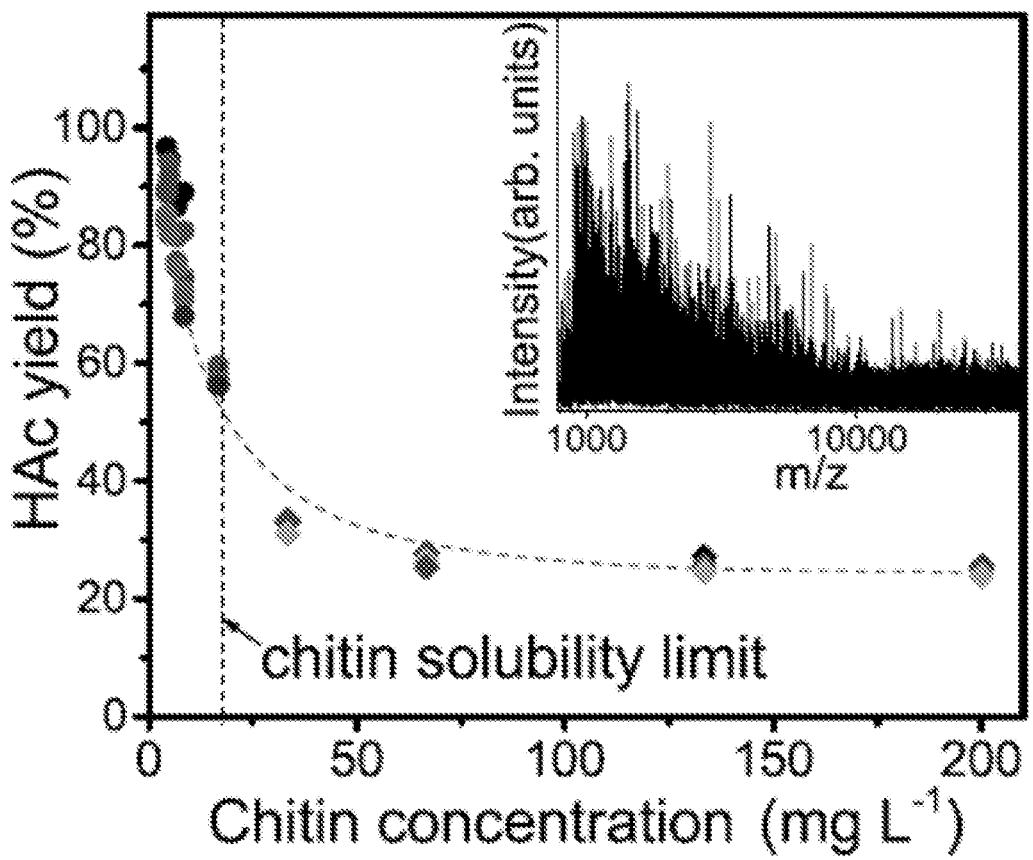
FIG. 33d is a graph showing the yield curve of organic acid, with the vertical dotted line labelling the chitin solubility limit using freeze-thawing pre-treatment. Inset shows the MALDI-TOF-MS spectrum of freeze-thawed chitin in 1.0 M KOH solution.
Figure 35:
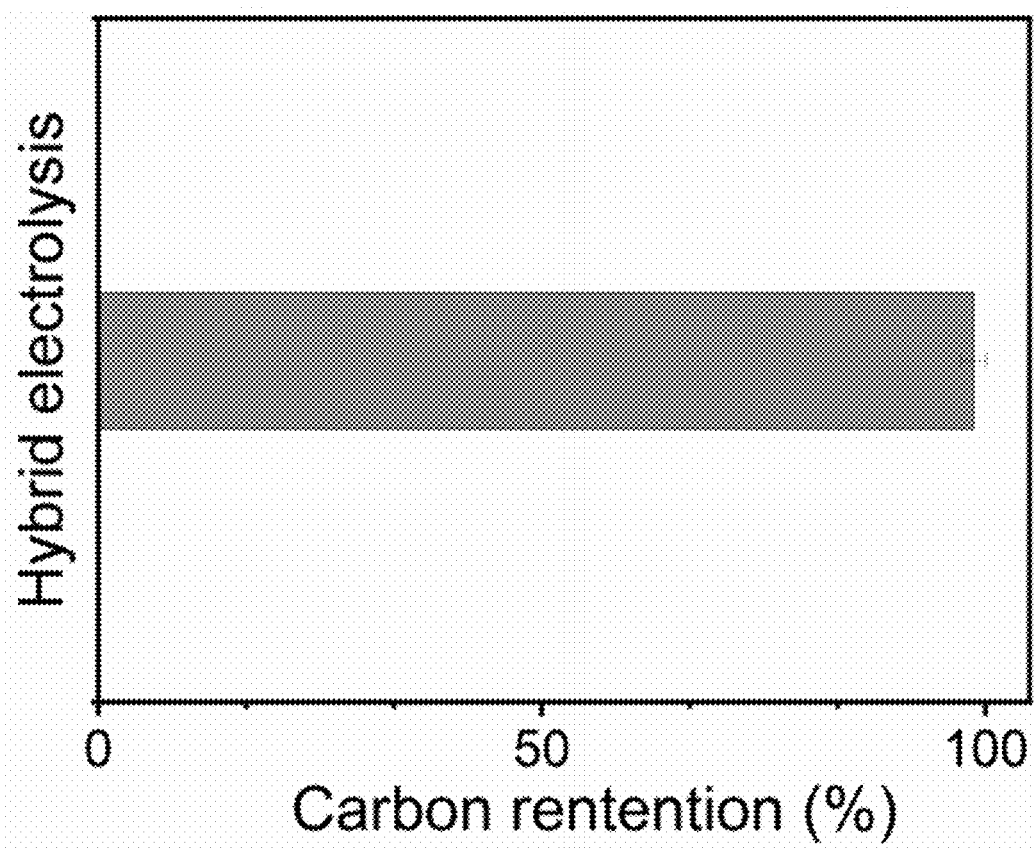
FIG. 35 is a graph showing the carbon retention from the electrochemical conversion of chitin, calculated by the ratio of carbon in the products to that in the reactants.
Figure 36:
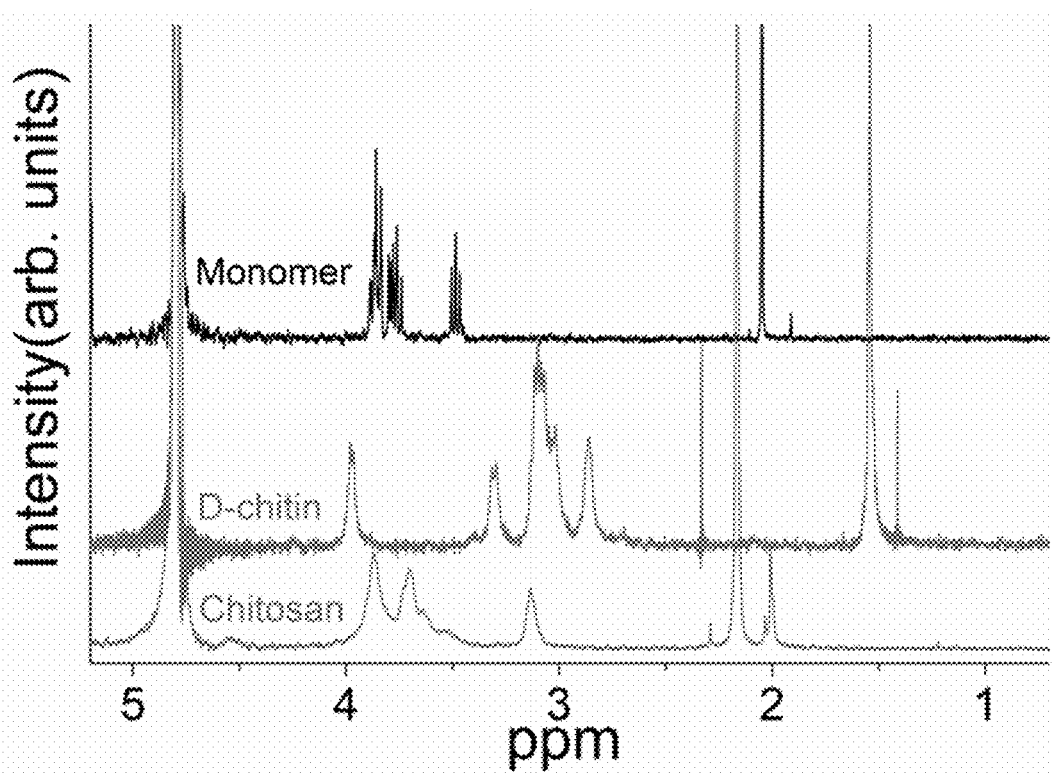
FIG. 36 is a $^1$H NMR spectrum of acidic commercial chitosan, dissolved chitin (D-chitin) and N-acetylglucosamine monomer (Monomer) dissolved in $D_2O$.

In order to find out the solubility of chitin in the electrolyte, total carbon content (TOC) was measured and then plotted against added carbon (by weighing chitin reactant), as depicted in FIG. 26 and FIG. 27. it was noted that the freeze-thaw method was able to achieve chitin solubility of >=8.3 mg L$^{-1}$ in 1.0 M KOH solution. HAc yield from CCR was then calculated by the ratio of carbon in HAc product to that in the chitin reactant. As shown in FIG. 33d and FIG. 35, the completely dissolved chitin could be effectively oxidised to HAc with over 90% yield, corroborating the opening of pyranose rings in chitin. The polymeric nature of the freeze-thawed dissolved chitin was further confirmed by matrix-assisted laser desorptionlionization-time of flight-mass spectrometry (MALDI-TOF-MS) (inset of FIG. 33d) and $^1$H nuclear magnetic resonance (NMR) spectra (FIG. 36).

Hypothetical reaction pathways are illustrated in FIG. 37 based on identified intermediates and products that were all detected in the experiments above. First, chitin was depolymerised and deacetylated under anodic condition to afford glucosamine, releasing HAc from the side chain. Afterwards, glucosamine was further hydrolysed to open the ring, followed by several oxidations and bond-breakings. All intermediates were unstable under the oxidative environment and were thus finally converted into small organic acids as the reaction progressed. Due to the highly oxidative reaction conditions, only HAc and minor formic acid were eventually collected.

Example 5d: Electrochemical Conversion of Shrimp Shell Biomass

Figure 5B:
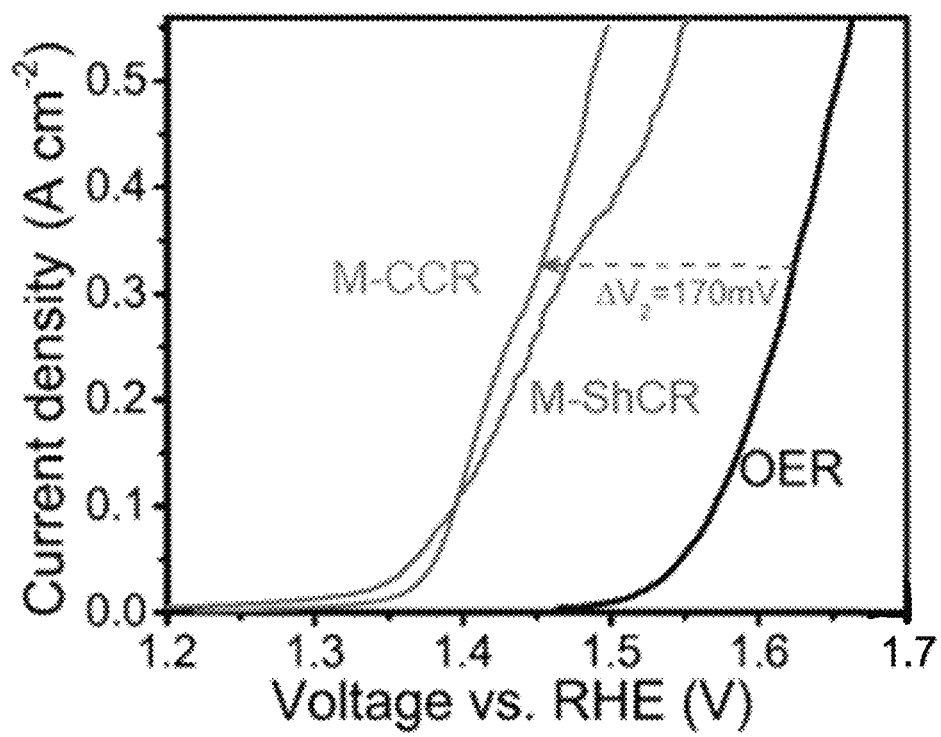
FIG. 5b is a graph showing the Linear Sweep Voltammetry (LSV) of ball-milled shrimp shell conversion reaction (M-ShCR), ball-milled chitin conversion reaction (M-CCR), and the default oxygen evolution reaction (OER).
Figure 5C:
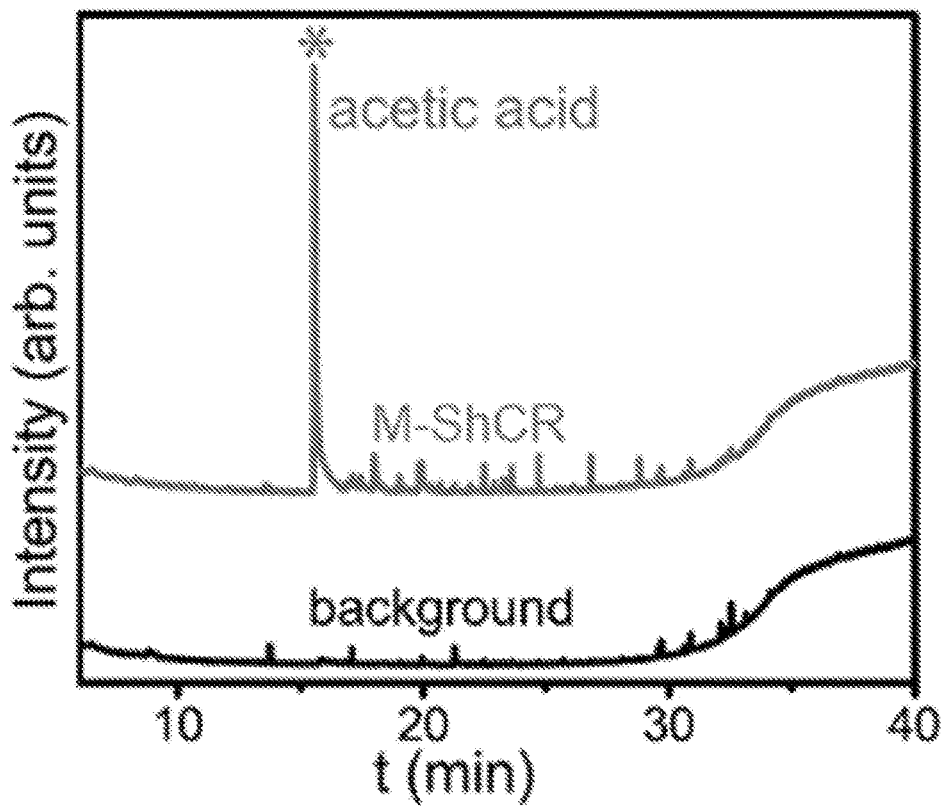
FIG. 5c is a graph showing the Gas Chromatography-Mass Spectrometry (GC-MS) spectrum of the M-ShCR products after liquid-liquid extraction with ethyl acetate.
Figure 5D:
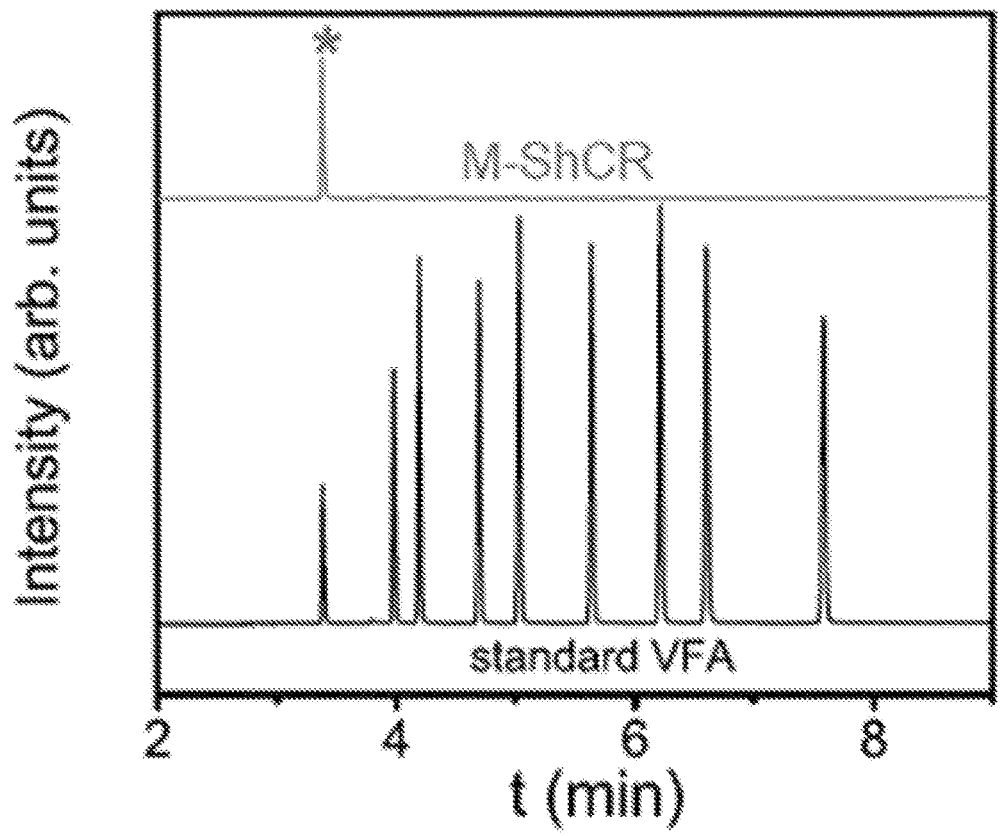
FIG. 5d is a graph showing the Gas Chromatography-Flame Ionization Detection (GC-FID) quantification of acetic acid from 0.8 g L$^{-1}$ M-ShCR products against 4 mM VFA standard.

Following the electrochemical conversion of chitin, crude shrimp shells (chitin-containing biomass) from seafood waste were fed to the electrochemical cell. Shrimp shells (*Caridina heteropoda*), which contained 29 wt % calcium carbonate ($CaCO_3$), were pre-treated under the same kaolinite-assisted ball milling process as chitin pre-treatment, except that a mixture of shrimp shell biomass and kaolinite in a ratio of 1 to 1 was used. $CaCO_3$ remained insoluble after ball milling and was removed by simple filtration after dispersing the products in water. The remaining rest ~71 wt % biomass (mainly protein and chitin) were noted to undergo partial depolymerization and amorphization under the mechanochemical treatment and subsequent solution in water. The Matrix Laser Assisted Desorption/Ionization-Time of Flight-Mass Spectrometry (MALDI-TOF-MS) result (FIG. 5a) showed that the average molecular weight of the dissolved components of the mechanically treated shrimp shell biomass was mainly located in the range of 800-1300 Da, while the results from size exclusion chromatography coupled with organic carbon detection and organic nitrogen detection (SEC-OCD-OND) (see the inset of FIG. 5a) demonstrated that the main categories of the dissolved components of the mechanically treated shrimp shell biomass were humic substance and low molecular weight polysaccharides. Conversion of 6.0 g L$^{-1}$ ball-milled shrimp shell biomass (M-ShCR curve in FIG. 5b) showed a similar current density increase as the electrochemical conversion of mechanically treated chitin (M-CCR), and an even lower onset potential. GC-MS characterizations (FIG. 5c) showed that the main product was still HAc with trivial formic acid. The GC-FID (FIG. 5d) quantification also showed that the yield of acetic acid reached up to 42 toc %. It is worth noting that the electrochemical cell comprising the biomass conversion reaction at the anode showed significantly higher current density than the reported electrochemical conversion of lignocellulose in literature, suggesting a big step towards practical use.

Example 6: Single-Compartment Hybrid Electrolyzer Driven by Solar Energy

Figure 39A:
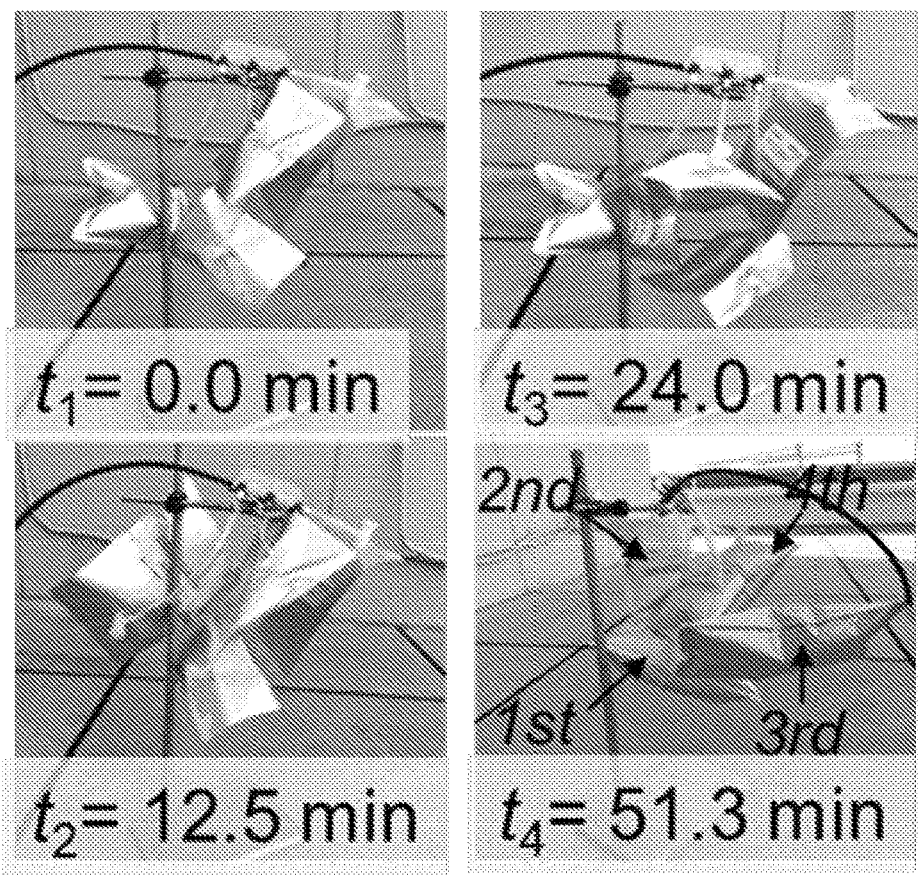
FIG. 39a is a series of photos of gas collected at different times in 1 L sampling bags during the operation of the solar-energy driven electrochemical cell.
Figure 39B:
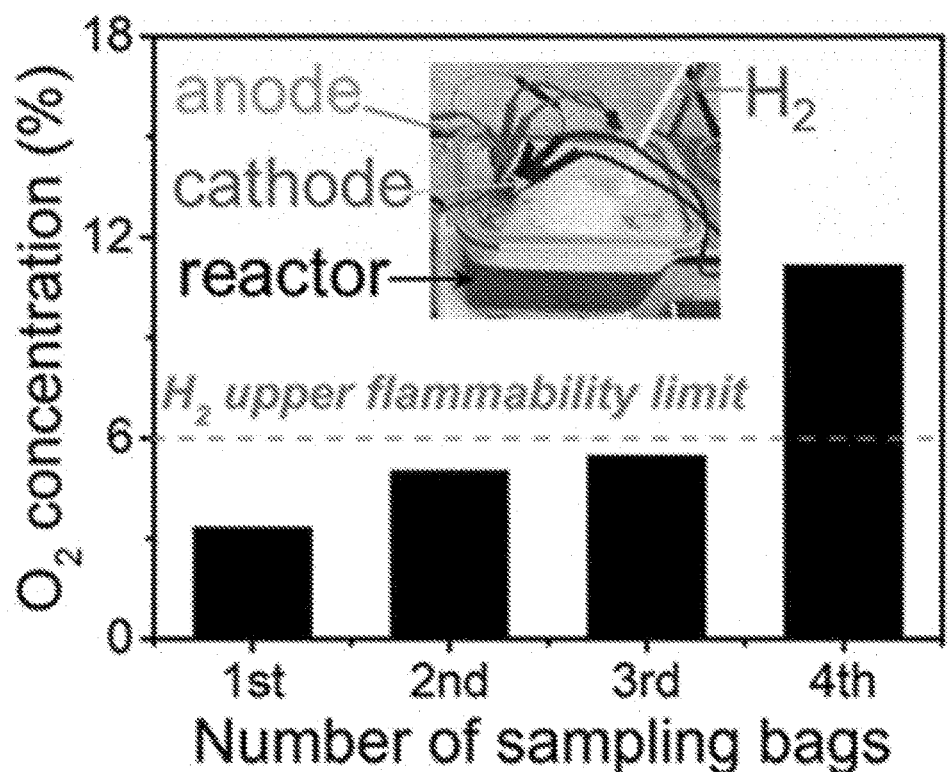
FIG. 39b is a graph showing the $O_2$ concentration of the gaseous products in the sampling bags during the operation of the solar-energy driven electrochemical cell.
Figure 40:
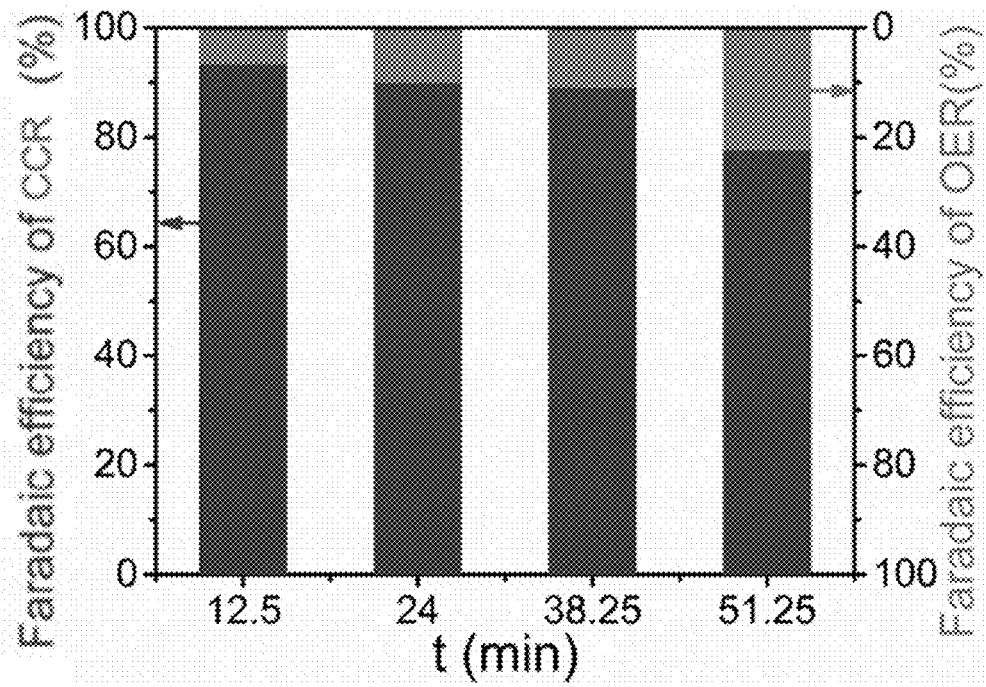
FIG. 40 is a graph showing the faradaic efficiency of the chitin conversion reaction (CCR) and oxygen evolution reaction (OER) of the solar energy driven electrochemical cell.

The feasibility of the electrochemical conversion process by intermittent solar energy was assessed via installed photo-voltaic (PV) panels (N 1° 20' 54.4"; E 103° 40' 59.3"; 2-5 μm on 14 Jun. 2019; partially cloudy). Commercial PV panels (maximum output power 50 W each) were employed to power a sealed single-compartment reaction cell(see FIG. 38), where the generated gaseous products were collected by using a few gas sampling bags (1 L each). Electrode area of the electrochemical cell was 28 cm². FIG. 39a shows the filling of sampling bags by gaseous products at four different reaction times (0, 12.5, 24, 51.3 min) with ball-milled chitin as the reactant (see the inset of FIG. 39b for the homemade sealed reactor). The oxygen concentrations of the gaseous products in the 4 sampling bags collected sequentially are depicted in FIG. 39b, and the corresponding faradaic efficiencies of chitin conversion reaction (CCR) and oxygen evolution reaction (OER) at different reaction time are shown in FIG. 40.

It as observed the oxygen concentration of the gas products remained below the exposure limit of hydrogen-oxygen mixture (6% O2 in $H_2$—$O_2$ mixture as indicated by the dashed line) for the first 3 sampling bags despite the fluctuating output power from the PV panels (between 28.5 and 54 W) due to the presence of moving clouds. The recorded PV output voltage (from voltmeter) varied between 3.0 and 3.6 V, and the iR-corrected voltage range was 2-2.1 V (see Table 3).

TABLE 3

Measurement conditions of the solar energy driven electrochemical cell

| | | Pure water splitting | Hybrid electrolysis |
|---|---|---|---|
| Strong solar irradiation | Current (A) | ~14 | ~15 |
| | Current density (mA cm$^{-2}$) | ~500 | ~535 |
| | Potential (V) | ~3.8 | ~3.6 |
| Weak solar irradiation | Current (A) | ~8.4 | ~9.5 |
| | Current density (mA cm$^{-2}$) | ~300 | ~339 |
| | Potential (V) | ~3.1 | ~2.9 |
| EIS measurement | Rs (Ω) | 0.13 | 0.12 |

Figure 39C:
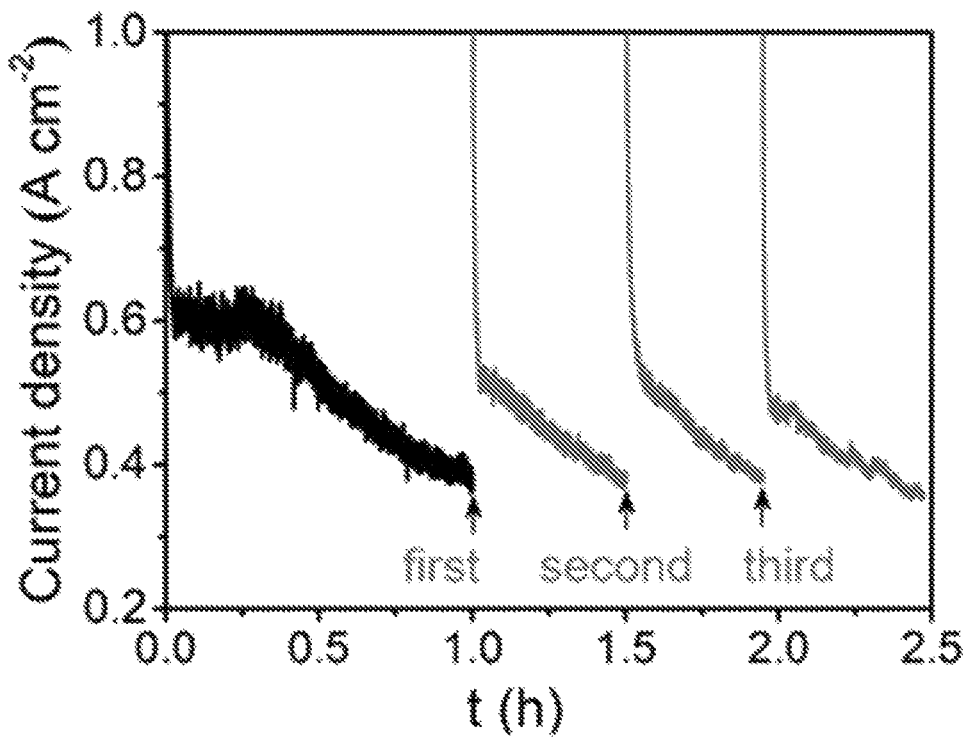
FIG. 39c is a graph showing the current density versus reaction time for consecutive addition of ball-milled chitin to the electrolyte during the operation of the solar-energy driven electrochemical cell.

It is worth noting that more oxygen was evolved when the reactant concentration decreased in the electrolyte as the reaction progressed. FIG. 39c shows the current density response when fresh reactants (5 mL every time) were added four times sequentially to the reactor (25 mL ball-milled chitin with a concentration of 3.5 g L$^{-1}$). An apparent current leap upon the addition of fresh reactants was observed, suggesting that the electrochemical conversion of chitin (M-CCR) dominated the oxidation reaction. When the reactant concentration remained high, the $O_2$ concentration in the gaseous product remained low. Therefore, a fluidic cell with constantly added reactants may be employed to further minimize OER.

Figure 39D:
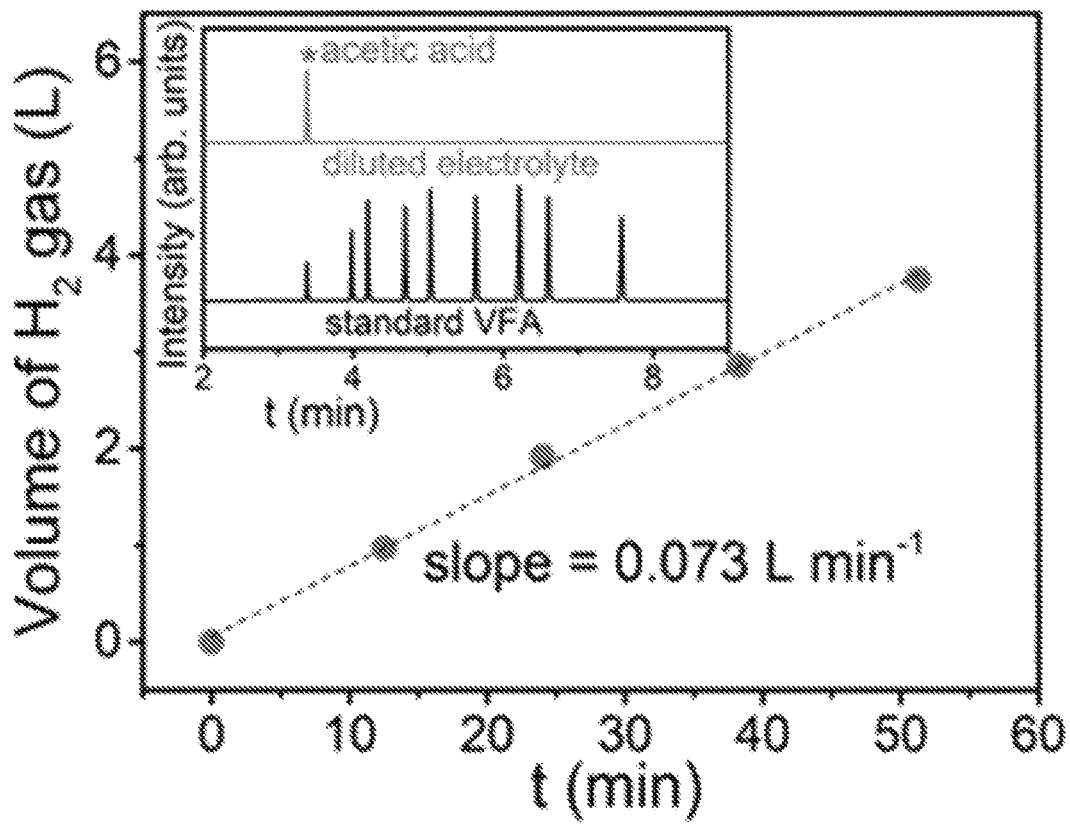
FIG. 39d is a graph showing the $H_2$ production rate during the operation of the solar-energy driven electrochemical cell. Inset shows the GC-FID quantification of 10 mM acetic acid in the diluted electrolyte against 4 mM standard VFA.
Figure 41:
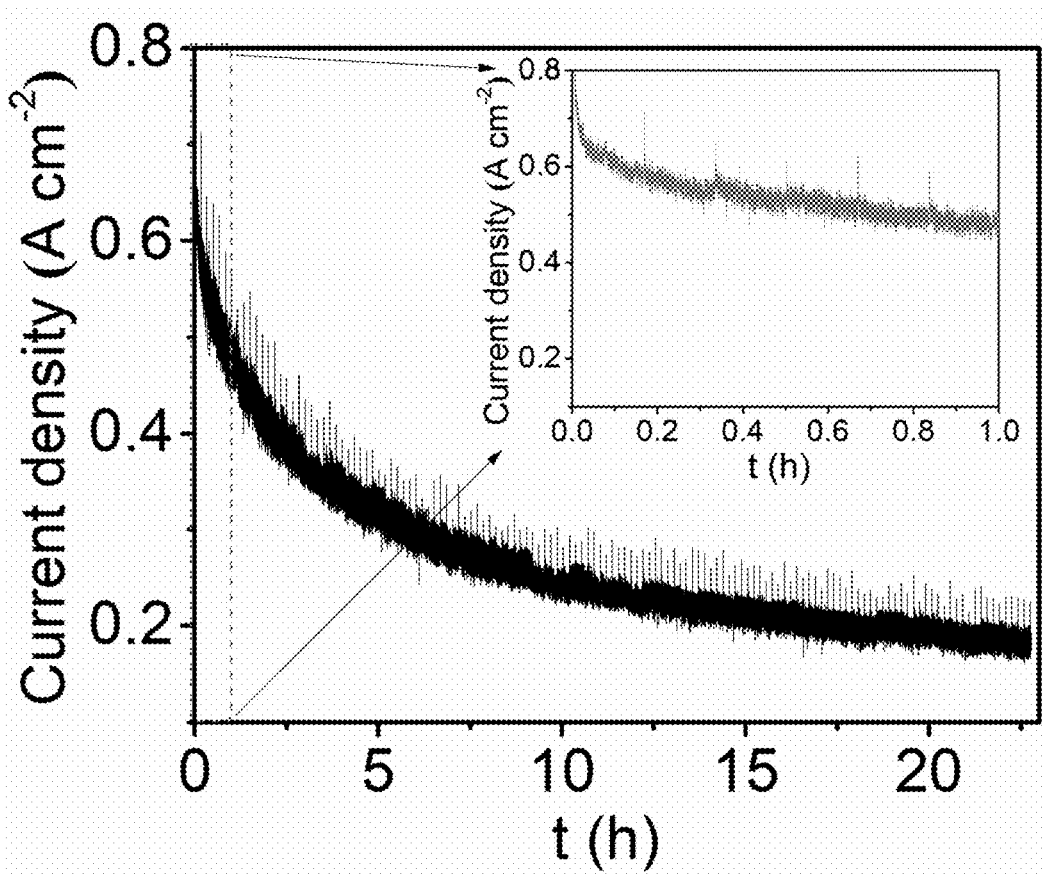
FIG. 41 is a graph showing the current density versus reaction time for chitin conversion reaction (CCR). Inset shows the zoomed-in view of the current density evolution during the first hour.
Figure 42:
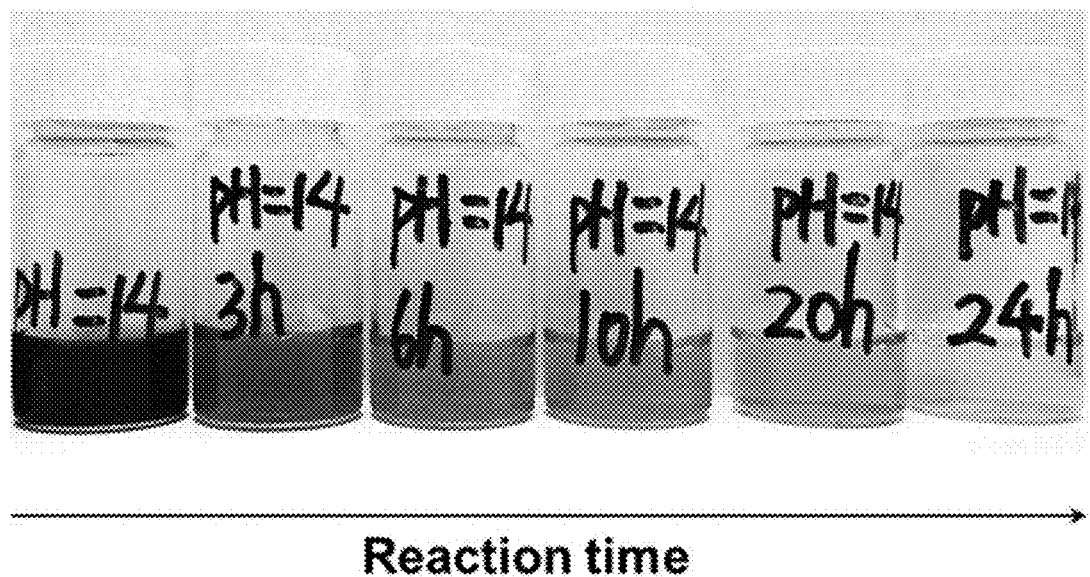
FIG. 42 is a photograph showing the electrolyte during ball-milled chitin conversion reaction at different durations.
Figure 43:
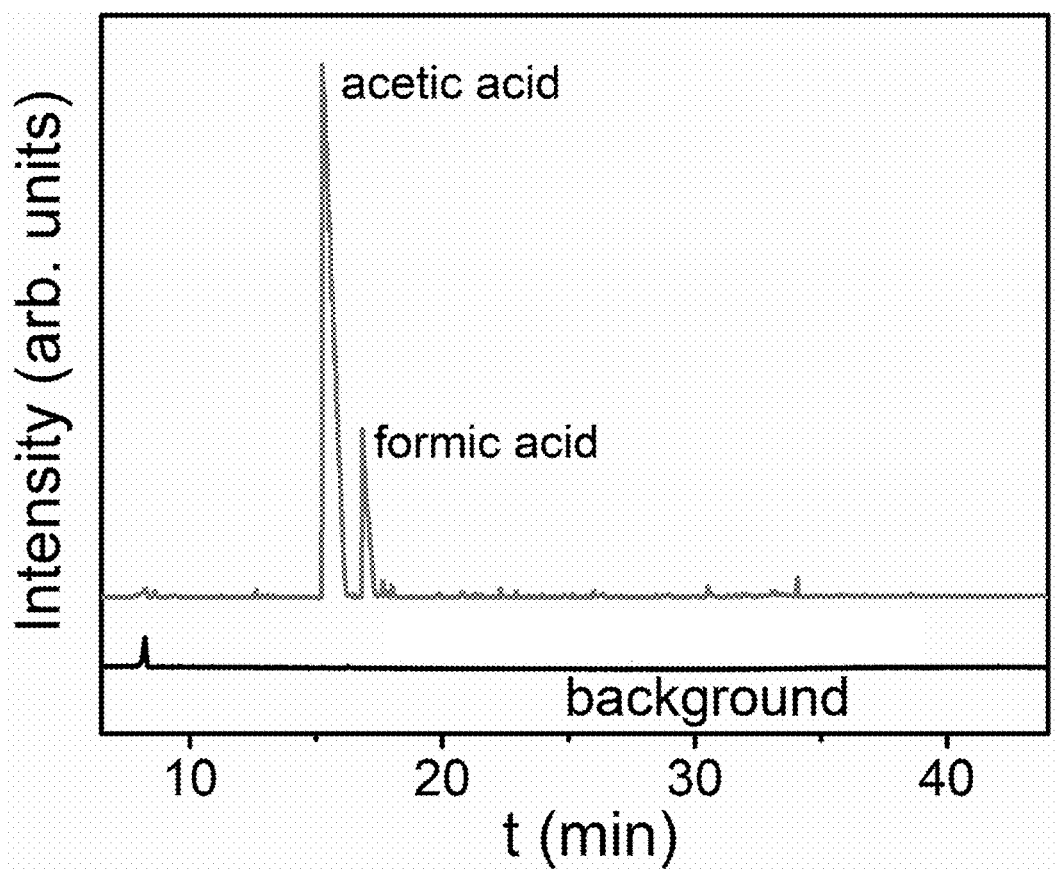
FIG. 43 is a graph showing the GC-MS analysis of the anodic products from the ball-milled chitin conversion reaction after LLE (using ethyl acetate) against the background.

FIG. 39d shows the $H_2$ gas production rate derived from the collected $H_2$ gas, which reached 0.073 L min$^{-1}$ (electrode area of 28 cm²). It is noted that the catalyst remained active after repeated cycles of reaction (FIG. 18c and the inset) and prolonged reaction time (FIG. 41), suggesting the anode was stable for both the electrochemical conversion of ball-milled chitin (M-CCR) and the default oxygen evolution reaction (OER). With an increased reaction time (FIG. 42), it was noted that the electrolyte rapidly became clearer in the first 3 hours of reaction, after which the color slowly faded. Eventually, the electrolyte became almost clear after 24 hours of reaction. The final product consisted of mainly HAc with minor formic acid (<5%) as suggested by GC-MS (FIG. 43), GC-FID (inset of FIG. 39d), and high-performance liquid chromatography (HPLC) measurements, performed in the same manner in Example 5a.

Figure 44:
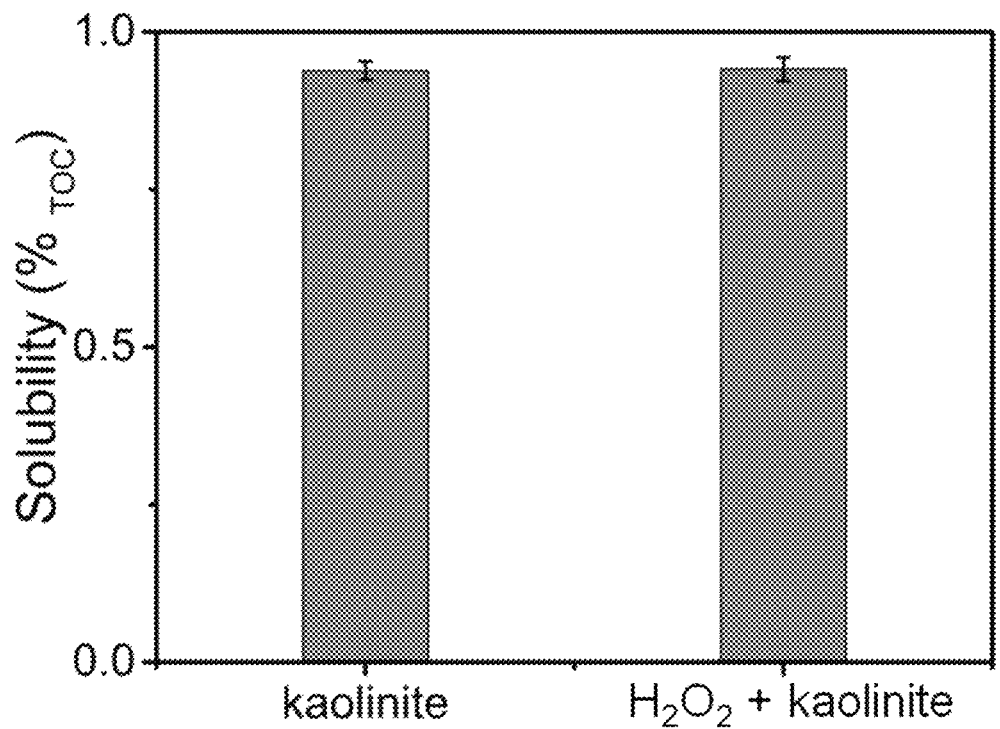
FIG. 44 is a graph showing the TOC based solubility comparison with and without addition of $H_2O_2$ during ball-milling of chitin in the presence of kaolinite.
Figure 45:
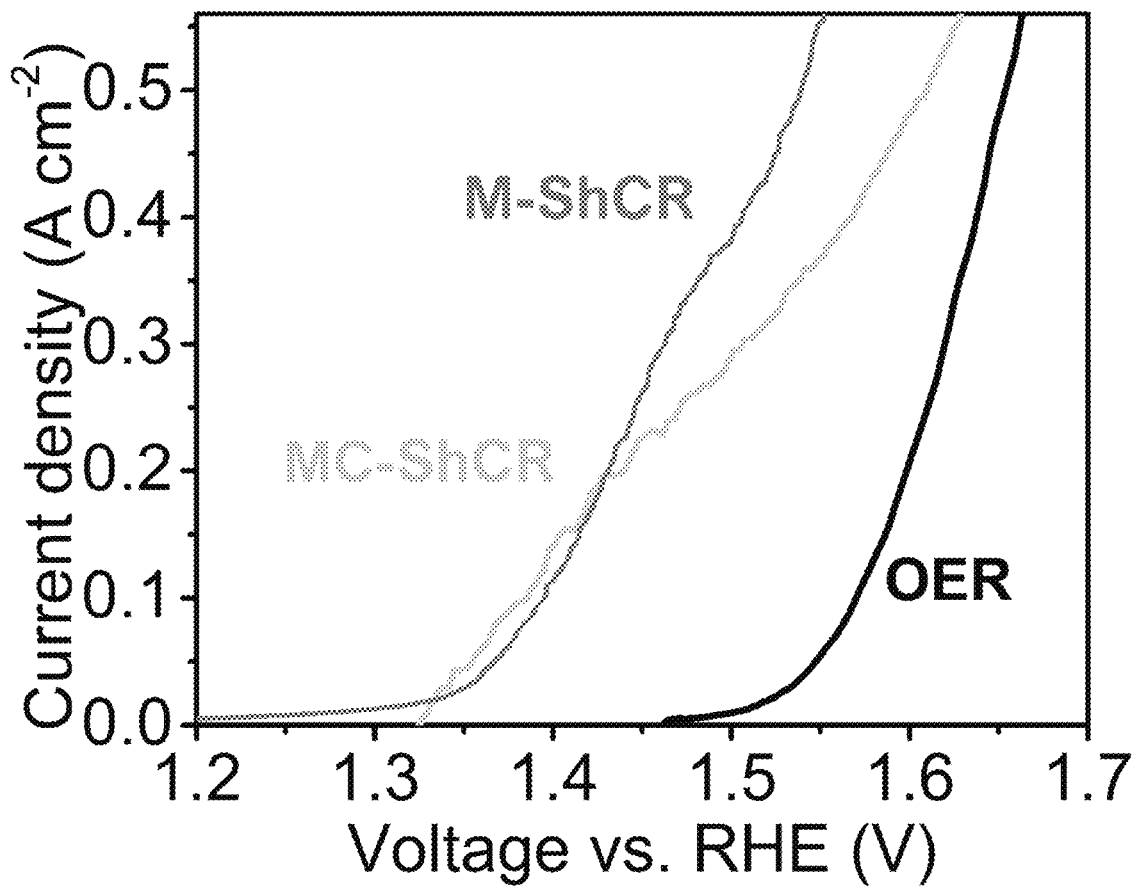
FIG. 45 is a graph showing the LSV spectrum of the electrochemical conversion of ball-milled shrimp shell biomass (M-ShCR), $H_2O_2$ catalyst-assisted ball-milled shrimp shell biomass (MC-ShCR) with the oxygen evolution reaction (OER) as reference.

The yield of HAc obtained ranged from 73.7% to 77.5%. It is noted that the proof-of-concept single-compartment modified alkaline water electrolyser (AWE) prototype showed great compatibility with intermittent solar energy. With decreasing prices of photo-voltaic (PV) panels and wind electricity to $0.02 kW h$^{-1}$, conventional AWE may be more cost-effective ($100-400 kW$^{-1}$) than methane reforming. The electrolysis/electrochemical conversion process of the present invention may further reduce the price of green hydrogen production via water electrolysis. Moreover, direct coupling of renewable energy to electrolyzer avoids the integration of renewable energy to electrical grid, which faces many challenges currently. This may also reduce electricity consumption in various AC/DC converters, voltage/current regulators, etc. Lastly, the single-compartment electrolyzer comprising the biomass conversion reaction at the anode simplifies the overall device and system design and thus reduces the cost of manufacturing, maintenance, and operation. Further reduction of energy consumption by using the appropriate co-catalyst or/and increasing the processing scale is possible, for example by using kaolinite with $H_2O_2$ during the ball-milling process (see FIG. 44 and FIG. 45, and Tables 4-6).

TABLE 4

Comparison of key features between conventional alkaline water electrolysers (AWE) and the electrochemical cell of the present invention

| | AWE | Present invention |
|---|---|---|
| Reactants | Pure water | Water and organic waste |
| Pre-treatment of reactants | Purified, heated | Ball-milled |
| Products | $H_2$ and $O_2$ | Organic acid, $H_2$ |
| Value of $H_2$ | >99.9% up to 30 bar | Potentially 99% pressurised $H_2$ |
| Membrane | Diaphragm membrane | Potentially membraneless |
| Operating potential | 1.8-2.4 @ 0.2-0.4 A cm$^{-2}$ | About 10% less voltage needed |
| Energy efficiency | 70-80% | 80-90% excluding pre-treatment |
| Operating temperature | 60° C.-80° C. | Room temperature |
| Operation conditions | Restart at 2% $H_2$ crossover | Potentially continuous operation |

TABLE 5

Estimation of costs of anodic reactants and products

| | Price ($/kg) | Total mass for 1 kg $H_2$ produced (kg) | Total value ($) | Role in electrolysis |
|---|---|---|---|---|
| WAS | 0 | depends | 0 | Anodic reactants |
| Woody biomass | 0 | 25 | 0 | Anodic reactants |
| Shrimp shell biomass | 0.1 | 78.9 | 8 | Anodic reactants |
| KOH | 0.8 | 35.1 | 28 | electrolyte |
| KAc | 1.0 | 49.1 | 49 | Anodic products |

TABLE 6

Comparison of electricity to hydrogen efficiency

| | AWE | Present invention |
|---|---|---|
| Pre-treatment step | Water purification and heating | Ball milling |
| Electricity consumed | 198 MJ | 178 MJ (typically between 317 MJ and 950 MJ) |
| Energy of $H_2$ generated | 142 MJ | 142 MH |
| Electricity-hydrogen efficiency | 72% | 80% (12.5%/28.7%) |

Therefore, such an electrolyzer of the present invention will facilitate the wide implementation of water electrolysis with potentially reduced cost and increased safety, which are both highly beneficial for a sustainable energy future.

INDUSTRIAL APPLICABILITY

The present disclosed method may be applied to various organic waste, including sludge, sludge biomass, waste-activated sludge (WAS), THP solid waste residue, chemical waste residue, sewage sludge, food waste, woody biomass waste, shellfish waste, among others. The disclosed method also converts such organic waste into valuable organic acid and hydrogen, both of which have valuable uses in industry. For example, acetic acid, an example of the organic acid formed from the present invention, can be used as substrate in the formation of other compounds. Hydrogen is also valuable as a new energy source. Hence the method is capable of industrial applicability.

The present disclosed methods also have several advantages over conventional organic waste treatment methods as follows. Firstly, the catalytic mechanochemical treatment (ball milling) realizes unprecedented solubility of organic waste via the combination of mechanical force and alkaline treatment. Secondly, the resource utilization (including N, P and K) is highly improved with minimum loss of nutrients. Thirdly, fast and selective conversion of organic waste into organic acid could significantly reduce time consumption and cost. Fourthly, environmental friendliness has been greatly enhanced since risk of heavy metals and carbon emission are minimised. Fifth, concomitant production of green hydrogen is of great significance for decarbonization. Sixth, the hybrid electrolysis is highly potential to be driven by solar energy directly. Thus, the present method is capable of industrial applicability.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. A method of electrochemical conversion of organic waste to organic acid and hydrogen, comprising the steps of:
   (i) subjecting organic waste to ball milling under alkaline or acidic conditions to obtain pre-treated organic waste;
   (ii) introducing the pre-treated organic waste to a first compartment of an electrochemical cell, wherein the electrochemical cell comprises:
   the first compartment containing a nickel-based anode, a second compartment containing a cathode, and an electrolyte; and
   (iii) applying an electrical potential between the anode and the cathode, thereby producing organic acid at the anode, and hydrogen at the cathode.

2. The method of claim 1, wherein the organic waste is selected from the group consisting of sludge optionally selected from the group consisting of waste activated sludge (WAS), food waste, sewage sludge, and sludge treated with thermal hydrolysis process (THP); woody biomass optionally selected from the group consisting of woody plants, cardboard, paper, and packaging material; food waste; horticulture waste; and shellfish optionally selected from the group consisting of shells containing chitin, prawn shells, lobster shells, crab shells, crayfish shells, clam shells, mussel shells, and yabbie shells.

3. The method of claim 1, wherein the organic waste comprises lignin, cellulose, polysaccharide, and/or chitin.

4. The method of claim 1, wherein the organic acid is selected from the group consisting of acetic acid, propanoic acid, formic acid, lactic acid, and benzoic acid.

5. The method of claim 1, wherein the ball milling is performed at a speed of about 500 rpm to about 2000 rpm.

6. The method of claim 1, wherein step (i) comprises subjecting the organic waste to ball milling with alkali, wherein the alkali is NaOH or KOH, optionally wherein the ratio of organic waste to alkali is in the range of about 4:1 to about 1:2.

7. The method of claim 1, wherein step (i) comprises subjecting the organic waste to ball milling with acid, wherein the acid is kaolinite.

8. The method of claim 1, wherein step (i) further comprises solubilising the ball-milled organic waste in water to obtain a solubilised mixture, and centrifuging the solubilised mixture to obtain the pre-treated organic waste as supernatant.

9. The method of claim 1, wherein step (i) comprises ball milling with zirconia milling balls.

10. The method of claim 1, wherein the organic waste is ball milled for at least 4 hours.

11. The method of claim 1, wherein the ball milling is performed at a temperature in the range of about 20° C. to about 70° C.

12. The method of claim 1, wherein step (ii) further comprises dissolving the pre-treated organic waste in NaOH or KOH solution.

13. The method of claim 1, wherein the nickel-based anode is hp-Ni/NF and/or wherein the cathode is selected from the group consisting of nickel compounds such as nickel sulfide, and nickel phosphide.

14. The method of claim 1, wherein the first compartment and second compartment are not separated.

15. The method of claim 1, wherein the first compartment and second compartment are separated by an anion exchange membrane.

16. The method of claim 1, wherein the electrolyte is NaOH or KOH.

17. The method of claim 1, wherein step (ii) further comprises introducing a solution comprising a nitrate salt to the second compartment containing the cathode, optionally wherein the solution comprising the nitrate salt is a solution obtained from the first compartment containing the anode after step (ii), and wherein step (iii) further comprises producing an ammonium salt.

18. The method of claim 1, wherein the electrical potential is derived from a stored energy source, or a renewable energy source, optionally wherein the renewable energy source is solar energy, wind power, or hydro power.

* * * * *